(12) United States Patent
Furusho

(10) Patent No.: US 7,627,604 B2
(45) Date of Patent: Dec. 1, 2009

(54) METHOD FOR HANDLING TREE-TYPE DATA STRUCTURE, INFORMATION PROCESSING DEVICE, AND PROGRAM

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 74 days.

(21) Appl. No.: 10/599,043

(22) PCT Filed: Mar. 10, 2005

(86) PCT No.: PCT/JP2005/004190

§ 371 (c)(1),
(2), (4) Date: Jul. 1, 2008

(87) PCT Pub. No.: WO2005/088479

PCT Pub. Date: Sep. 22, 2005

(65) Prior Publication Data
US 2008/0270435 A1 Oct. 30, 2008

(30) Foreign Application Priority Data

Mar. 16, 2004 (JP) .............................. 2004-075404

(51) Int. Cl.
*G06F 7/00* (2006.01)
*G06F 17/00* (2006.01)
*G06F 17/30* (2006.01)

(52) U.S. Cl. .......................... 707/104.1; 707/3; 707/10; 707/103 R; 707/103 Y; 707/103 X; 707/103 Z

(58) Field of Classification Search ...................... 707/3, 707/10, 103 R, 103 Y, 103 X, 103 Z, 104.1
See application file for complete search history.

(56) References Cited

U.S. PATENT DOCUMENTS

| 4,868,743 | A | * | 9/1989 | Nishio | 707/3 |
| 5,727,195 | A | * | 3/1998 | Nakatsuyama | 707/1 |
| 5,995,952 | A | * | 11/1999 | Kato | 706/15 |

(Continued)

FOREIGN PATENT DOCUMENTS

JP 10-240741 9/1998

(Continued)

OTHER PUBLICATIONS

SEC Co., Ltd., "Karearea White Paper", [online], [searched on Feb. 19, 2004], Internet <URL:http://wwww.sec.co. jp/products/karearea/>, printed Sep. 12, 2006.

(Continued)

*Primary Examiner*—James Trujillo
*Assistant Examiner*—Jorge A Casanova
(74) *Attorney, Agent, or Firm*—Griffin & Szipl, P.C.

(57) ABSTRACT

It is possible to express a tree-type data structure so as to effectively trace the relationship between data in the tree-type data structure (for example, parent-child, ancestor, descendant, brothers, generations). In the tree-type data structure, for each of non root nodes which are the nodes excluding the root node, their parent nodes are correlated so that the parent-child relationship between the nodes is expressed by using "child->parent" relationship. Accordingly, by specifying a child node, it is possible to promptly specify the only one parent node corresponding to the child node.

15 Claims, 50 Drawing Sheets

U.S. PATENT DOCUMENTS

| | | | | |
|---|---|---|---|---|
| 6,006,027 | A | * | 12/1999 | Downey .................... 703/17 |
| 6,029,170 | A | * | 2/2000 | Garger et al. .............. 707/100 |
| 6,081,624 | A | * | 6/2000 | Krishnaswamy ........... 382/240 |
| 6,219,833 | B1 | * | 4/2001 | Solomon et al. ........... 717/149 |
| 6,279,007 | B1 | * | 8/2001 | Uppala ..................... 707/101 |
| 6,389,416 | B1 | * | 5/2002 | Agarwal et al. .............. 707/6 |
| 6,509,898 | B2 | * | 1/2003 | Chi et al. .................. 345/440 |
| 6,567,815 | B1 | * | 5/2003 | Rubin et al. ............... 707/101 |
| 6,904,423 | B1 | * | 6/2005 | Nicolaou et al. ............. 706/46 |
| 6,931,418 | B1 | * | 8/2005 | Barnes ................... 707/103 R |

FOREIGN PATENT DOCUMENTS

| | | |
|---|---|---|
| JP | 11-327993 | 11/1999 |
| JP | 2000-099226 | 4/2000 |
| JP | 2001-195406 | 7/2001 |
| JP | 2003-248615 | 9/2003 |

OTHER PUBLICATIONS

W3C, "Extensible Markup Language (XML)) 1.0 (Third Edition)", [online], Feb. 4, 2004, [searched on Feb. 19, 2004], Internet <URL:http://www.w3.org/TR/2004/REC-xml-20040204/>, printed Sep. 12, 2006.

Sedgwich, R., Algorithm vol. 1=Kiso Seiretsu, first edition, Kindai Kagaku Sha, 1990, pp. 39-55.

International Search Report issued in corresponding application No. PCT/JP2005/004190, completed Apr. 8, 2005 and mailed Apr. 26, 2005.

* cited by examiner

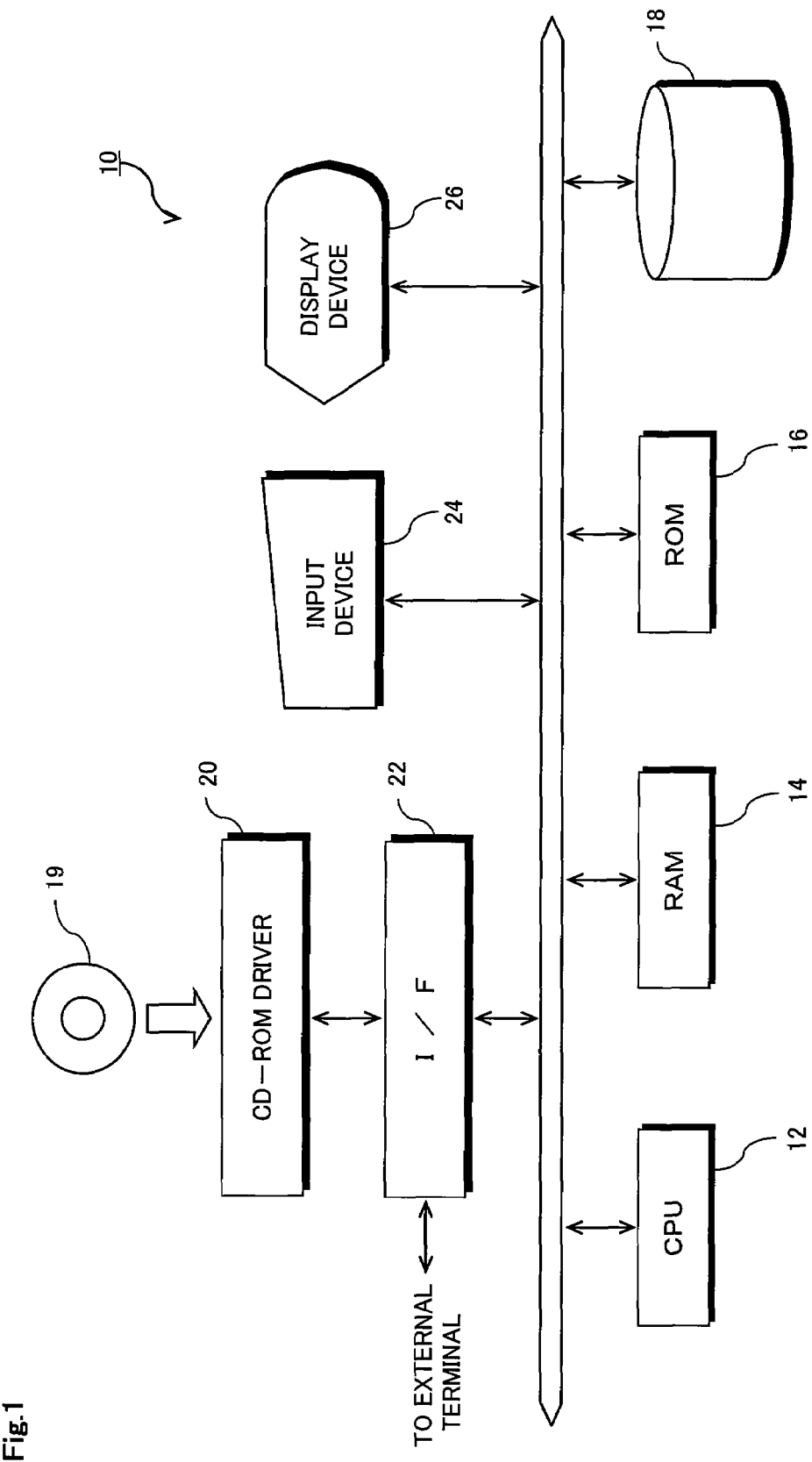

Fig.2A

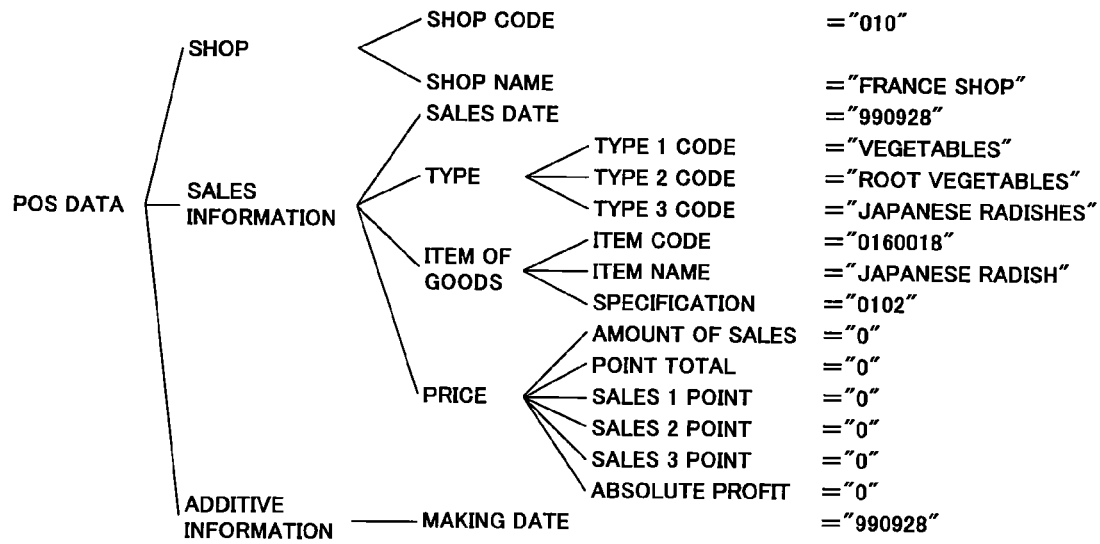

Fig.2B

```
<posdata>
    <shop>
        <shopCode>010</shopCode>
        <shopName>FRANCE SHOP</shopName>
    </shop>
    <salesInformation>
        <sellDate>990928</sellDate>
        <class>
            <class1 code="01">VEGETABLES</class1>
            <class2 code="01">ROOT VEGETABLES</class2>
            <class3 code="01">JAPANESE RADISHES</class3>
        </class>
        <goods>
            <goodsCode>"0160018"</goodsCode>
            <goodsName>JAPANESE RADISH</goodsName>
            <standard>0102</standard>
        </goods>
        <price>
            <amountOfSales>0</amountOfSales>
            <amountOfPoints>0</amountOfPoints>
            <sales1 point="0">0</sales1>
            <sales2 point="0">0</sales2>
            <sales3 point="0">0</sales3>
            <grossProfit>0</grossProfit>
        </price>
    </salesInformation>
    <additionalInformation>
        <createdDate>990928</createdDate>
    </additionalInformation>
</posdata>
```

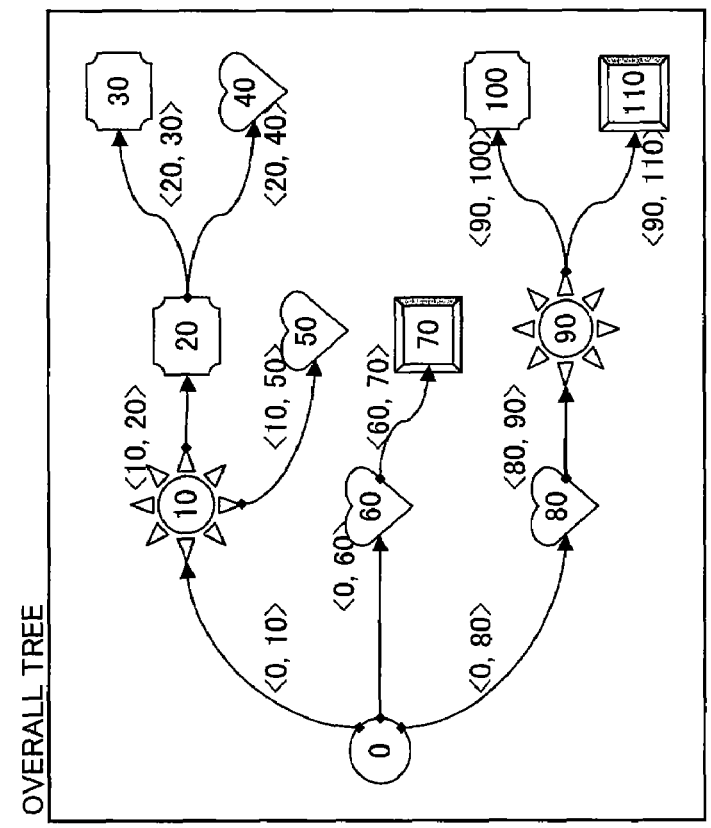

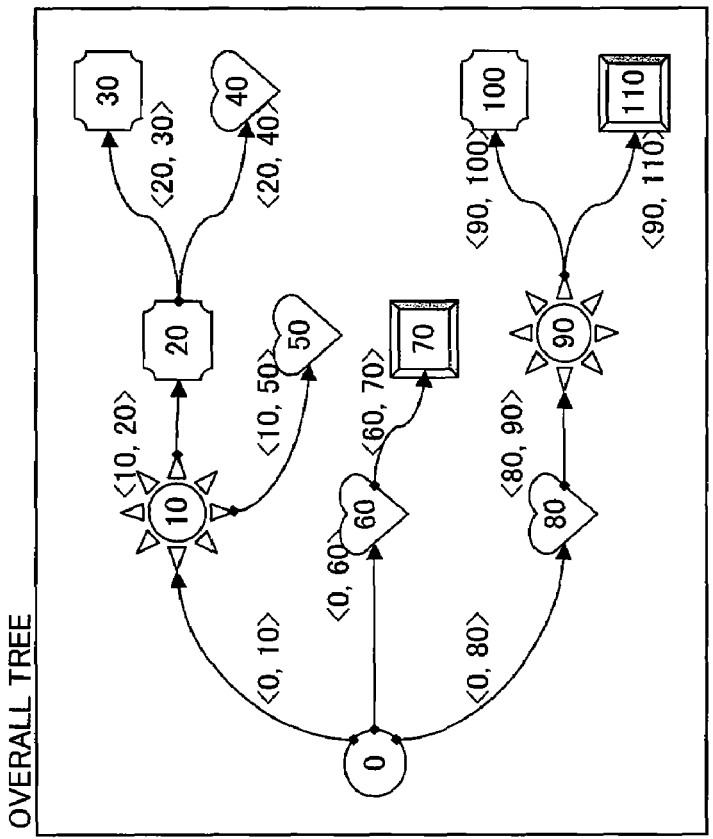

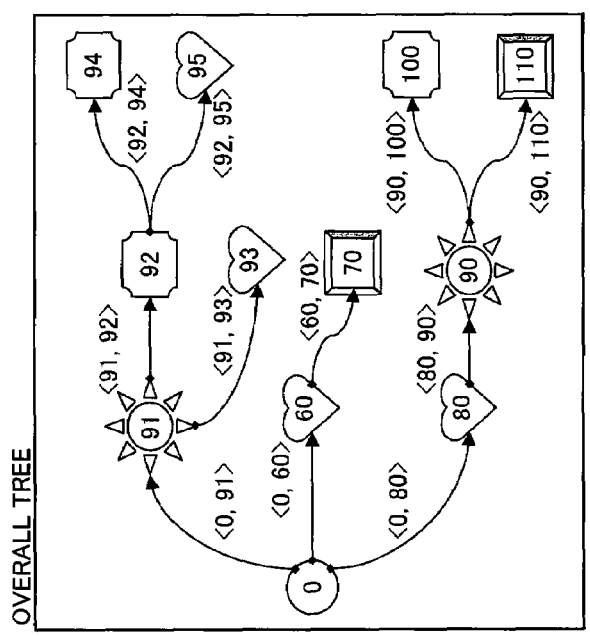

Fig. 7A DESCRIPTION BASED ON ID
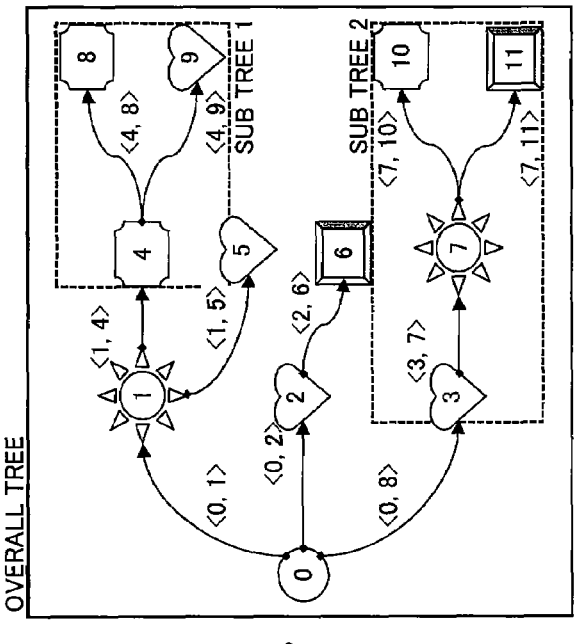
Fig. 7B
ID→No.
CONVERSION
TABLE
0 → 0
91 → 1
92 → 4
93 → 5
94 → 8
95 → 9
60 → 2
70 → 6
80 → 3
90 → 7
100 → 10
110 → 11
CONVERSION
Fig. 7C DESCRIPTION BASED ON No. (WIDTH-FIRST)
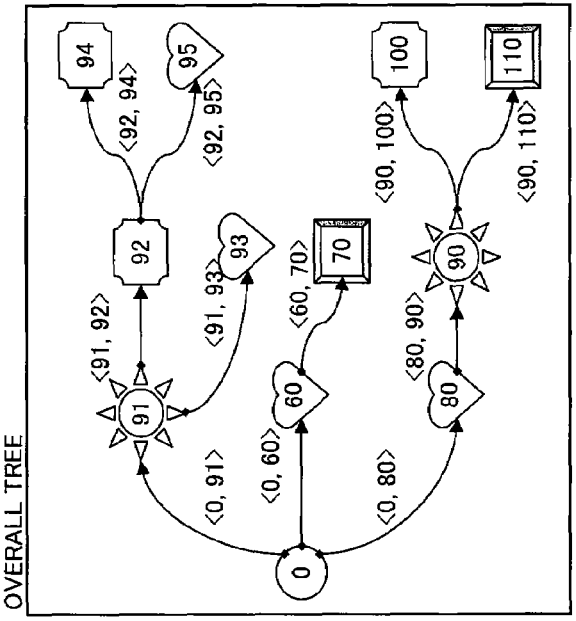

ARRAY OF PARENT-CHILD RELATIONSHIP
BASED ON "PARENT→CHILD" RELATIONSHIP OF DEPTH-FIRST

ARRAY OF PARENT-CHILD RELATIONSHIP
BASED ON "PARENT→CHILD" RELATIONSHIP OF WIDTH-FIRST

Fig.18A PROCEDURE 0

| C->P | depth | depth-count |
|---|---|---|
| 0: -1 | 0: - | 0: 0 |
| 1: 0 | 1: - | 1: 0 |
| 2: 1 | 2: - | 2: 0 |
| 3: 2 | 3: - | 3: 0 |
| 4: 2 | 4: - | 4: 0 |
| 5: 1 | 5: - | |
| 6: 0 | 6: - | |
| 7: 6 | 7: - | |
| 8: 0 | 8: - | |
| 9: 8 | 9: - | |
| 10: 9 | 10: - | |
| 11: 9 | 11: - | |

EXPRESSION BASED ON CHILD→PARENT

Fig.18B PROCEDURE 1

| C->P | depth | depth-count |
|---|---|---|
| 0: -1 | 0: -->0 | 0: 0->1 |
| 1: 0 | 1: - | 1: 0 |
| 2: 1 | 2: - | 2: 0 |
| 3: 2 | 3: - | 3: 0 |
| 4: 2 | 4: - | 4: 0 |
| 5: 1 | 5: - | |
| 6: 0 | 6: - | |
| 7: 6 | 7: - | |
| 8: 0 | 8: - | |
| 9: 8 | 9: - | |
| 10: 9 | 10: - | |
| 11: 9 | 11: - | |

EXPRESSION BASED ON CHILD→PARENT

Fig.18C PROCEDURE 2

| C->P | depth | depth-count |
|---|---|---|
| 0: -1 | 0: 0 | 0: 1 |
| 1: 0 | 1: -->1 | 1: 0->1 |
| 2: 1 | 2: - | 2: 0 |
| 3: 2 | 3: - | 3: 0 |
| 4: 2 | 4: - | 4: 0 |
| 5: 1 | 5: - | |
| 6: 0 | 6: - | |
| 7: 6 | 7: - | |
| 8: 0 | 8: - | |
| 9: 8 | 9: - | |
| 10: 9 | 10: - | |
| 11: 9 | 11: - | |

EXPRESSION BASED ON CHILD→PARENT

Fig.20A PROCEDURE 6
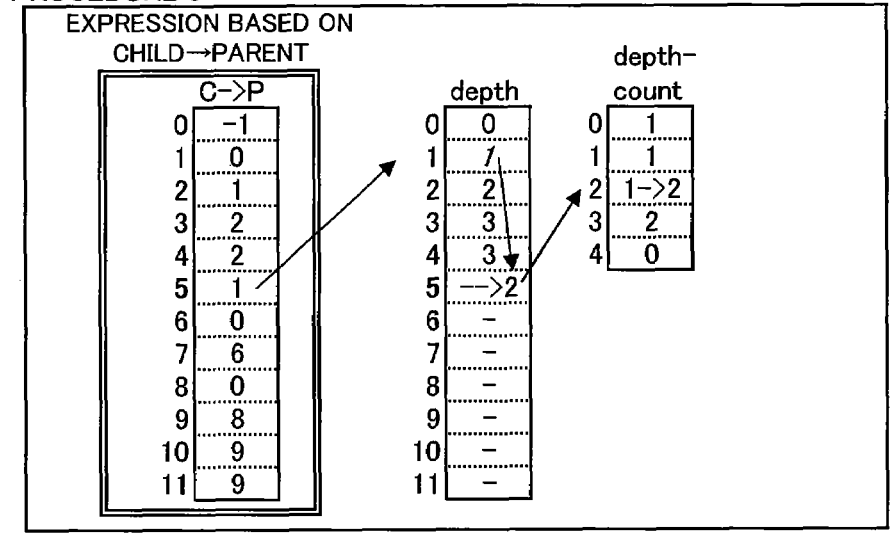
Fig.20B PROCEDURE 7
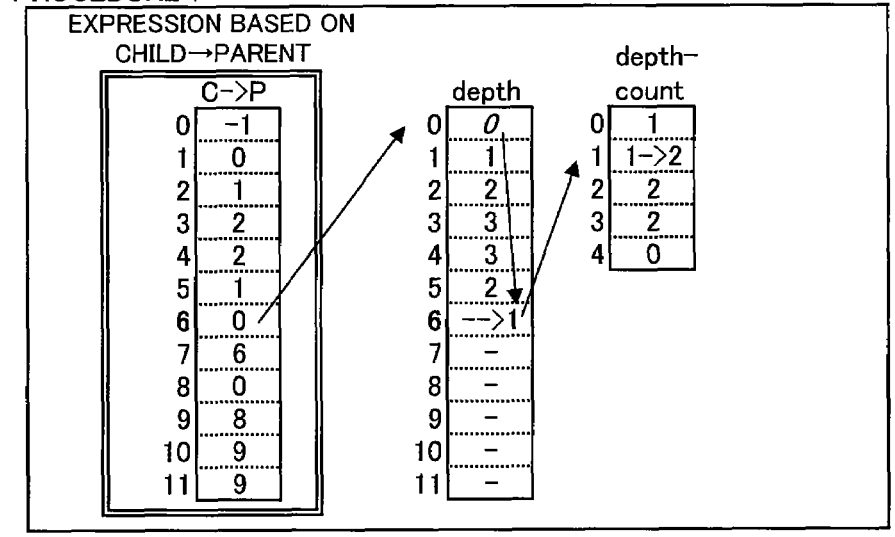
Fig.20C PROCEDURE 8
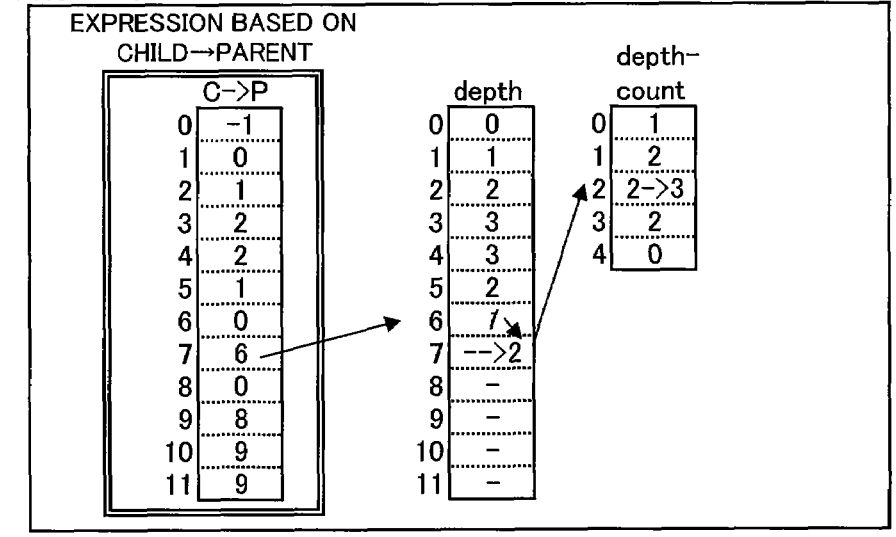

Fig.22

PROCEDURE 12

EXPRESSION BASED ON
CHILD→PARENT

| | C->P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | depth |
|---|---|
| 0 | 0 |
| 1 | 1 |
| 2 | 2 |
| 3 | 3 |
| 4 | 3 |
| 5 | 2 |
| 6 | 1 |
| 7 | 2 |
| 8 | 1 |
| 9 | 2 |
| 10 | 3 |
| 11 | -->3 |

| | depth-count |
|---|---|
| 0 | 1 |
| 1 | 3 |
| 2 | 4 |
| 3 | 3->4 |
| 4 | 0 |

Fig.24A PROCEDURE 0

| DEPTH-FIRST EXPRESSION BASED ON CHILD→PARENT | | depth | | depth-aggr | | CONVERSION DEFINITION OF "No." | |
|---|---|---|---|---|---|---|---|
| | C→P | | | | | | |
| 0 | -1 | 0 | 0 | 0 | 0 | 0 | − |
| 1 | 0 | 1 | 1 | 1 | 1 | 1 | − |
| 2 | 1 | 2 | 2 | 2 | 4 | 2 | − |
| 3 | 2 | 3 | 3 | 3 | 8 | 3 | − |
| 4 | 2 | 4 | 3 | 4 | 12 | 4 | − |
| 5 | 1 | 5 | 2 | | | 5 | − |
| 6 | 0 | 6 | 1 | | | 6 | − |
| 7 | 6 | 7 | 2 | | | 7 | − |
| 8 | 0 | 8 | 1 | | | 8 | − |
| 9 | 8 | 9 | 2 | | | 9 | − |
| 10 | 9 | 10 | 3 | | | 10 | − |
| 11 | 9 | 11 | 3 | | | 11 | − |

Fig.24B PROCEDURE 1

| DEPTH-FIRST EXPRESSION BASED ON CHILD→PARENT | | depth | | depth-aggr | | CONVERSION DEFINITION OF "No." | |
|---|---|---|---|---|---|---|---|
| | C→P | | | | | | |
| 0 | -1 | 0 | 0 → | 0 | 0→1 | 0 | -->0 |
| 1 | 0 | 1 | 1 | 1 | 1 | 1 | − |
| 2 | 1 | 2 | 2 | 2 | 4 | 2 | − |
| 3 | 2 | 3 | 3 | 3 | 8 | 3 | − |
| 4 | 2 | 4 | 3 | 4 | 12 | 4 | − |
| 5 | 1 | 5 | 2 | | | 5 | − |
| 6 | 0 | 6 | 1 | | | 6 | − |
| 7 | 6 | 7 | 2 | | | 7 | − |
| 8 | 0 | 8 | 1 | | | 8 | − |
| 9 | 8 | 9 | 2 | | | 9 | − |
| 10 | 9 | 10 | 3 | | | 10 | − |
| 11 | 9 | 11 | 3 | | | 11 | − |

Fig.24C PROCEDURE 2

| DEPTH-FIRST EXPRESSION BASED ON CHILD→PARENT | | depth | | depth-aggr | | CONVERSION DEFINITION OF "No." | |
|---|---|---|---|---|---|---|---|
| | C→P | | | | | | |
| 0 | -1 | 0 | 0 | 0 | 1 | 0 | 0 |
| 1 | 0 | 1 | 1 → | 1 | 1→2 | 1 | -->1 |
| 2 | 1 | 2 | 2 | 2 | 4 | 2 | − |
| 3 | 2 | 3 | 3 | 3 | 8 | 3 | − |
| 4 | 2 | 4 | 3 | 4 | 12 | 4 | − |
| 5 | 1 | 5 | 2 | | | 5 | − |
| 6 | 0 | 6 | 1 | | | 6 | − |
| 7 | 6 | 7 | 2 | | | 7 | − |
| 8 | 0 | 8 | 1 | | | 8 | − |
| 9 | 8 | 9 | 2 | | | 9 | − |
| 10 | 9 | 10 | 3 | | | 10 | − |
| 11 | 9 | 11 | 3 | | | 11 | − |

Fig.25A PROCEDURE 3

| | DEPTH-FIRST EXPRESSION BASED ON CHILD→PARENT | | | | | | | |
|---|---|---|---|---|---|---|---|---|
| | C->P | | depth | | depth-aggr | | CONVERSION DEFINITION OF "No." | |
| 0 | -1 | 0 | 0 | 0 | 1 | 0 | 0 |
| 1 | 0 | 1 | 1 | 1 | 2 | 1 | 1 |
| 2 | 1 | 2 | 2 | 2 | *4->5* | 2 | *-->4* |
| 3 | 2 | 3 | 3 | 3 | 8 | 3 | - |
| 4 | 2 | 4 | 3 | 4 | 12 | 4 | - |
| 5 | 1 | 5 | 2 | | | 5 | - |
| 6 | 0 | 6 | 1 | | | 6 | - |
| 7 | 6 | 7 | 2 | | | 7 | - |
| 8 | 0 | 8 | 1 | | | 8 | - |
| 9 | 8 | 9 | 2 | | | 9 | - |
| 10 | 9 | 10 | 3 | | | 10 | - |
| 11 | 9 | 11 | 3 | | | 11 | - |

Fig.25B PROCEDURE 4

| | DEPTH-FIRST EXPRESSION BASED ON CHILD→PARENT | | | | | | | |
|---|---|---|---|---|---|---|---|---|
| | C->P | | depth | | depth-aggr | | CONVERSION DEFINITION OF "No." | |
| 0 | -1 | 0 | 0 | 0 | 1 | 0 | 0 |
| 1 | 0 | 1 | 1 | 1 | 2 | 1 | 1 |
| 2 | 1 | 2 | 2 | 2 | 5 | 2 | 4 |
| 3 | 2 | 3 | 3 | 3 | *8->9* | 3 | *-->8* |
| 4 | 2 | 4 | 3 | 4 | 12 | 4 | - |
| 5 | 1 | 5 | 2 | | | 5 | - |
| 6 | 0 | 6 | 1 | | | 6 | - |
| 7 | 6 | 7 | 2 | | | 7 | - |
| 8 | 0 | 8 | 1 | | | 8 | - |
| 9 | 8 | 9 | 2 | | | 9 | - |
| 10 | 9 | 10 | 3 | | | 10 | - |
| 11 | 9 | 11 | 3 | | | 11 | - |

Fig.25C PROCEDURE 5

| | DEPTH-FIRST EXPRESSION BASED ON CHILD→PARENT | | | | | | | |
|---|---|---|---|---|---|---|---|---|
| | C->P | | depth | | depth-aggr | | CONVERSION DEFINITION OF "No." | |
| 0 | -1 | 0 | 0 | 0 | 1 | 0 | 0 |
| 1 | 0 | 1 | 1 | 1 | 2 | 1 | 1 |
| 2 | 1 | 2 | 2 | 2 | 5 | 2 | 4 |
| 3 | 2 | 3 | 3 | 3 | *9->10* | 3 | 8 |
| 4 | 2 | 4 | 3 | 4 | 12 | 4 | *-->9* |
| 5 | 1 | 5 | 2 | | | 5 | - |
| 6 | 0 | 6 | 1 | | | 6 | - |
| 7 | 6 | 7 | 2 | | | 7 | - |
| 8 | 0 | 8 | 1 | | | 8 | - |
| 9 | 8 | 9 | 2 | | | 9 | - |
| 10 | 9 | 10 | 3 | | | 10 | - |
| 11 | 9 | 11 | 3 | | | 11 | - |

Fig.26A PROCEDURE 6

DEPTH-FIRST EXPRESSION BASED ON CHILD→PARENT

| | C->P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | depth |
|---|---|
| 0 | 0 |
| 1 | 1 |
| 2 | 2 |
| 3 | 3 |
| 4 | 3 |
| 5 | 2 |
| 6 | 1 |
| 7 | 2 |
| 8 | 1 |
| 9 | 2 |
| 10 | 3 |
| 11 | 3 |

| | depth-aggr |
|---|---|
| 0 | 1 |
| 1 | 2 |
| 2 | *5->6* |
| 3 | 10 |
| 4 | 12 |

CONVERSION DEFINITION OF "No."

| | |
|---|---|
| 0 | 0 |
| 1 | 1 |
| 2 | 4 |
| 3 | 8 |
| 4 | 9 |
| 5 | *-->5* |
| 6 | - |
| 7 | - |
| 8 | - |
| 9 | - |
| 10 | - |
| 11 | - |

Fig.26B PROCEDURE 7

DEPTH-FIRST EXPRESSION BASED ON CHILD→PARENT

| | C->P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | depth |
|---|---|
| 0 | 0 |
| 1 | 1 |
| 2 | 2 |
| 3 | 3 |
| 4 | 3 |
| 5 | 2 |
| 6 | 1 |
| 7 | 2 |
| 8 | 1 |
| 9 | 2 |
| 10 | 3 |
| 11 | 3 |

| | depth-aggr |
|---|---|
| 0 | 1 |
| 1 | *2->3* |
| 2 | 6 |
| 3 | 10 |
| 4 | 12 |

CONVERSION DEFINITION OF "No."

| | |
|---|---|
| 0 | 0 |
| 1 | 1 |
| 2 | 4 |
| 3 | 8 |
| 4 | 9 |
| 5 | 5 |
| 6 | *-->2* |
| 7 | - |
| 8 | - |
| 9 | - |
| 10 | - |
| 11 | - |

Fig.26C PROCEDURE 8

DEPTH-FIRST EXPRESSION BASED ON CHILD→PARENT

| | C->P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | depth |
|---|---|
| 0 | 0 |
| 1 | 1 |
| 2 | 2 |
| 3 | 3 |
| 4 | 3 |
| 5 | 2 |
| 6 | 1 |
| 7 | 2 |
| 8 | 1 |
| 9 | 2 |
| 10 | 3 |
| 11 | 3 |

| | depth-aggr |
|---|---|
| 0 | 1 |
| 1 | 3 |
| 2 | *6->7* |
| 3 | 10 |
| 4 | 12 |

CONVERSION DEFINITION OF "No."

| | |
|---|---|
| 0 | 0 |
| 1 | 1 |
| 2 | 4 |
| 3 | 8 |
| 4 | 9 |
| 5 | 5 |
| 6 | 2 |
| 7 | *-->6* |
| 8 | - |
| 9 | - |
| 10 | - |
| 11 | - |

Fig.27A PROCEDURE 9

DEPTH-FIRST EXPRESSION BASED ON CHILD→PARENT

| | C→P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | depth |
|---|---|
| 0 | 0 |
| 1 | 1 |
| 2 | 2 |
| 3 | 3 |
| 4 | 3 |
| 5 | 2 |
| 6 | 1 |
| 7 | 2 |
| 8 | 1 |
| 9 | 2 |
| 10 | 3 |
| 11 | 3 |

| | depth-aggr |
|---|---|
| 0 | 1 |
| 1 | *3->4* |
| 2 | 7 |
| 3 | 10 |
| 4 | 12 |

CONVERSION DEFINITION OF "No."

| | |
|---|---|
| 0 | 0 |
| 1 | 1 |
| 2 | 4 |
| 3 | 8 |
| 4 | 9 |
| 5 | 5 |
| 6 | 2 |
| 7 | 6 |
| 8 | *-->3* |
| 9 | - |
| 10 | - |
| 11 | - |

Fig.27B PROCEDURE 10

DEPTH-FIRST EXPRESSION BASED ON CHILD→PARENT

| | C→P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | depth |
|---|---|
| 0 | 0 |
| 1 | 1 |
| 2 | 2 |
| 3 | 3 |
| 4 | 3 |
| 5 | 2 |
| 6 | 1 |
| 7 | 2 |
| 8 | 1 |
| 9 | 2 |
| 10 | 3 |
| 11 | 3 |

| | depth-aggr |
|---|---|
| 0 | 1 |
| 1 | 4 |
| 2 | *7->8* |
| 3 | 10 |
| 4 | 12 |

CONVERSION DEFINITION OF "No."

| | |
|---|---|
| 0 | 0 |
| 1 | 1 |
| 2 | 4 |
| 3 | 8 |
| 4 | 9 |
| 5 | 5 |
| 6 | 2 |
| 7 | 6 |
| 8 | 3 |
| 9 | *-->7* |
| 10 | - |
| 11 | - |

Fig.27C PROCEDURE 11

DEPTH-FIRST EXPRESSION BASED ON CHILD→PARENT

| | C→P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | depth |
|---|---|
| 0 | 0 |
| 1 | 1 |
| 2 | 2 |
| 3 | 3 |
| 4 | 3 |
| 5 | 2 |
| 6 | 1 |
| 7 | 2 |
| 8 | 1 |
| 9 | 2 |
| 10 | 3 |
| 11 | 3 |

| | depth-aggr |
|---|---|
| 0 | 1 |
| 1 | 4 |
| 2 | 8 |
| 3 | *10->11* |
| 4 | 12 |

CONVERSION DEFINITION OF "No."

| | |
|---|---|
| 0 | 0 |
| 1 | 1 |
| 2 | 4 |
| 3 | 8 |
| 4 | 9 |
| 5 | 5 |
| 6 | 2 |
| 7 | 6 |
| 8 | 3 |
| 9 | 7 |
| 10 | *->10* |
| 11 | - |

Fig.28

PROCEDURE 12

| DEPTH-FIRST EXPRESSION BASED ON CHILD→PARENT | | depth | | depth-aggr | | CONVERSION DEFINITION OF "No." | |
|---|---|---|---|---|---|---|---|
| | C→P | | | | | | |
| 0 | -1 | 0 | 0 | 0 | 1 | 0 | 0 |
| 1 | 0 | 1 | 1 | 1 | 4 | 1 | 1 |
| 2 | 1 | 2 | 2 | 2 | 8 | 2 | 4 |
| 3 | 2 | 3 | 3 | 3 | 11->12 | 3 | 8 |
| 4 | 2 | 4 | 3 | 4 | 12 | 4 | 9 |
| 5 | 1 | 5 | 2 | | | 5 | 5 |
| 6 | 0 | 6 | 1 | | | 6 | 2 |
| 7 | 6 | 7 | 2 | | | 7 | 6 |
| 8 | 0 | 8 | 1 | | | 8 | 3 |
| 9 | 8 | 9 | 2 | | | 9 | 7 |
| 10 | 9 | 10 | 3 | | | 10 | 10 |
| 11 | 9 | 11 | 3 | | | 11 | ->11 |

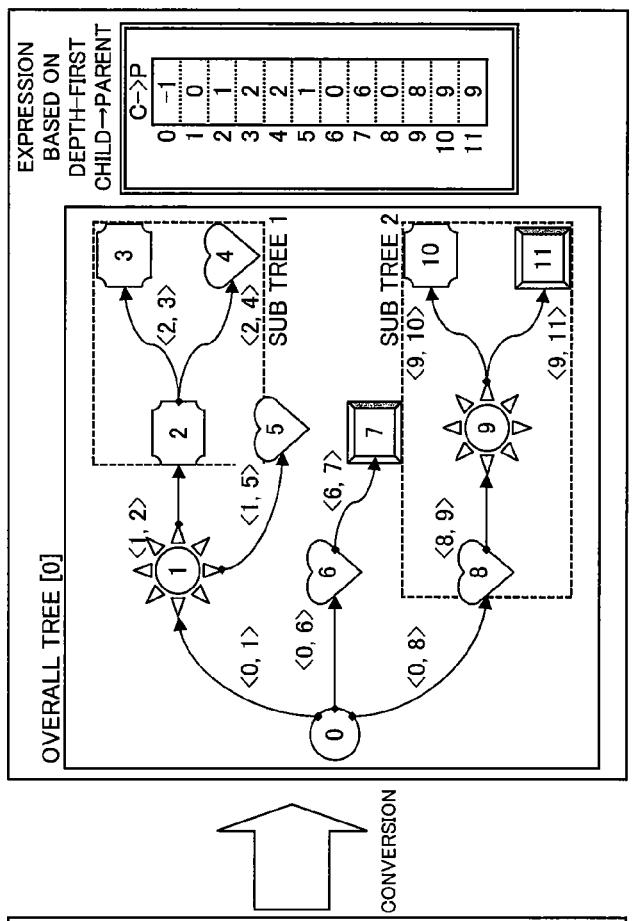
Fig.30B
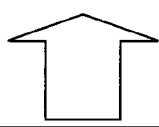
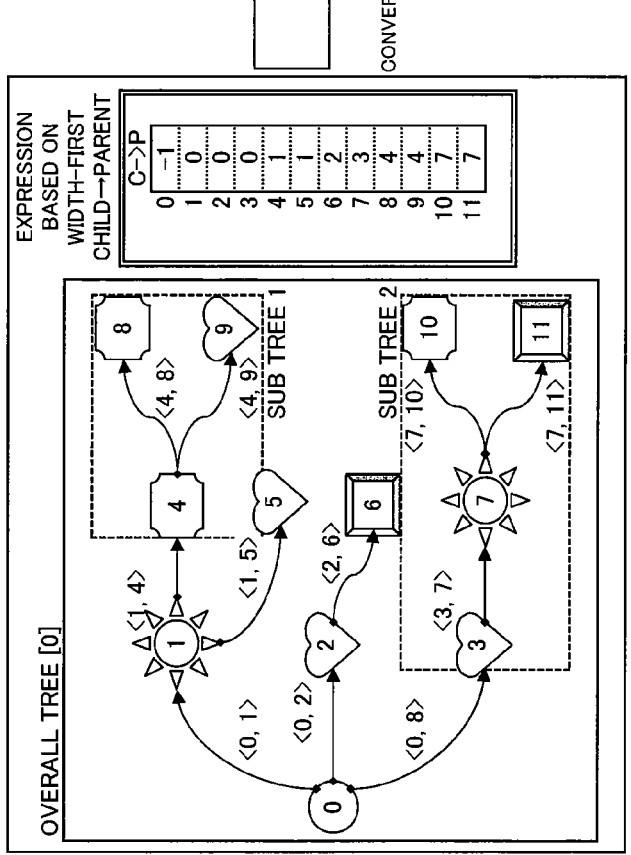
Fig.30A

Fig.32

| | EXPRESSION BASED ON WIDTH-FIRST CHILD→PARENT | | NODE NUMBER ARRAY | |
|---|---|---|---|---|
| | | C→P | | |
| | 0 | -1 | 0 | 1 |
| | 1 | 0 | 1 | 1 |
| | 2 | 0 | 2 | 1 |
| | 3 | 0 | 3 | 1 |
| | 4 | 1 | 4 | 1 |
| | 5 | 1 | 5 | 1 |
| | 6 | 2 | 6 | 1 |
| | 7 | 3 | 7 | 1 |
| | 8 | 4 | 8 | 1 |
| | 9 | 4 | 9 | 1 |
| | 10 | 7 | 10 | 1 |
| | 11 | 7 | 11 | 1 |

Fig.37A
PROCEDURE 1
EXPRESSION BASED ON
WIDTH-FIRST
CHILD→PARENT

| | C→P | | CONVERSION ARRAY | CURRENT_NO | STACK_POS | | STACK | |
|---|---|---|---|---|---|---|---|---|
| ① → 0 | -1 | ③ 0 | -1→0 | ③ 0→1 | ② 0→1 | 0 | -→0 | ② |
| 1 | 0 | 1 | -1 | | | 1 | - | |
| 2 | 0 | 2 | -1 | | | 2 | - | |
| 3 | 0 | 3 | -1 | | | 3 | - | |
| 4 | 1 | 4 | -1 | | | 4 | - | |
| 5 | 1 | 5 | -1 | | | | | |
| 6 | 2 | 6 | -1 | | | | | |
| 7 | 3 | 7 | -1 | | | | | |
| 8 | 4 | 8 | -1 | | | | | |
| 9 | 4 | 9 | -1 | | | | | |
| 10 | 7 | 10 | -1 | | | | | |
| 11 | 7 | 11 | -1 | | | | | |

Fig.37B
PROCEDURE 2
EXPRESSION BASED ON
WIDTH-FIRST
CHILD→PARENT

| | C→P | | CONVERSION ARRAY | CURRENT_NO | STACK_POS | | STACK | |
|---|---|---|---|---|---|---|---|---|
| 0 | -1 | 0 | 0 | ③ 1→2 | ② 1→2 | 0 | 0 | |
| ① → 1 | 0 | ③ 1 | -1→1 | | | 1 | -→1 | ② |
| 2 | 0 | 2 | -1 | | | 2 | - | |
| 3 | 0 | 3 | -1 | | | 3 | - | |
| 4 | 1 | 4 | -1 | | | 4 | - | |
| 5 | 1 | 5 | -1 | | | | | |
| 6 | 2 | 6 | -1 | | | | | |
| 7 | 3 | 7 | -1 | | | | | |
| 8 | 4 | 8 | -1 | | | | | |
| 9 | 4 | 9 | -1 | | | | | |
| 10 | 7 | 10 | -1 | | | | | |
| 11 | 7 | 11 | -1 | | | | | |

Fig.37C
PROCEDURE 3
EXPRESSION BASED ON
WIDTH-FIRST
CHILD→PARENT

| | C→P | | CONVERSION ARRAY | CURRENT_NO | STACK_POS | | STACK | |
|---|---|---|---|---|---|---|---|---|
| 0 | -1 | 0 | 0 | ③ 2→3 | ② 2→3 | 0 | 0 | |
| 1 | 0 | 1 | 1 | | | 1 | 1 | |
| 2 | 0 | 2 | -1 | | ② | 2 | -→4 | |
| 3 | 0 | 3 | -1 | | | 3 | - | |
| ① → 4 | 1 | ③ 4 | -1→2 | | | 4 | - | |
| 5 | 1 | 5 | -1 | | | | | |
| 6 | 2 | 6 | -1 | | | | | |
| 7 | 3 | 7 | -1 | | | | | |
| 8 | 4 | 8 | -1 | | | | | |
| 9 | 4 | 9 | -1 | | | | | |
| 10 | 7 | 10 | -1 | | | | | |
| 11 | 7 | 11 | -1 | | | | | |

Fig.38A

PROCEDURE 4
EXPRESSION BASED ON WIDTH-FIRST CHILD→PARENT

| C→P |
|---|
| 0: -1 |
| 1: 0 |
| 2: 0 |
| 3: 0 |
| 4: 1 |
| 5: 1 |
| 6: 2 |
| 7: 3 |
| ① ⇒ 8: 4 |
| 9: 4 |
| 10: 7 |
| 11: 7 |

CONVERSION ARRAY

| |
|---|
| 0: 0 |
| 1: 1 |
| 2: -1 |
| 3: -1 |
| 4: 2 |
| 5: -1 |
| 6: -1 |
| 7: -1 |
| ③ 8: -1→3 |
| 9: -1 |
| 10: -1 |
| 11: -1 |

CURRENT_NO: ③ 3→4

STACK_POS: ② 3→4

STACK

| |
|---|
| 0: 0 |
| 1: 1 |
| 2: 4 |
| ② 3: —>8 |
| 4: - |

Fig.38B

PROCEDURE 5
EXPRESSION BASED ON WIDTH-FIRST CHILD→PARENT

| C→P |
|---|
| 0: -1 |
| 1: 0 |
| 2: 0 |
| 3: 0 |
| 4: 1 |
| 5: 1 |
| 6: 2 |
| 7: 3 |
| 8: 4 |
| 9: 4 |
| 10: 7 |
| 11: 7 |

CONVERSION ARRAY

| |
|---|
| 0: 0 |
| 1: 1 |
| 2: -1 |
| 3: -1 |
| 4: 2 |
| 5: -1 |
| 6: -1 |
| 7: -1 |
| 8: 3 |
| 9: -1 |
| 10: -1 |
| 11: -1 |

CURRENT_NO: 4

STACK_POS: ① 4→3

STACK

| |
|---|
| 0: 0 |
| 1: 1 |
| 2: 4 |
| ① 3: ~~8~~ |
| 4: - |

Fig.38C

PROCEDURE 6
EXPRESSION BASED ON WIDTH-FIRST CHILD→PARENT

| C→P |
|---|
| 0: -1 |
| 1: 0 |
| 2: 0 |
| 3: 0 |
| 4: 1 |
| 5: 1 |
| 6: 2 |
| 7: 3 |
| 8: 4 |
| ① ⇒ 9: 4 |
| 10: 7 |
| 11: 7 |

CONVERSION ARRAY

| |
|---|
| 0: 0 |
| 1: 1 |
| 2: -1 |
| 3: -1 |
| 4: 2 |
| 5: -1 |
| 6: -1 |
| 7: -1 |
| 8: 3 |
| ③ 9: -1→4 |
| 10: -1 |
| 11: -1 |

CURRENT_NO: ③ 4→5

STACK_POS: ② 3→4

STACK

| |
|---|
| 0: 0 |
| 1: 1 |
| 2: 4 |
| ② 3: -->9 |
| 4: - |

Fig.39A PROCEDURE 7 EXPRESSION BASED ON WIDTH-FIRST CHILD→PARENT

| C→P | | CONVERSION ARRAY | | CURRENT_NO | STACK_POS | STACK | |
|---|---|---|---|---|---|---|---|
| 0 | -1 | 0 | 0 | 5 | ① 4→3 | 0 | 0 |
| 1 | 0 | 1 | 1 | | | 1 | 1 |
| 2 | 0 | 2 | -1 | | | 2 | 4 |
| 3 | 0 | 3 | -1 | | ① | 3 | ~~0~~ |
| 4 | 1 | 4 | 2 | | | 4 | - |
| 5 | 1 | 5 | -1 | | | | |
| 6 | 2 | 6 | -1 | | | | |
| 7 | 3 | 7 | -1 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.39B PROCEDURE 8 EXPRESSION BASED ON WIDTH-FIRST CHILD→PARENT

| C→P | | CONVERSION ARRAY | | CURRENT_NO | STACK_POS | STACK | |
|---|---|---|---|---|---|---|---|
| 0 | -1 | 0 | 0 | 5 | ① 3→2 | 0 | 0 |
| 1 | 0 | 1 | 1 | | | 1 | 1 |
| 2 | 0 | 2 | -1 | | ① | 2 | ~~4~~ |
| 3 | 0 | 3 | -1 | | | 3 | - |
| 4 | 1 | 4 | 2 | | | 4 | - |
| 5 | 1 | 5 | -1 | | | | |
| 6 | 2 | 6 | -1 | | | | |
| 7 | 3 | 7 | -1 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.39C PROCEDURE 9 EXPRESSION BASED ON WIDTH-FIRST CHILD→PARENT

| C→P | | CONVERSION ARRAY | | CURRENT_NO | STACK_POS | STACK | |
|---|---|---|---|---|---|---|---|
| 0 | -1 | 0 | 0 | ③ 5→6 | ② 2→3 | 0 | 0 |
| 1 | 0 | 1 | 1 | | | 1 | 1 |
| 2 | 0 | 2 | -1 | | ② | 2 | -→5 |
| 3 | 0 | 3 | -1 | | | 3 | - |
| 4 | 1 | 4 | 2 | | | 4 | - |
| ① ⇒ 5 | 1 | ③ 5 | -1→5 | | | | |
| 6 | 2 | 6 | -1 | | | | |
| 7 | 3 | 7 | -1 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.40A PROCEDURE 10 EXPRESSION BASED ON WIDTH-FIRST CHILD→PARENT

| | C→P | | CONVERSION ARRAY | CURRENT_NO | STACK_POS | | STACK |
|---|---|---|---|---|---|---|---|
| 0 | -1 | 0 | 0 | 5 | ① 3->2 | 0 | 0 |
| 1 | 0 | 1 | 1 | | | 1 | 1 |
| 2 | 0 | 2 | -1 | | ① | 2 | ~~5~~ |
| 3 | 0 | 3 | -1 | | | 3 | — |
| 4 | 1 | 4 | 2 | | | 4 | — |
| 5 | 1 | 5 | 5 | | | | |
| 6 | 2 | 6 | -1 | | | | |
| 7 | 3 | 7 | -1 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.40B PROCEDURE 11 EXPRESSION BASED ON WIDTH-FIRST CHILD→PARENT

| | C→P | | CONVERSION ARRAY | CURRENT_NO | STACK_POS | | STACK |
|---|---|---|---|---|---|---|---|
| 0 | -1 | 0 | 0 | 5 | ① 2->1 | 0 | 0 |
| 1 | 0 | 1 | 1 | | ① | 1 | ~~1~~ |
| 2 | 0 | 2 | -1 | | | 2 | — |
| 3 | 0 | 3 | -1 | | | 3 | — |
| 4 | 1 | 4 | 2 | | | 4 | — |
| 5 | 1 | 5 | 5 | | | | |
| 6 | 2 | 6 | -1 | | | | |
| 7 | 3 | 7 | -1 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.40C PROCEDURE 12 EXPRESSION BASED ON WIDTH-FIRST CHILD→PARENT

| | C→P | | CONVERSION ARRAY | CURRENT_NO | STACK_POS | | STACK |
|---|---|---|---|---|---|---|---|
| 0 | -1 | 0 | 0 | ③ 6->7 | ② 1->2 | 0 | 0 |
| 1 | 0 | 1 | 1 | | ② | 1 | -->2 |
| ① 2 | 0 | ③ 2 | -1->6 | | | 2 | — |
| 3 | 0 | 3 | -1 | | | 3 | — |
| 4 | 1 | 4 | 2 | | | 4 | — |
| 5 | 1 | 5 | 5 | | | | |
| 6 | 2 | 6 | -1 | | | | |
| 7 | 3 | 7 | -1 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.41A

PROCEDURE 13
EXPRESSION BASED ON WIDTH-FIRST CHILD→PARENT

| | C→P |
|---|---|
| 0 | -1 |
| 1 | 0 |
| 2 | 0 |
| 3 | 0 |
| 4 | 1 |
| 5 | 1 |
| ①→ 6 | 2 |
| 7 | 3 |
| 8 | 4 |
| 9 | 4 |
| 10 | 7 |
| 11 | 7 |

CONVERSION ARRAY

| | |
|---|---|
| 0 | 0 |
| 1 | 1 |
| 2 | 6 |
| 3 | -1 |
| 4 | 2 |
| 5 | 5 |
| ③ 6 | -1→7 |
| 7 | -1 |
| 8 | 3 |
| 9 | 4 |
| 10 | -1 |
| 11 | -1 |

CURRENT_NO: ③ 7→8

STACK_POS: ② 2→3

STACK

| | |
|---|---|
| 0 | 0 |
| 1 | 2 |
| ② 2 | -→6 |
| 3 | — |
| 4 | — |

Fig.41B

PROCEDURE 14
EXPRESSION BASED ON WIDTH-FIRST CHILD→PARENT

| | C→P |
|---|---|
| 0 | -1 |
| 1 | 0 |
| 2 | 0 |
| 3 | 0 |
| 4 | 1 |
| 5 | 1 |
| 6 | 2 |
| 7 | 3 |
| 8 | 4 |
| 9 | 4 |
| 10 | 7 |
| 11 | 7 |

CONVERSION ARRAY

| | |
|---|---|
| 0 | 0 |
| 1 | 1 |
| 2 | 6 |
| 3 | -1 |
| 4 | 2 |
| 5 | 5 |
| 6 | 7 |
| 7 | -1 |
| 8 | 3 |
| 9 | 4 |
| 10 | -1 |
| 11 | -1 |

CURRENT_NO: 8

STACK_POS: ① 3→2

STACK

| | |
|---|---|
| 0 | 0 |
| 1 | 2 |
| ① 2 | ~~6~~ |
| 3 | — |
| 4 | — |

Fig.41C

PROCEDURE 15
EXPRESSION BASED ON WIDTH-FIRST CHILD→PARENT

| | C→P |
|---|---|
| 0 | -1 |
| 1 | 0 |
| 2 | 0 |
| 3 | 0 |
| 4 | 1 |
| 5 | 1 |
| 6 | 2 |
| 7 | 3 |
| 8 | 4 |
| 9 | 4 |
| 10 | 7 |
| 11 | 7 |

CONVERSION ARRAY

| | |
|---|---|
| 0 | 0 |
| 1 | 1 |
| 2 | 6 |
| 3 | -1 |
| 4 | 2 |
| 5 | 5 |
| 6 | 7 |
| 7 | -1 |
| 8 | 3 |
| 9 | 4 |
| 10 | -1 |
| 11 | -1 |

CURRENT_NO: 8

STACK_POS: ① 2→1

STACK

| | |
|---|---|
| 0 | 0 |
| ① 1 | ~~2~~ |
| 2 | — |
| 3 | — |
| 4 | — |

Fig.42A

PROCEDURE 16
EXPRESSION BASED ON WIDTH-FIRST CHILD→PARENT

| C->P | | CONVERSION ARRAY | | CURRENT_NO | STACK_POS | STACK | |
|---|---|---|---|---|---|---|---|
| 0 | -1 | 0 | 0 | ③ 8->9 | ② 1->2 | 0 | 0 |
| 1 | 0 | 1 | 1 | | | 1 | -->3 |
| 2 | 0 | 2 | 6 | | | 2 | - |
| ①→ 3 | 0 | ③ 3 | -1->8 | | | 3 | - |
| 4 | 1 | 4 | 2 | | | 4 | - |
| 5 | 1 | 5 | 5 | | | | |
| 6 | 2 | 6 | 7 | | | | |
| 7 | 3 | 7 | -1 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.42B

PROCEDURE 17
EXPRESSION BASED ON WIDTH-FIRST CHILD→PARENT

| C->P | | CONVERSION ARRAY | | CURRENT_NO | STACK_POS | STACK | |
|---|---|---|---|---|---|---|---|
| 0 | -1 | 0 | 0 | ③ 9->10 | ② 2->3 | 0 | 0 |
| 1 | 0 | 1 | 1 | | | 1 | 3 |
| 2 | 0 | 2 | 6 | | | 2 | -->7 |
| 3 | 0 | 3 | 8 | | | 3 | - |
| 4 | 1 | 4 | 2 | | | 4 | - |
| 5 | 1 | 5 | 5 | | | | |
| 6 | 2 | 6 | 7 | | | | |
| ①→ 7 | 3 | ③ 7 | -1->9 | | | | |
| 8 | 4 | 8 | 3 | | | | |
| 9 | 4 | 9 | 4 | | | | |
| 10 | 7 | 10 | -1 | | | | |
| 11 | 7 | 11 | -1 | | | | |

Fig.42C

PROCEDURE 18
EXPRESSION BASED ON WIDTH-FIRST CHILD→PARENT

| C->P | | CONVERSION ARRAY | | CURRENT_NO | STACK_POS | STACK | |
|---|---|---|---|---|---|---|---|
| 0 | -1 | 0 | 0 | ③ 10->11 | ② 3->4 | 0 | 0 |
| 1 | 0 | 1 | 1 | | | 1 | 3 |
| 2 | 0 | 2 | 6 | | | 2 | 7 |
| 3 | 0 | 3 | 8 | | | 3 | -->10 |
| 4 | 1 | 4 | 2 | | | 4 | - |
| 5 | 1 | 5 | 5 | | | | |
| 6 | 2 | 6 | 7 | | | | |
| 7 | 3 | 7 | 8 | | | | |
| 8 | 4 | 8 | 3 | | | | |
| 9 | 4 | 9 | 4 | | | | |
| ①→ 10 | 7 | ③ 10 | -1->10 | | | | |
| 11 | 7 | 11 | -1 | | | | |

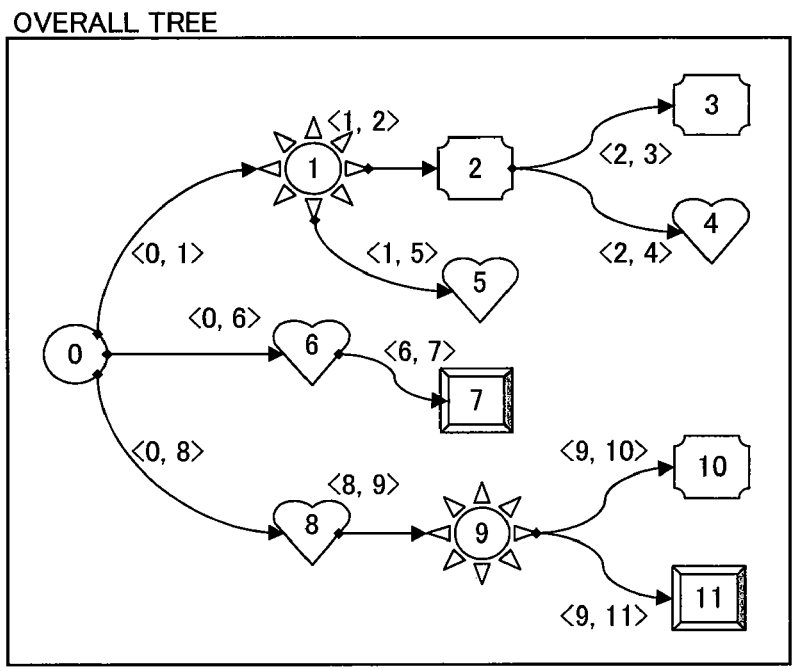
Fig.45A OVERALL TREE
Fig.45B EXPRESSION BASED ON CHILD→PARENT
Fig.45C EXPRESSION BASED ON PARENT→CHILD

Fig.46A
PROCEDURE 1: RESERVATION OF AREA AND INITIALIZATION

EXPRESSION BASED ON CHILD→PARENT

| | C->P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | Aggr |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |

| | P->C |
|---|---|
| 0 | -1 |
| 1 | -1 |
| 2 | -1 |
| 3 | -1 |
| 4 | -1 |
| 5 | -1 |
| 6 | -1 |
| 7 | -1 |
| 8 | -1 |
| 9 | -1 |
| 10 | -1 |

Fig.46B
PROCEDURE 2: COUNT OF EXISTENCE NUMBER

EXPRESSION BASED ON CHILD→PARENT

| | C->P |
|---|---|
| 0 | (-1) → X |
| 1 | (0) |
| 2 | (1) |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | Aggr |
|---|---|
| 0 | 0->1 |
| 1 | 0->1 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |

| | P->C |
|---|---|
| 0 | -1 |
| 1 | -1 |
| 2 | -1 |
| 3 | -1 |
| 4 | -1 |
| 5 | -1 |
| 6 | -1 |
| 7 | -1 |
| 8 | -1 |
| 9 | -1 |
| 10 | -1 |

⇒ COMPLETION OF COUNT-UP ⇒

| | Aggr |
|---|---|
| 0 | 3 |
| 1 | 2 |
| 2 | 2 |
| 3 | 0 |
| 4 | 0 |
| 5 | 0 |
| 6 | 1 |
| 7 | 0 |
| 8 | 1 |
| 9 | 2 |
| 10 | 0 |
| 11 | 0 |

| | P->C |
|---|---|
| 0 | -1 |
| 1 | -1 |
| 2 | -1 |
| 3 | -1 |
| 4 | -1 |
| 5 | -1 |
| 6 | -1 |
| 7 | -1 |
| 8 | -1 |
| 9 | -1 |
| 10 | -1 |

Fig.46C
PROCEDURE 3: CONVERSION OF EXISTENCE NUMBER TO ACCUMULATIVE TOTAL

EXPRESSION BASED ON CHILD→PARENT

| | C->P |
|---|---|
| 0 | -1 |
| 1 | 0 |
| 2 | 1 |
| 3 | 2 |
| 4 | 2 |
| 5 | 1 |
| 6 | 0 |
| 7 | 6 |
| 8 | 0 |
| 9 | 8 |
| 10 | 9 |
| 11 | 9 |

| | Aggr |
|---|---|
| 0 | (3) |
| 1 | (2) |
| 2 | 2 |
| 3 | 0 |
| 4 | 0 |
| 5 | 0 |
| 6 | 1 |
| 7 | 0 |
| 8 | 1 |
| 9 | 2 |
| 10 | 0 |
| 11 | 0 |

| | Aggr |
|---|---|
| 0 | 0 |
| 1 | 3 |
| 2 | 5 |
| 3 | 7 |
| 4 | 7 |
| 5 | 7 |
| 6 | 7 |
| 7 | 8 |
| 8 | 8 |
| 9 | 9 |
| 10 | 11 |
| 11 | 11 |

| | P->C |
|---|---|
| 0 | -1 |
| 1 | -1 |
| 2 | -1 |
| 3 | -1 |
| 4 | -1 |
| 5 | -1 |
| 6 | -1 |
| 7 | -1 |
| 8 | -1 |
| 9 | -1 |
| 10 | -1 |

PROCEDURE 4: TRANSMISSION OF NODE NUMBER

PROCEDURE 5: RETURN OF ARRAY Aggr TO STATE BEFORE NODE NUMBER IS TRANSFERRED

CONVERSION RESULT

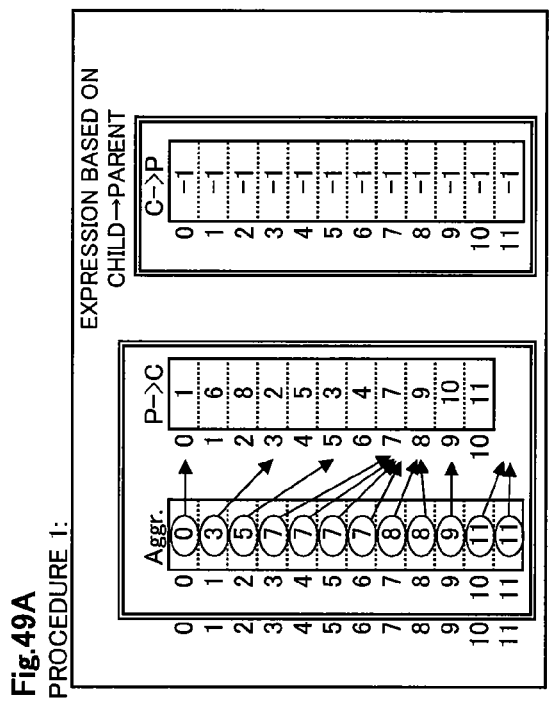
Fig.49A PROCEDURE 1:
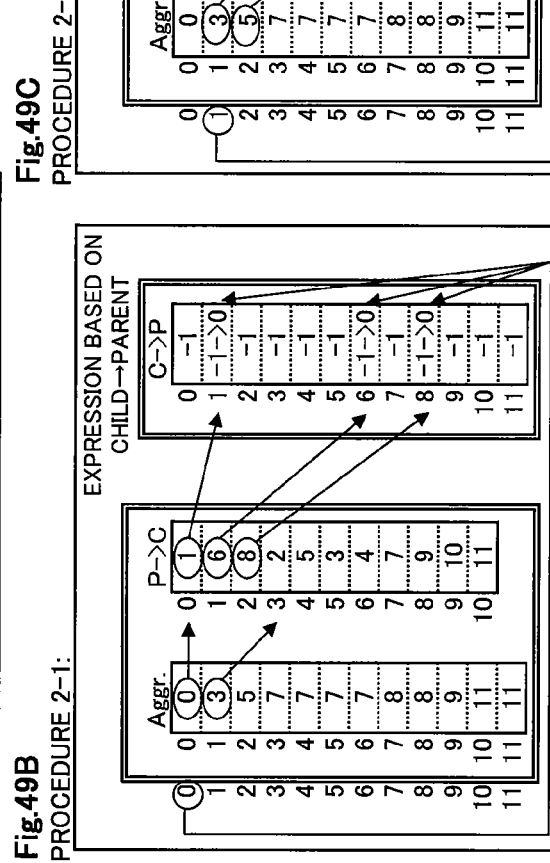
Fig.49B PROCEDURE 2-1:
Fig.49C PROCEDURE 2-2:
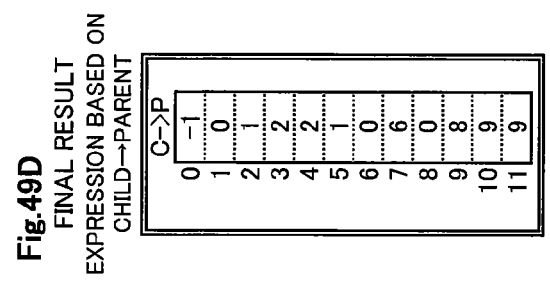
Fig.49D FINAL RESULT EXPRESSION BASED ON CHILD→PARENT

METHOD FOR HANDLING TREE-TYPE DATA STRUCTURE, INFORMATION PROCESSING DEVICE, AND PROGRAM

TECHNICAL FIELD

The present invention relates to a method of treating a tree type data structure, and particularly to a method of expressing a tree type data structure, building the tree type data structure on a storage device or changing the tree type data structure. Furthermore, the invention relates to an information processing device for carrying out the method. Still furthermore, the invention relates to a program for executing the method and a recording medium having the program recorded therein.

BACKGROUND ART

A database is used in various kinds of applications, and a relational database (RDB) from which logical inconsistency can be excluded has been mainly used in a medium-scale or large-scale system. For example, RDB is used in systems for airplane seat reservation, etc. In this case, by indicating a key item, a target (one target in many cases) can be quickly searched for, or a reservation can be settled, canceled or changed. Furthermore, each airplane has several hundreds seats at most, and thus the number of empty seats of a specific airplane can be determined.

It is known that RDB as described above is suitable for treatment of tabular data, however, it is not suitable for treatment of tree type data (for example, see non-patent document 1).

Furthermore, there exist some applications which are more suitable for the expression based on the tree type than the expression based on the table type. Particularly, XML adopting a tree type data structure as the standard of data for applications of Intranet or Internet has recently prevailed (see non-patent document 2 for the details of XML, for example).

However, treatment of the tree type data structure, for example, search of tree type data generally has a very low efficiency. A first reason for the low efficiency resides in the fact that data exist in distributed nodes at various locations, and thus it is difficult to quickly specify the location at which data exists. In RDB, for example, data of "age" are stored in only an item of "age" of some tables. However, in the tree type data structure, nodes for holding data of "age" are scattered at various locations, and thus it is general that the corresponding data cannot be searched for unless the overall tree type data structure is checked.

A second reason for the low efficiency resides in the fact that it takes much time to express a search result. In order to express a group of nodes hit in the search, the nodes corresponding to descendent nodes of the node of interest must be often expressed. However, the data structure is ad hoc unlike RDBMS, and thus it takes much time to express the descendant nodes.

Therefore, in order to take advantage of RDB prevailing as the database, there have been proposed methods for constructing tree type data in the form of RDB when the tree type data structure is built in the form of a database (see patent document 1, for example). In RDB, data are decomposed and held in a table (tabular form). Therefore, in order to construct the actual tree type data in the form of RDB, it is necessary to pack the tree type data into the table. However, in order to treat various kinds of tree type data structures, data must be individually packed into the table for each structure, and a system design is made. Accordingly, it is a very complicated task to build the system based on RDB.

Furthermore, there has been proposed a method of constructing tree type data, particularly XML data in the form of a database while keeping the data structure thereof. In the case of the tree type data structure, descendent nodes can be subject to one node, and various expressions can be performed. Therefore, the labor of the system design can be greatly reduced. Accordingly, it has been more strongly required to treat the tree structure data by using as a core a technique which can treat a tree structure like XML.

As an approach to the method of constructing XML data in the form of a database while keeping its form, a copy of data written in a tree structure is taken out, and for example in the case of an item "age", index data for searching for "age" are separately held (for example, see patent document 2). Accordingly, the merit of XML data that an attribute can be added to the data itself can be sufficiently actively used, and the relational structure of the respective items expressed by using tags can be directly stored.

[Patent Document 1] JP-A-2003-248615
[Patent Document 2] JP-A-2001-195406
[Non-patent Document 1] SEC Co., Ltd., "Karearea White Paper", [online], [searched on Feb. 19, 2004], Internet <URL: http://wwww.sec.co.jp/products/karearea/>
[Non-patent Document 2] W3C, "Extensible Markup Language (XML)) 1.0 (Third Edition)", [online], Feb. 4, 2004, [searched on Feb. 19, 2004], Internet <URL:http://www.w3.org/TR/2004/REC-xml-20040204/>

DISCLOSURE OF THE INVENTION

[Problem to be solved by the Invention]

However, such an approach that index data for search are separately held is disadvantageous in holding large-scale data because at least data are doubly held and also a cost for creating indexes and a data area for storing the indexes are required.

Actually, even when a search is actually carried out to specify a node, it takes much time to express the node. Furthermore, this mechanism is unusable for a search in terms of a relationship between nodes (for example, extraction of a tree containing "age" of "sixty years old" for an ancestor node and containing "age" of "one year old" for a descendent node).

The fundamental problem of the prior art as described above resides in that since a tree type data structure is expressed by paying attention to only individual data and connecting respective nodes storing data through pointers, the relationship between the data, for example, the relationship such as parent-child, ancestor, descendant, brother (sibling), generation, etc. cannot be efficiently traced. In other words, the pointer is used in only the application that it indicates a storage address of data because the value of the pointer is not fixed, and thus it cannot directly express the relationship between data.

Therefore, it is an object of the present invention is to provide a method of expressing, building and changing a tree type data structure that can efficiently trace a relationship between data in a tree type data structure.

Furthermore, it is an object of the invention to provide an information processing device for building and changing a tree type data structure that can efficiently trace a relationship between data in a tree type data structure.

Still furthermore, it is an object of the invention to provide a program of expressing, building and changing a tree type data structure that can efficiently trace a relationship between data in a tree type data structure.

Still furthermore, it is an object of the invention to provide a recording medium having a program recorded thereon for expressing, building and changing the tree type data structure described above.

[Means of Solving the Problem]

In order to attain the above object, the principle of the invention resides in that the parent-child relationship between nodes building a tree type data structure is expressed not by a "parent→child" relationship which associates a parent node with a child node, but by a "child→parent" relationship which associates the child node with the parent node.

When the parent-child relationship is expressed by the "parent→child" relationship, the parent-child relationship cannot be defined unless two elements of the parent node and the child node are specified because there is a case where a plurality of child nodes is associated with one parent node. That is, even when the parent node is specified, the child nodes having the parent-child relationship with the parent node cannot be specified.

On the other hand, when the parent-child relationship is expressed by the "child→parent" relationship, one child node has necessarily a unique parent node, and thus by specifying the child node, the unique parent node corresponding to the child node can be quickly specified.

Therefore, according to the invention, a method of expressing a parent-child relationship between nodes constituting a tree type data structure on a storage device, the parent-child relationship between the nodes is expressed by associating non-root nodes corresponding to the nodes other than a root node with the parent node of each non-root node. Accordingly, topology of a tree can be expressed by tracking a list including the child nodes and the parent nodes expressed by the "child→parent" relationship.

According to the invention, a method of building a tree type data structure on a storage device comprises:

a node defining step of providing unique node identifiers to nodes including root nodes; and a parent-child relationship defining step of associating the node identifiers assigned to non-root nodes corresponding to the nodes other than the root node with the node identifier assigned to parent nodes of the non-root nodes. As described above, the node identifier is first provided to the node by any identification information such as a character string, a floating point number, an integer or the like, and then the parent-child relationship is defined on the basis of the "child→parent" expression, whereby the node identifier of the parent node is drawn (looked up) from the node identifier of the child node, whereby topology of a tree can be expressed.

In the above method, in the node defining step, a numerical value is used as the node identifier. Particularly by expressing the node identifier with the numerical value, a storage address of the node identifier of the parent can be easily specified. Therefore, the node identifier of the parent can be simply looked up from the node identifier of the child.

According to the above method, in the node defining step, sequential integers are used as the node identifier. By expressing the node identifier with sequential integers, an address at which the node identifier of the parent node corresponding to the node is stored can be simply achieved from the node identifier. The processing speed of drawing the node identifier of the parent node from the node identifier of the child node can be increased.

According to a preferable embodiment, the node identifier is expressed by sequential numbers of integers from 0 or 1.

In the method of building the tree type data structure on the storage device, the parent-child relationship among the nodes can be expressed by an array of the parent nodes associated to each of the non-root node. As a result, by using the array, a processing speed of looking up the parent node from the child node can be increased.

In the parent-child relationship defining step, the array of the node identifiers assigned to the parent nodes associated to the node identifiers assigned to the respective non-root node may be stored in the storage device. As a result, the addresses at which the node identifiers of the parent nodes are stored can be simply achieved. Therefore, the processing speed of looking up the parent nodes from the child nodes can be increased.

When the parent-child relationship among nodes is implemented by assigning ordered numbers to the nodes of the tree type data structure as the node identifiers, advantageously, a further treatment of the tree type data structure is facilitated by settling a rule for ordering the numbers. According to the invention, a depth-first mode in which each child node of one node is given priority over each node in same generation as the one node, and a width-first mode in which each node in the same generation as the one node is given priority over each child of the one node are used for the rule for ordering the numbers.

Therefore, according to the invention, a method of building a tree type data structure on a storage device comprises:

a node definition step of assigning unique sequential integers to nodes including a root node while giving higher priority to child nodes than same-generation nodes; and a parent-child relationship definition step of arranging, in the order of integers assigned to non-root nodes corresponding to nodes other than the root node, integers assigned to parent nodes of the respective non-root nodes to form an array of the integers and storing the array concerned in the storage device.

Accordingly, the sequential integers are assigned to the nodes in the depth-first, and the parent-child relationship among the nodes is expressed by the array of the "child→parent" relationship. Therefore, there is achieved an excellent property that when the parent-child relationship among the nodes to which the sequential numbers are assigned in the depth-first is expressed by the array on the basis of the "child→parent" relationship, descendant nodes of a given node appear in a continuous region.

As a preferable embodiment of the invention, in the above method, the node definition step comprises:

a step of first assigning a number to the root node;

a step in which when a certain node to which a number has been already assigned has a unique child node, the number next to the number assigned to the node is assigned to the child node of the node; and a step in which when a certain node to which the number has been assigned has a plurality of child nodes, the numbers are assigned to the child nodes from the first child node to the last child node according to a sibling relationship among the plurality of the childe nodes so that the next number is assigned to a subsequent child node after the numbers are assigned to all descendant nodes of a immediately previous child node. Accordingly, the sibling relationship is defined among the plurality of the child nodes originating from the same parent node in the depth-first mode.

Furthermore, according to the invention, a method of building a tree type data structure on a storage device comprises:

a node definition step of assigning unique sequential integers to nodes including a root node while giving higher priority to same-generation nodes than child nodes; and a parent-child relationship definition step of storing into the storage device an array formed by arranging, in the order of integers assigned to non-root node corresponding to nodes other than the root node, integers assigned to parent nodes of the respective non-root nodes. Accordingly, the sequential integers are assigned to the nodes in the width-first mode, and the parent-child relationship of the nodes is expressed by the array of the "child→parent" relationship. There is achieved an excellent property that when the parent-child relationship of nodes to which sequential numbers are assigned in the width-first mode is represented by the array based on the "child→parent" relationship, the numbers assigned to the parent nodes appear in a given order (ascending order or descending order) in the array.

As a preferable embodiment of the invention, in the above method, the node definition step comprises:

a step of determining what generation node each node is from the root node and calculating the number of nodes contained in each generation;

a step of first assigning a number to the root node; and a step in which if numbers are assigned to all the nodes contained in a generation, until there exists no node in the generation concerned, numbers are assigned to all the nodes contained in the next generation in the order of numbers assigned to the parent nodes of the nodes concerned when the parent nodes concerned are different while a sibling relationship is defined among plural child nodes derived from the parent nodes and unique integers sequentially varying from the next number of a immediately previously assigned number are successively assigned to the nodes from the first child node to the last child node when the parent nodes concerned are identical to one another. Accordingly, the sibling relationship among plural child nodes derived from the same parent node is defined in the width-first mode.

In an embodiment of the invention, by using the excellent property of the depth-first mode, the above method further comprises a step of extracting from the array continuous region in which the values above the integer assigned to some node are stored, thereby specifying all the descendant nodes of the node concerned. Accordingly, a node group representing the descendant nodes of some node can be achieved as sequential blocks in the array.

Furthermore, in another embodiment of the invention, by using the excellent property of the width-first mode, the above method further comprise a step of extracting from the array sequential areas where the same value as the integer assigned to some node is stored, thereby specifying all the child nodes of the node concerned. Accordingly, the child nodes of some node can be searched for by binary search, for example, that is, they can be searched for in the order of $O(\log(n))$.

As described above, each of the depth-first mode and the width-first mode for assigning sequential numbers to nodes has an inherent excellent property. Therefore, according to the invention, a method of building a tree type data structure on a storage device comprises:

a step of uniquely assigning sequentially varying integers to all nodes while starting from a root node; and a step of defining a parent-child relationship among nodes, wherein the step of uniquely assigning the integers to all the nodes includes a step of selecting which one of a depth-first mode for assigning numbers to child nodes in preference to same-generation nodes and a width-first mode for assigning numbers to same-generation nodes in preference to child nodes should be used to assign the numbers to the nodes, a step of searching for the nodes in the depth-first when the depth-first mode is selected, and assigning the numbers to the nodes in the search order, and a step of searching the nodes in the width-first mode when the width-first mode is selected, and assigning the numbers to the nodes in the search order, wherein the step of defining the parent-child relationship among the nodes includes a step of storing numbers assigned to the parent nodes corresponding to the child nodes in the order of numbers assigned to the child nodes concerned into the storage device. Accordingly, a node number allocation based on the depth-first mode and a node number allocation based on the width-first mode can be coexistent together in one system. Therefore, a proper expression form can be used in accordance with the situation.

According to the embodiment of the invention, in the above method, the step of defining the parent-child relationship among the nodes comprises:

a step of selecting which one of a child-parent expression mode for defining the relationship from a child node to a parent node and a parent-child expression mode for defining the relationship from a parent node to a child node should be used to define the parent-child relationship;

a step of storing in the storage device numbers assigned to parent nodes corresponding to child nodes in the order of numbers assigned to the child nodes concerned when the child-parent expression mode is selected; and a step of storing in the storage device an array of numbers assigned to child nodes corresponding to parent nodes in the order of numbers assigned to the parent nodes concerned when the parent-child expression mode is selected. Accordingly, the parent-child relationship among nodes expressed by the "child→parent" can be expressed by the "parent→child" relationship. The expression based on the "parent→child" relationship is advantageous when information is exchanged with the external.

As described above, the "child→parent" expression and the "parent→child" expression to express the parent-child relationship and the depth-first mode and the width-first mode to assign numbers to nodes can be selectively used as the expression form of the tree type data structure. Therefore, the invention provides a method for the mutual conversion between different expression forms.

According to the invention, a method of changing an expression form of a tree type data structure represented by using parent-child relationship on a storage device, the parent-child relationship being defined by storing, in the order of numbers assigned to child node, numbers assigned to parent nodes corresponding to the child nodes in the storage device, comprises:

a step of determining the generation of each node of a tree type data structure expressed in a depth-first mode for assigning numbers to nodes while giving higher priority to child nodes than same-generation nodes, and counting the number of nodes belonging to each generation;

a step of determining numbers assigned in each generation when numbers are assigned in a width-first mode for assigning numbers to nodes while giving higher priority to same-generation modes than child nodes a step of creating a conversion array for converting the numbers of the respective nodes to numbers assigned in the width-first mode on the basis of the determined generation of the nodes and the numbers assigned in each generation; and a step of converting the parent-child relationship of each node to the parent-child relationship expressed by the numbers assigned in the width-first mode by using the conversion array. Accordingly, the "child→parent" expression form based on the depth-first mode can be converted to the "child→parent" expression form based on the width-first mode.

According to the invention, a method of changing an expression form of a tree type data structure represented by using parent-child relationship on the storage device, the parent-child relationship being defined by storing, in the order of numbers assigned to child nodes, numbers assigned to parent nodes corresponding to the child nodes in the storage device, comprises:

a step of counting the number of descendants of each node of a tree type data structure expressed in a width-first mode for assigning numbers to nodes while giving higher priority to same-generation nodes than child nodes;

a step of adding the number to be assigned to the parent node with the number of previous child nodes out of child nodes derived from the same parent node of the node concerned, numbers being assigned to the older nodes prior to the node concerned, and also with the number of descendant nodes of the previous child nodes, thereby creating a conversion array for converting the numbers assigned in the width-first mode to numbers assigned in the depth-first mode for assigning numbers to nodes while giving higher priority to child nodes than same-generation nodes; and a step of converting the parent-child relationship of each node to the parent-child relationship expressed by the numbers assigned in the depth-first mode by using the conversion array. Accordingly, the high-speed conversion from the "child→parent" expression form based on the width-first mode to the "child→parent" expression form based on the depth-first mode can be performed.

Furthermore, according to the invention, a method of converting an expression form of a tree type data structure represented by using parent-child relationship on a storage device, the parent-child relationship being defined by storing, in the order of numbers assigned to child nodes, numbers assigned to parent nodes corresponding to the child nodes in the storage device, comprises:

a step of searching in a depth-first a tree type data structure expressed in a width-first mode for assigning numbers to nodes while giving higher priority to same-generation nodes than child nodes, and creating a conversion array for converting numbers assigned in the width-first mode to numbers assigned in the depth-first mode for assigning numbers to nodes while giving higher priority to child nodes than same-generation nodes; and a step of converting the parent-child relationship of the respective nodes to parent-child relationship expressed by numbers assigned in the depth-first mode by using the conversion array. Accordingly, the search-based conversion from the "child→parent" expression form based on the width-first mode to the "child→parent" expression form based on the depth-first mode can be performed. The "depth-first" search is implemented by creating a number conversion array by using stack.

Furthermore, according to the invention, a method of converting an expression form of a tree type data structure represented by using parent-child relationship on a storage device, the parent-child relationship being defined by storing, in the order of numbers assigned to child node, numbers assigned to parent nodes corresponding to the child nodes as elements of a first array in the storage device, comprising:

a step of counting an appearing frequency of the numbers assigned to each node as an element of the first array;

a step of securing sequential numbers whose number corresponds to the counted frequency, as a second array in the storage area in order to store the numbers assigned to the child nodes corresponding to each node; and a step of successively reading out the elements of the first array, and successively storing the numbers of the child nodes for the elements of the first array as the elements of the second array secured for the nodes to which numbers having the values coincident with the elements concerned are assigned.

Accordingly, the parent-child relationship is converted form the "child→parent" expression form to the "parent→child" expression form. That is, the parent-child relationship after the conversion is defined by storing in the storage device the numbers assigned to the child nodes corresponding to parent nodes as the elements of the second array in the order of assigning the numbers to the parent nodes.

Furthermore, a method of converting an expression form of a tree type data structure represented by using parent-child relationship on a storage device, the parent-child relationship being defined by storing, in the order of numbers assigned to parent nodes, numbers assigned to child nodes corresponding to the parent nodes as elements of a first array in the order of numbers assigned to the parent nodes, comprises:

a step of securing a second array in the storage device in order to store numbers assigned to the parent nodes corresponding to child nodes in the order of numbers assigned to the child nodes concerned; and a step of successively reading out the elements of the first array and successively storing the numbers of the parent nodes for the elements of the first array as elements of second array secured for nodes to which numbers having values coincident with the elements are assigned. Accordingly, the parent-child relationship is converted from the "parent→child" expression form to the "child→parent" expression form. That is, the parent-child relationship after the conversion is defined by storing the numbers assigned to the parent nodes corresponding to child nodes in the order of numbers assigned to the child nodes concerned as elements of the second array in the storage device.

Furthermore, according to the invention, there is provided an information processing device for carrying out the above method of the invention.

Furthermore, according to the invention, there is provided a program for implementing the method of the invention.

Still furthermore, according to the invention, there is provided a recording medium having the program of the invention is recorded therein.

[Effect of the Invention]

According to the invention, the parent-child relationship among the nodes of the tree type data structure is described on the basis of the "child→parent" expression, and thus the parent-child relationship can be defined by providing one storage place to one node. Accordingly, the amount of the memory accessed when the tree type data structure is operated is reduced, and thus the operation can be performed at high speed.

Still furthermore, according to the "child→parent" expression of the invention, by assigning numbers to nodes in the width-first mode, child nodes derived from some node can be easily searched for.

Furthermore, according to the "child→parent" expression of the invention, by assigning numbers to nodes in the depth-first mode, the blocks of the descendant nodes of some node can be easily specified.

BEST MODES FOR CARRYING OUT THE INVENTION

Embodiments according to the invention will be hereunder described with reference to the accompanying drawings.

[Construction of Computer]

FIG. 1 is a block diagram showing the hardware construction of a computer system for treating a tree type data structure according to an embodiment of the invention. As shown in FIG. 1, a computer system 10 has the same construction as a normal one, and it is equipped with CPU 12 for executing a program to control the overall system and individual constituent parts, RAM (Random Access Memory) 14 for storing work data, etc., ROM (Read Only Memory) 16 for storing programs, etc., a fixed storage medium 18 such as a hard disk or the like, a CR-ROM driver 20 for accessing CD-ROM 19, an interface (I/F) 22 that is provided between the CD-ROM driver 20 and an external terminal connected to an external network (not shown), an input device 24 comprising a keyboard and a mouse, and a CRT display device 26. CPU 12, RAM 14, ROM 16, the external storage medium 18, I/F 22, the input device 24 and the display device 26 are mutually connected to one another through a bus 28.

A program for building the tree type data structure on the storage device and a program for changing the tree type data structure on the storage device are accommodated in CD-ROM 19, and they may be read out by the CD-ROM driver 20 or recorded in ROM 16 in advance. Alternatively, programs temporarily read out from CD-ROM 19 may be stored in a predetermined area of an external storage medium 18. Or, the programs may be passed through a network (not shown), the external terminal and I/F 22 and then supplied from the external.

An information processing device according to the embodiment of the invention is implemented by causing the computer system 10 to execute a program for building the tree type data structure on the storage device and a program for changing the tree type data structure on the storage device.

[Tree Type Data Structure]

FIGS. 2A, B are diagrams showing POS data which is an example of the tree type data. FIG. 2A shows an example in which the data structure of the tree type data (that is, topology) and data values are visually expressed, and FIG. 2B shows an example in which the same tree type data are expressed in the form of XML. As shown in FIGS. 2A and 2B, the tree data structure is expressed by a combination of nodes and arcs which start from a root node (POS data in this embodiment), branch at each node and reach leaf nodes (terminal points). A storage place for a substantial value of each node, for example, the value of a shop name node="France shop" is indicated by a pointer relating to the shop name node.

The invention targets the topology of the tree data structure, and thus the topology of the tree data structure will be mainly described in the following description.

Conventionally, the tree data structure as described above is expressed by connecting node storing data with pointers. However, the pointer expression has a disadvantage that the pointer value has no inevitability. That is, in some case, a specific node A is stored at some block number (for example, block number 100), and in another case the same node A is stored in a different block number (for example, block number 200). Therefore, the pointer value is not fixed, and substantially the pointer value merely expresses the storage address of the node. Therefore, when nodes are connected by a pointer according to a depth-first rule, it is difficult to connect these nodes by a pointer according to a width-first rule.

On the other hand, the inventor of this application focuses attention on the fact that the topology of the tree data structure can be described by an arc list. The arc list is a list of arcs representing a parent-child relationship between nodes. FIGS. 3A to C are diagrams showing an example of an expression form of the tree data structure using the arc lists. FIGS. 3A to C show a tree data structure comprising 12 nodes to which node identifiers (ID) of 0, 10, 20, 30, 40, 50, 60, 70, 80, 90, 100 and 110 are assigned. FIG. 3A shows the whole of the tree data structure. In FIG. 3A, numerals described at the centers of figures such as a circular shape, a heart-shape, etc. represent node IDs, and an arrow and a pair of numerals like <0, 10> described at the arrow side represent an arc. The node ID is not limited to the character sequence, and it may be a numeral value, particularly an integer. FIG. 3B shows an arc list from a parent node (From-ID) to a child node (To-ID), and FIG. 3C shows a node list comprising a list of pairs of node IDs and node Types. The node list may be omitted for the purpose of merely expressing the tree data structure. In principle, by using such an arc list, the relationship between nodes can be directly described without using any pointer.

[Expression Based on "Child→Parent" Relationship]

In the example of FIGS. 3A to C, the arc list is described on the basis of the "parent→child" relationship for associating the child node with the parent node. Therefore, since one parent node, for example, a root node 0, has three child nodes 10, 60 and 80, the same node ID of 0 appears three times at From-ID of the arc list. That is, the child node cannot be specified even when the parent node is specified, and thus the arc list is constructed by the array of elements From-Id and the array of elements To-ID. When the arc list is used, some nodes appear in both the array of From-ID and the array of To-ID.

On the other hand, the parent-child relationship can be expressed on the basis of the "child→parent" relationship. In this case, the parent-child relationship between nodes is expressed by an array of pairs of respective non-root nodes other than the root node and associated parent nodes. When the parent-child relationship is expressed on the basis of the "child→parent" relationship, there is an important property which is not achieved in the case of the "parent→child" relationship. That is, a unique parent node necessarily corresponds to one child node, and thus by specifying a child node, the unique parent node corresponding to the child node concerned can be immediately specified. That is, it is actually sufficient only to prepare the array of elements To-ID for the ark list. As a result, the storage capacity for storing the arc list can be reduced. The reduction of the storage capacity brings an effect of reducing the frequency of access to the memory, so that the processing speed can be increased.

FIGS. 4A to C are diagrams showing a method of expressing a tree data structure on the basis of the "child→parent" relationship according to an embodiment of the invention. FIG. 4A is a diagram showing the overall tree, and FIG. 4B shows an arc list based on the "child→parent" relationship. The arc list shown in FIG. 4B contains a storage area of the parent node corresponding to a root node, and thus "-" is conveniently set as the parent node of the root node. However, the parent corresponding to the root node does not exist, and thus the storage area of the parent node corresponding to the root node may be excluded from the arc list based on the "child→parent" relationship as shown in FIG. 4C. As described above, according to the embodiment of the invention, with respect to each of non-root nodes which correspond to nodes other than the root node, the parent node of each non-root node is associated with each of the non-root nodes to express the parent-child relationship between the nodes. A list of parent nodes is tracked from the child nodes expressed by "child→parent", whereby the topology of the tree can be expressed.

According to the embodiment of the invention, as shown in FIG. 5, the tree data structure based on the "child→parent" relationship as described above is built on RAM 14 by causing the computer system 10 shown in FIG. 1 to execute a node definition step 501 for assigning unique node identifiers to nodes including a root node, and a parent-child relationship definition step 502 for associating node identifiers assigned to the non-root node corresponding to nodes other than the root node with the node identifier assigned to parent nodes of the respective non-root nodes. As described above, a node identifier is first assigned to a node by any identification information such as a character string, a floating point number, an integer or the like, and then the parent-child relationship is defined on the basis of the "child→parent" expression, whereby the topology of the tree can be expressed by drawing (looking up) the node identifier of the parent node from the node identifier of the child node.

[Node Identifier]

According to a preferable embodiment, in the node definition step, numeral values are used as the node identifiers, and more preferably sequential integers are used. More preferably, sequential numbers i.e. integers from 0 or 1 are used. Accordingly, an address at which the node identifier of the parent node corresponding to a node can be simply achieved on the basis of the node identifier of the node concerned. Therefore, the processing speed of looking up the node identifier of the parent node from the node identifier of the child node can be increased.

When ordered numbers as node identifiers are assigned to nodes of the tree data structure to represent the parent-child relationship between the nodes, there is an advantage that by determining a rule for the numbering order, the tree data structure can be subsequently easily treated. According to the invention, as the numbering order rule, a depth-first mode in which a child node is given priority over a same-generation node, and a width-first mode in which a same-generation node is given priority over a child node are used.

FIGS. 6A to C are diagrams showing the processing of converting the ID-type tree structure type data to the integer sequential number type tree structure type data by the embodiment of the invention. FIG. 6A shows tree structure type data in which an ID number is assigned to each node, FIG. 6B shows a conversion rule, and FIG. 6c shows tree structure type data in which an integer sequential number is assigned to each node. The conversion rule of this embodiment is a rule of assigning a sequential number in the depth-first mode. Specifically, when plural child nodes exist, the minimum number is assigned to the first child (oldest brother) node, a large number is assigned to the last child (youngest brother) node, and numbers are assigned to the child nodes in preference to the brother nodes. In this embodiment, although, the numbers are assigned in an ascending order, the numbers may be assigned in a descending order.

FIGS. 7A to C are diagrams showing the processing of converting the ID-type tree structure type data to the integer sequential number type tree structure type data by another embodiment of the invention. FIG. 7A shows tree structure type data in which ID numbers are assigned to respective numbers, FIG. 7B shows a conversion rule, and FIG. 7C shows tree structure type data in which integer sequential numbers are assigned to the respective nodes. The conversion rule of this embodiment is a rule of assigning a sequential number in the width-first mode. Specifically, when plural child nodes exist, the minimum number is assigned to the first child (oldest brother) node, a large number is assigned to the last child (youngest brother) node and the numbers are assigned to the brother nodes in preference to the child nodes. In this embodiment, although, the numbers are assigned in the ascending order, the numbers may be assigned in the descending order.

As described above, when the numbers are used as the node identifiers as described above, an address at which a storage value relating to a node is stored can be immediately looked up from the node number of the node concerned, that is, in the order of O(1). Furthermore, by expressing the parent-child relationship on the basis of the "child→parent", the parent node can be looked up from the child node immediately, that is, in the order of O(1).

[Depth-First Mode]

According to the embodiment of the invention, the tree data structure based on the depth-first as shown in FIGS. 6A to C is built on the storage device by causing the computer system 10 shown in FIG. 1 to execute:

a node definition step of assigning unique sequential numbers to nodes including a root node while giving priority to child nodes over same-generation nodes; and a parent-child relationship definition step of arranging, in the order of integers assigned to non-root nodes corresponding to nodes other than the root node, integers assigned to parent nodes of the respective non-root nodes.

Accordingly, the sequential numbers are assigned to the nodes in the depth-first mode, and the parent-child relationship between nodes is expressed by the array of the "child→parent" relationship.

FIG. 8 is a flowchart showing the node definition processing based on the depth-first according to the embodiment of the invention. The node definition processing causes the computer system 10 to execute:

a step 801 of assigning a number to a root node;

a step 802 in which when a certain node to which a number has been already assigned, the next number to the number assigned to the node concerned is assigned to the child node concerned; and a step 803 in which when a certain node to which a number has been already assigned has plural child nodes, numbers are assigned to nodes from the first child node till the last child node according to the brother relationship among the plural child nodes so that numbers are assigned to all child nodes of an immediate older brother node and then the next number is assigned to the just younger brother node.

Accordingly, the brother relationship is defined among the plural child nodes derived from the same parent node in the depth-first mode.

FIG. 9 is a diagram showing the array of the parent-child relationship based on the "child→parent" expression created from the tree data structure based on the depth-first shown in FIGS. 6A to C according to the embodiment of the invention. As shown as a sub tree 1 or sub tree 2 in FIG. 9, there is achieved an excellent property that when the parent-child relationship of nodes to which the sequential numbers are assigned in the depth-first mode is expressed by the array on the basis of the "child→parent" relationship, descendants nodes of some node appear in sequential areas.

In the embodiment of the invention, by using the excellent property of the depth-first mode, sequential areas in which the values above the integer assigned to some node are stored are extracted from the array, thereby specifying all the descendants of the node concerned. Accordingly, a node group representing the descendant nodes of some node can be achieved as a sequential block in the array. For example, when the size of the sequential block is set to m, the processing speed of specifying all the descendant nodes of some node is in the order of O(m).

As described above, the parent-child relationship between nodes can be also expressed by the array of the "parent child" relationship in place of the array of the "child→parent" relationship. FIG. 10 is a diagram showing the array of the parent-child relationship based on the "parent→child" expression crated from the depth-first tree data structure shown in FIGS. 6A to C. Since one parent node can have plural child nodes, and thus the array of the parent-child relationship comprises two arrays consisting of an array Aggr for indicating areas in which the numbers of child nodes corresponding to each node are stored, and an array P→C in which the numbers of the child nodes are stored. For example, the value of a second element Aggr[1] from the head of the array Aggr is equal to "3", and this represents that the numbers of child nodes corresponding to the node [1] are stored in the element P→C [3] and subsequent elements of the array P→C. Accordingly, it is found that the child nodes corresponding to the node [0], that is, the root node are three elements from the head of the array P→C, that is, 1 of P→C[0], 6 of P→C[1] and 8 of P→C[2].

A method of determining the array of the parent-child relationship based on the "parent→child" expression will be described.

(1) When the number of the node is coincident with the maximum subscript (=11) of the array P→C, there is no node belonging to this node. Accordingly, the processing is not continued.

(2) An Aggr value is calculated from the number of the parent node represented by a bold type in the figure. This Aggr value represents the start point of the array P→C.

(3) The Aggr value corresponding to (the parent node number represented by the bold type +1) is calculated. (Aggr value −1) represents the end point of the array P→C.

For example, the start point of the child nodes of the node 0 is Aggr[0], that is, 0, and the end point is Aggr[1]−1, that is, 3−1=2. Accordingly, the child nodes of the node 0 are elements from 0 to 2 of the array P→C, that is, 1, 6 and 8.

Or, the parent-child relationship based on the expression "parent→child" can be expressed by two arrays, that is, the array of the parent node numbers and the array of the corresponding child node numbers. However, in order to find out the parent-child relationship by using this array, the number of the parent node must be searched, that is, the access time of log(n) is required, and thus the efficiency is low.

[Width-First Mode]

According to the embodiment of the invention, the tree data structure based on the width-first shown in FIGS. 7A to C is built on the storage device by causing the computer system 10 shown in FIG. 1 to execute:

A node definition step of assigning unique sequential integers to nodes including a root node while a same-generation node is given priority over a child node; and a parent-child relationship definition step of storing in the storage device an array formed by arranging, in the order of integers assigned to non-root node corresponding to nodes other than the root node, integers assigned to parent nodes of the respective non-root nodes.

Accordingly, sequential integers are assigned to the nodes in the width-first mode, and the parent-child relationship between nodes is expressed by the array of the "child→parent" relationship.

FIG. 11 is a flowchart showing the node definition processing based on the width-first according to the embodiment of the invention. The node definition processing causes the computer system 10 to execute:

a step 1101 of determining which generation each node is from the root node and calculating the number of nodes contained in each generation;

a step 1102 of first assigning a number to the root node; and a step 1103 in which when numbers are assigned to all the nodes contained in a generation, until there is no node in the next generation to the generation concerned, numbers are assigned to all the nodes contained in the next generation in the order of numbers assigned to parent nodes of the nodes concerned when the parent nodes are different, and defining a brother relationship among plural child nodes derived from the parent nodes when the parent nodes are identical to one another and successively assigning unique integers that sequentially vary from the next number of a just-before assigned number from the first child node till the last child node.

Accordingly, the brother relationship is defined among the plural child nodes derived from the same parent node in the width-first mode.

FIG. 12 is a diagram showing the array of the parent-child relationship based on the "child→parent" expression created from the width-first tree data structure shown in FIGS. 7A to C according to the embodiment of the invention. As shown in FIG. 12, when the parent-child relationship of nodes to which sequential numbers are assigned in the width-first mode is expressed in the array on the basis of the "child→parent" relationship, there is achieved an excellent property that the child nodes of some node appear in sequential areas. This is because when the parent-child relationship of nodes to which sequential numbers are assigned in the width-first mode is expressed in the array on the basis of the "child→parent" relationship, the number assigned to the parent node appears in an order style (ascending order or descending order) in the array.

Accordingly, in the embodiment of the invention, sequential areas in which the same value as the integer assigned to some node is stored is extracted from the array concerned by utilizing the excellent property of the width-first mode, thereby specifying all the child nodes of the node concerned. Accordingly, the child nodes of some node can be searched by using a method such as binary search or the like, that is, they can be searched in the order of O(log(n)).

As described above, the parent-child relationship between nodes can be expressed not only by the array of the "child→parent" relationship, but also by the array of the "parent→child" relationship. FIG. 13 is a diagram showing the array of the parent-child relationship based on the "parent→child" expression created from the width-first tree data structure shown in FIGS. 7A to C. Since one parent node may have plural child nodes, the array of the parent-child relationship comprises two arrays consisting of an array Aggr indicating areas in which the numbers of child nodes for each node are stored, and an array P→C in which the numbers of the child nodes are stored. For example, the value of the second element Aggr [1] from the head of the array Aggr is equal to "3", and this represents that the numbers of child nodes for the node [1] are stored in the element P→C[3] and the subsequent elements of the array P→C. Accordingly, it is found that the child nodes for the node [0], that is, the root node are three elements from the head of the array P→C, 1 of P→C[0], 2 of P→C[1] and 3 of P→C[2].

A method of determining the array of the parent-child relationship based on the "parent→child" expression will be described.

(1) When the number of a node is coincident with the maximum subscript (=11) of the array P→C, there exists no child node belonging to this node. Accordingly, the processing is not continued.

(2) An Aggr value is calculated from the number of the parent node represented by a bold type in the figure. This Aggr value represents the start point of the array P→C.

(3) The Aggr value corresponding to (parent node number represented by a bold type +1) is calculated. (The aggr value −1) represents the end point of the array P→C.

For example, the start point of the child nodes of the node 0 is Aggr[0], that is, 0, and the end point is Aggr[1]−1, that is, 3−1=2. Accordingly, the child nodes of the node 0 are 0 to second elements of the array P→C, that is, 1, 2 and 3.

[Mutual Conversion of Expression Form of Tree Data Structure]

As described above, each of the depth-first mode and the width-first mode has an inherent excellent property. Therefore, the computer system of the embodiment of the invention converts the mutual expression form among the "child→parent" expression form based on the depth-first, the "child→parent" expression form based on the width-first and the "parent→child" expression form. FIG. 14 is a diagram showing the relationship of the mutual conversion of the three expression form according to the embodiment of the invention.

FIG. 15 is a flowchart showing a method of building the tree data structure implemented by the computer system according to the embodiment of the invention. As shown in FIG. 15, the computer system 10 builds the tree data structure on the storage device by executing a step 1510 of uniquely assigning sequentially-varying integers to all the nodes while starting the root node, and a step of 1520 of defining the parent-child relationship between among nodes.

Preferably, the step 1510 of uniquely assigning the integers to all the nodes includes a step 1511 of determining which one of the depth-first mode for assigning numbers to child nodes in preference to same-generation nodes and the width-first mode for assigning numbers to same-generation modes in preference to child nodes should be selected to assign numbers to nodes, a step of 1512 of searching nodes in the depth-first mode and assigning numbers to the nodes in the search order when the depth-first mode is selected, and a step of 1513 of searching nodes in the width-first mode and assigning numbers to nodes in the search order when the width-first mode is selected. Accordingly, the node number allocation based on the depth-first mode and the node number allocation based on the width-first mode are allowed to coexist in one system, and thus a proper expression form can be used in accordance with the condition.

Furthermore, preferably, the step 1520 of defining the parent-child relationship among the nodes includes a step 1521 for determining which one of a child-parent expression mode for defining the relationship from the child node to the parent node and a parent-child expression mode for defining the relationship from the parent node to the child node should be selected to define the parent-child relationship, a step 1522 of storing in the storage device numbers assigned to the parent nodes corresponding to child nodes in the order of numbers assigned to the child nodes concerned when the child-parent expression mode is selected, and a step 1523 of storing in the storage device an array of numbers assigned to the child nodes corresponding to parent nodes in the order of numbers assigned to the parent nodes when the parent-child expression mode is selected.

Accordingly, the parent-child relationship among the nodes expressed by the "child→parent" relationship can be expressed by the "parent→child" relationship in accordance with the condition. The expression based on the "parent→child" relationship is advantageous to information exchange with the external, for example.

As described above, according to the embodiment of the invention, the "child→parent" expression and the "parent→child" expression for expressing the parent-child relationship, and the depth-first mode and the width-first mode for assigning numbers to nodes can be selectively used. A mutual conversion method of different expression forms will be described hereunder.

[Conversion from the Depth-First "Child→Parent" Expression to the Width-First "Child→Parent" Expression]

FIGS. 16A, B are diagrams showing the conversion from the depth-first "child→parent" expression (FIG. 16A) to the width-first "child→parent" expression (FIG. 16) according to the embodiment of the invention. FIG. 17 is a flowchart showing the conversion method from the depth-first "child→parent" expression to the width-first "child→parent" expression according to the embodiment of the invention. The parent-child relationship is defined by storing the numbers assigned to the parent nodes corresponding to child nodes in the order of numbers assigned to the child nodes concerned into a storage device of the computer system 10, for example, RAM 14.

As shown in FIG. 17, the computer system 10 executes:

a step of 1701 of determining the generation of each node of a tree data structure expressed under the depth-first mode for assigning numbers to child nodes in preference to same-generation nodes and counting the number of nodes belonging to each generation;

a step 1702 of determining numbers to be assigned in each generation on the basis of the number of nodes belonging to each generation when the numbers are assigned to the nodes in the width-first mode for assigning numbers to same-generation nodes in preference to child nodes;

a step of 1703 of creating a conversion array for converting the numbers of the respective nodes to numbers assigned under the width-first mode on the basis of the determined generation of the nodes and the numbers assigned in each of the determined generations; and a step of 1704 of converting the parent-child relationship of the respective nodes to a parent-child relationship expressed by the numbers assigned in the width-first mode by using the conversion array. Accordingly, it is possible to convert the "child→parent" expression form based on the depth-first mode to the "child→parent" expression form based on the width-first mode.

Next, the steps 1701 to 1704 will be described in detail.

In the step 1701, the number of nodes of each generation is counted. FIGS. 18A to 22 are diagrams showing the processing of counting the number of nodes belonging to each generation of the tree data structure based on the depth-first according to the embodiment of the invention. First, as shown in the procedure 0 of FIG. 18A, two conversion arrays are prepared. An array "depth" for storing the generation of each node has the same size as the array "C→P". An array "depth-count" for storing the number of nodes of each generation has a proper size which is equal to or more than the number of stages of the tree structure, and it is initialized to zero. In the procedure 1 of FIG. 18B, starting the head element (specifically, the root node), the generation (depth) of the nodes is determined and the number of elements belonging to the generation of the element concerned, that is, the head element of the array "depth-count" is incremented by only 1. With respect to the node 0, the generation thereof is equal to 0, so that 0 is set to "depth" [0] and "depth-count" [0] is incremented from 0 to 1. In the figure, the number of a target node is indicted by a bold type. In the procedure 2 of FIG. 18C, the number of the parent node corresponding to the node 1 is achieved from the array "C→P" to investigate the generation of the parent node. The element of the array "C→P"[1] is equal to zero, and when "depth" [0] is referred to, the element thereof is equal to zero (indicated by an italic type in the figure), so that it is found that the generation of the parent node is equal to zero. The value of the generation of the node 1 is achieved by adding the value of the generation of the parent node with 1, and thus it is equal to the value of the generation of the parent node +1=1. Therefore, the value 1 of the generation is set to the array "depth" [1], and the element of the array "depth-count" [1] is incremented by only 1.

The same processing is continued to be carried out on the node 2 to the node 11 in the order of the procedures 3 to 5 of FIGS. 19A to C, the procedures 6 to 8 of FIGS. 20A to C, the procedures 9 to 11 of FIGS. 21A to C and the procedure 12 of FIG. 22.

Procedure 3: Since the next C→P element is equal to 1, "depth" [1] (corresponding to the "depth" of the parent) is referred to. Since the "depth" of the parent is equal to 1, "depth" of the node concerned is equal to 1+1=>2. Therefore, "depth" (=2) of the node concerned is stored in "depth" [2]. Finally, "depth-count" ["depth" of the node concerned] is incremented.

Procedure 4: Since the next C→P element is equal to 2, "depth" [2] (corresponding to the "depth" of the parent) is referred to. Since the "depth" of the parent is equal to 2, "depth" of the node concerned is equal to 2+1=>3. Therefore, "depth" (=3) of the node concerned is stored in "depth" [3]. Finally, "depth-count" [the "depth" of the node concerned] is incremented.

Procedure 5: Since the next C→P element is equal to 2, "depth" [2] (corresponding to the "depth" of the parent) is referred to. Since the "depth" of the parent is equal to 2, "depth" of the node concerned is equal to 2+1=>3. Therefore, the "depth" (=3) of the node concerned is stored in "depth" [4]. Finally, "depth-count" [the "depth" of the node concerned] is incremented.

Procedure 6: Since the next C→P element is equal to 1, "depth" [1] (corresponding to the "depth" of the parent) is referred to. Since the "depth" of the parent is equal to 1, the "depth" of the node concerned is equal to 1+1=>2. Therefore, the "depth" (=2) of the node concerned is stored in "depth" [5]. Finally, "depth-count" (the "depth" of the node concerned) is incremented.

Procedure 7: Since the next C→P element is equal to zero, "depth" [0] (corresponding to the "depth" of the parent) is referred to. Since the "depth" of the parent is equal to zero, the "depth" of the node concerned is equal to 0+1=>1. Therefore, the "depth" (=1) of the node concerned is stored in "depth" [6]. Finally, "depth-count" [the "depth" of the node concerned] is incremented.

Procedure 8: Since the next C→P element is equal to 6, "depth" [6] (corresponding to the "depth" of the parent) is referred to. Since the "depth" of the parent is equal to 1, the "depth" of the node concerned is equal to 1+1=>2. Therefore, the "depth" (=2) of the node concerned is stored in "depth" [7]. Finally, "depth-count" [the "depth" of the node concerned] is incremented.

Procedure 9: Since the next C→P element is equal to zero, "depth" [0] (corresponding to the "depth" of the parent) is referred to. Since the "depth" of the parent is equal to zero, the "depth" of the node concerned is equal to 0+1=>1. Therefore, the "depth" (=1) of the node concerned is stored in "depth" [8]. Finally, "depth-count" [the "depth" of the node concerned] is incremented.

Procedure 10: Since the next C→P element is equal to 8, "depth" [8] (corresponding to the "depth" of the parent) is referred to. Since the "depth" of the parent is equal to zero, the "depth" of the node concerned is equal to 1+1=>2. Therefore, the "depth" (=2) of the node concerned is stored in "depth" [9]. Finally, "depth-count" (the "depth" of the node concerned) is incremented.

Procedure 11: Since the next C→P element is equal to 9, "depth" [9] (corresponding to the "depth" of the parent) is referred to. Since the "depth" of the parent is equal to 2, the "depth" of the node concerned is equal to 2+1=>3. Therefore, the "depth" (=3) of the node concerned is stored in "depth" [10]. Finally, "depth-count" {the "depth" of the node concerned} is incremented.

Procedure 12: Since the next C→P element is equal to 9, "depth" [9] (corresponding to the "depth" of the parent) is referred to. Since the "depth" of the parent is equal to 2, the "depth" of the node concerned is equal to 2+1=>3. Therefore, the "depth" (=3) of the node concerned is stored in "depth" [11]. Finally, "depth-count" [the "depth" of the node concerned] is incremented.

Accordingly, the array "depth" and the array "depth-counter" as shown in FIG. 23 are achieved.

Next, in the step 1702, the elements of the array "depth-count" in which the number of nodes of each generation is stored are accumulated (that is, the number of the nodes is counted). For example when the values of elements of the array (1, 3, 4, 4, 0) are accumulated,

1→1
3→1+3=4
4→4+4=8
4→8+4=12
0→12+0=12

Accordingly, the array becomes (1, 4, 8, 12, 12). As is apparent from this accumulation, the number of nodes till the generation 0 is equal to 1, the number of nodes till the generation 1 is equal to 4, the number of nodes till the generation 2 is equal to 8, the number of nodes till the generation 3 is equal to 12, and the number of nodes till the generation 4 is equal to 12. When the nodes are arranged in the generation order from this state, it is found that the head node of the generation 0 is 0th as a whole, the head node of the generation 1 is a first node, the head node of the generation is a fourth node as a whole, the head node of the generation 3 is an eighth node as a whole, and the head node of the generation 4 is a twelfth node as a whole. As described above, by accumulating the elements of the array "depth-count" of the number of the nodes of each generation, an array "depth-aggr" indicating what number node the head node of each generation is as a whole when the nodes are arranged in the generation order is achieved. In a preferable embodiment, the array "depth-aggr" is not directly equal to (1, 4, 8, 12, 12), but it is equal to an array (0, 1, 4, 8, 12) achieved by filling 0 to the head and displacing the elements backward one by one. The array "depth-aggr" represents numbers assigned in each generation when the numbers are assigned in the width-first mode.

In the step 1703, the conversion array is created. FIGS. 24A to 28 are diagrams showing the processing of creating the conversion array for converting the numbers of nodes to numbers assigned in the width-first mode according to the embodiment of the invention. First, as shown in the procedure 0 of FIG. 24A, an area for a number conversion definition array [Conversion definition of "No."], that is, an integer array having the same size as the array C→P is reserved. Subsequently, in the procedure 1 of FIG. 24B, the generation of node 0, that is, the "depth" [0] is taken out, and the element 0 of the element "depth-aggr" [0] of the array "depth-aggr" indicated by the value 0 of the "depth" [0] is taken out. This value 0 represents the number assigned in the generation 0. By setting this value 0 to the element of the array [Conversion definition of "No."] corresponding to the node 0, it is found that the node 0 to which the number is assigned in the depth-first mode is converted to the node 0 when the numbers are assigned in the width-first mode.

In the procedure 2 of FIG. 24C, the number conversion definition of the node 1 is carried out. Therefore, the "depth" [1] representing the generation of the node 1 is taken out, and the value 1 of the "depth-aggr"[1] indicated by the value 1 of the "depth" [1] is taken out. This value 1 is set to the array [Conversion definition of "No."] [1], and the value of the "depth-aggr"[1] is incremented by only 1. The element of the "depth-aggr"[1] from which the element is taken out is incremented by only 1, whereby when the node of the generation 1 is selected, the number of the node concerned after the conversion is equal to a number larger than the number 1 after the conversion by only 1, that is, equal to 2.

The same processing is continued to be carried out on the node 2 to node 11 in the order of the procedures 3 to 5 of FIGS. 25A to C, the procedures 6 to 8 of FIGS. 26A to C, the procedures 9 to 11 of FIGS. 27A to C and the procedure 12 of FIG. 28.

For example, in the procedure 3, the "depth" [2] is taken out, and the element of the "depth-aggr" indicated by the value is taken out. The element corresponding to the taken-out "depth-aggr" is stored in the [Conversion definition of "No."] and also it is incremented by only 1 and stored in "depth-aggr". In the procedures 4 to 12, "depth" [3] to "depth" [11] are taken out, and the element of "depth-aggr" indicated by the value concerned is taken out. The corresponding element of the taken-out "depth-aggr" is stored in [Conversion definition of "No."] and also it is incremented by only 1 and stored in "depth-aggr".

Accordingly, the final array [Conversion definition of "No."] as shown in FIG. 28 is achieved.

IN step 1704, the parent-child relationship of respective nodes is converted to the parent-child relationship expressed by numbers assigned in the width-first mode by using the conversion array. FIG. 29 is a diagram showing the processing of converting the parent-child relationship of the "child→parent" expression form based on the depth-first mode to the "child→parent" expression form based on the width-first mode according to the embodiment of the invention. For example, when the child node C and the parent node P are associated with each other in the "child→parent" expression form based on the depth-first mode, if the node number C is converted to the node number C' and the node number P is converted to the node number P' by the final number conversion definition array [Conversion definition of "No."], the child node C' and the parent node P' are associated with each other in the "child→parent" expression form based on the width-first mode. If the number C' of the child node after the conversion and the number P' of the parent node after the conversion are achieved for all the child nodes C before the conversion, the array C'→P' of the parent-child relationship in which the storage position is represented by C' and the storage value is represented by P' is completed.

In the example of FIG. 29, the storage positions (0, 1, 2, 3, 4, 5, 6, 7, 8, 9, 10, 11) are converted to (0, 1, 4, 8, 9, 5, 2, 6, 3, 7, 10, 11) by using the array of [Conversion definition of "No."]. Accordingly, as shown in FIG. 29, the array C→P after the conversion of the storage position is as follows:

the value −1 of the array C→P [0] based on the depth-first is set to the array C→P [0] after the conversion of the storage position;

the value 0 of the array C→P [1] based on the depth-first is set to the array CUP [1] after the conversion of the storage position;

the value 0 of the array C→P [6] based on the depth-first is set to the array C→P [2] after the conversion of the storage position;

the value 0 of the array C→P [8] based on the depth-first is set to the array C→P [3] after the conversion of the storage position;

the value 1 of the array C→P [2] based on the depth-first is set to the array C→P [4] after the conversion of the storage position;

the value 1 of the array C→P [5] based on the depth-first is set to the array C→P [5] after the conversion of the storage position;

the value 6 of the array C→P [7] based on the depth-first is set to the array C→P [6] after the conversion of the storage position;

the value 8 of the array C→P [9] based on the depth-first is set to the array C→P [7] after the conversion of the storage position;

the value 2 of the array C→P [3] based on the depth-first is set to the array C→P [8] after the conversion of the storage position;

the value 2 of the array C→P [4] based on the depth-first is set to the array C→P [9] after the conversion of the storage position;

the value 9 of the array C→P [10] based on the depth-first is set to the array C→P [10] after the conversion of the storage position; and the value 9 of the array C→P [11] based on the depth-first is set to the array C→P [11] after the conversion of the storage position.

Subsequently, the value of each element of the array C→P after the conversion of the storage position is converted by using the array of [Conversion definition of "No."], thereby achieving the C→P array after the conversion of the storage value.

In the example of FIG. 29, the conversion of the storage position, that is, the conversion of the child node number is first carried out, and then the conversion of the storage value, that is, the conversion of the parent node number is carried out. However, the conversion of the storage position may be carried out after the conversion of the storage value is first carried out. Alternatively, both the conversion of the storage position and the conversion of the storage value may be carried out at the same time. The node number "−1" representing the parent node of the root node is not required to be converted.

Through the above processing, the conversion from the depth-first "child→parent" expression to the width-first "child→parent" expression as show in FIGS. 16A, B is carried out.

[High-Speed Conversion from the Width-First "Child→Parent" Expression to the Depth-First "Child→Parent" Expression]

FIGS. 30A, B are diagrams showing the conversion from the width-first "child→parent" expression (FIG. 30A) to the depth-first "child→parent" expression (FIG. 30B) according to the embodiment of the invention. FIG. 31 is a flowchart showing the method for the conversion from the width-first "child→parent" expression to the depth-first "child→parent" expression according to the embodiment of the invention. The parent-child relationship is defined by storing, in the order of the numbers assigned to the child nodes, the numbers assigned to the parent nodes corresponding to the child nodes in the storage device of the computer system 10, for example, RAM 14. As shown in FIG. 13, the computer system 10 executes:

a step 3101 of counting the number of descendants of each node of the tree data structure expressed under the width-first mode for assigning numbers to nodes while giving higher priority to same-generation nodes than child nodes;

a step 3102 of adding the number to be assigned to the parent node with the number of older nodes out of brother nodes derived from the same parent node of the node concerned, the numbers prior to the number of the node concerned being assigned to the older nodes concerned, and also with the number of descendants of the older brother nodes, thereby creating a conversion array for converting the numbers assigned in the width-first mode to numbers assigned in the depth-first mode for assigning numbers to nodes while giving higher priority to child nodes than same-generation nodes; and a step 3103 of converting the parent-child relationship of each node to the parent-child relationship expressed by the numbers assigned in the depth-first mode. Accordingly, the high-speed conversion from the "child→parent" expression form based on the width-first mode to the "child→parent" expression form based on the depth-first mode can be performed.

Next, the steps 3101 to 3103 will be described in detail.

In step 3101, the number of descendants of a node is counted. FIGS. 32 to 33 are diagrams showing the processing of counting the number of descendants of each node of the tree typed data structure based on the width-first according to the embodiment of the invention. First, as shown in FIG. 32, a node number array having the same size as the array C→P is created, and each element of the node number array is initialized by 1.

Next, as shown in FIG. 33, the node number array is accessed by using the value of the element of the array C→P in the order of tracking back the generation (that is, toward the root node), and the value of the element of the node number array corresponding to the child node of the array C→P is added to the value of the element of the node number array corresponding to the parent node of the array C→P. Accordingly, the element of the node number array corresponding to the parent node is added with the number descendant nodes of the parent node concerned. For example, in the procedure 1 of FIG. 33, it is found from the value of the array C→P[11] that the parent node of the child node 11 is equal to the node 7. Therefore, the element of the node number array corresponding to the child node 11, that is, the value of the node number array [11] is added to the element of the node number array corresponding to the parent node 7, that is, the value of the node number array [7]. Accordingly, the number of the descendant nodes of the child nodes 11 is contained in the number of the descendant nodes of the parent node 7. When the same processing is carried out according to the procedures 2 to 11, the node number array by adding the node numbers is created as shown in FIG. 33. In this embodiment, the array C→P[0] as the head element of the array C→P corresponds to the route node, and thus the addition of the node number is terminated by the processing of the procedure 11 on the element C→P[1] of the array. As described above, the root node may be excluded from the array C→P. Finally, the node concerned is also counted fro the value of the element of the node number array, and thus the number of descendant nodes of the node 0 is equal to (12−1)=11, for example.

In step 3102, the number of the parent node is added with the number of the older brother nodes and the number of descendants of the older brother nodes every node to which the number is assigned in the width-first mode, thereby creating the conversion array for converting the number of the node in the width-first mode of the node concerned to the number in the depth-first mode. As described above, in the width-first mode, the numbers are assigned to the nodes while the numbers are assigned to the same-generation nodes in preference to the child nodes. In the depth-first mode, the numbers are assigned to the child nodes in preference to the same-generation nodes. Therefore, when some parent node has an unique child node, in the depth-first mode, the next number of the parent node is assigned to the child node. On the other hand, if some parent node has plural child nodes, the number of some child node is assigned after the numbers are assigned to the older brother nodes of the child node concerned and all the descendant nodes of the older brother nodes concerned. The number of all the descendant nodes of some older brother node can be achieved by referring to the node number array.

FIG. 34 is a diagram showing the processing of creating the conversion array from the number of the width-first mode to the number of the depth-first mode according to the embodiment of the invention. This processing is successively started from the root node 0. In the procedure 1, a reference destination of the root node 0, that is, the parent node does not exist in the array C→P, and thus the number of the root node is kept zero. Therefore, the value of the element of the node number array for the root node is written to zero.

Next, in the procedure 1, a node in which the value of the element of the array C→P is equal to zero, that is, a node having node 0 as a parent node is a target to be processed. In this embodiment, the node 1, the node 2 and the node 3 are child nodes derived from the common parent node 0, and thus they are called as brother nodes. In the width-first mode, the node 1, the node 2 and the node 3 are assigned in this order to the brother nodes from the oldest child to the youngest child. The node 1 as the oldest child has no brother node, and thus the next number of the node 0 as the parent node may be assigned to the node 1. Accordingly, the value of the element of the node number array to the node 1 is rewritten from 5 to 1. Next, the node 2 has the node 1 as a brother node. Therefore, the number 5 of nodes below the node 1 is added to the node number of the parent node, and further added with the number of the node concerned, that is, 1, so that the number 5 is converted to the node number 6. The node 3 as the youngest child has an older brother 1 and an older brother 2, and thus the number 5 of the nodes below the older brother 1, the number 2 of nodes below the older node 2, the node number 0 of the parent node and the number 1 of the node concerned are added to achieve the node number 8, thereby converting to the node number 8.

The same processing as the procedure 1 is repeated every brother node derived from the same parent from the procedure 2 till the procedure 7, whereby the node number array is rewritten to the conversion array. Of course, the conversion array may be created separately from the node number array.

In step 3103, the parent-child relationship of the respective nodes is converted to the parent-child relationship expressed by the numbers assigned in the depth-first mode by using the conversion array. FIG. 35 is a diagram showing the processing of converting the parent-child relationship of the "child→parent" expression form based on the width-first mode to the parent-child relationship of the "child→parent" expression form based on the depth-first mode. This processing is the same processing as described with reference to FIG. 29. For example, when the child node C and the parent node P are associated with each other in the "child→parent" expression form based on the width-first mode, the node number C is converted to the node number C' by the above conversion array (Conversion definition of "No."), and if the node number P is converted to the node number P', the child node C' and the parent node P' are associated with each other in the "child→parent" expression form based on the depth-first mode. If the number C' of the child node after the conversion and the number P' of the parent node after the conversion are achieved for all the child nodes C before the conversion, the array C'→P' of the parent-child relationship in which the storage position is represented by C' and the storage value is represented is completed.

In the example of FIG. 35, the conversion of the storage position, the conversion of the child node number is first carried out, and then the conversion of the storage value, that is, the conversion of the parent node number is carried out. However, the storage position may be converted after the storage value is first converted, or both the conversion of the storage position and the conversion of the storage value may be performed simultaneously. It is unnecessary to convert the node number "−1" representing the route node.

Through the above processing, the high-speed conversion from the width-first "child→parent" expression to the depth-first "child→parent" expression as shown in FIGS. 30A and B can be performed.

[Conversion from Width-First "Child→Parent" Expression to the Depth-First "Child→Parent" Expression]

According to the embodiment of the invention, the conversion from the width-first "child→parent" expression to the depth-first "child→parent" expression may be implemented by a conversion method using searching in addition to the high-speed conversion method described with reference to FIGS. 30A to 35. In the following description, this conversion method using the search will be described by using an example shown in FIGS. 30A and B.

The parent-child relationship based on the width-first "child→parent" expression is defined by storing, in the order of the numbers assigned to the child nodes, the numbers assigned to the parent nodes corresponding to the child nodes in the storage device of the computer system 10, that is, RAM 14. The computer 10 executes:

a step of searching, in the depth-first mode, each node of the tree data structure expressed in the width-first mode for assigning numbers to nodes while higher priority is given to same-generation nodes than child nodes, and creating a conversion array which converts the numbers assigned in the width-first mode to numbers assigned in the depth-first mode for assigning numbers to nodes while higher priority is given to child nodes than same-generation nodes; and a step of converting the parent-child relation of the respective nodes to the parent-child relationship expressed by numbers assigned in the depth-first mode by using the conversion array.

FIGS. 36 and 43B are diagrams showing a conversion method from the width-first "child→parent" expression to the depth-first "child→parent" expression. In the conversion based on the search from the "child→parent" expression form based on the width-first mode to the "child→parent" expression form based on the depth-first mode, the "depth-first" search is implemented by creating a number conversion array by using stack, for example.

At a first stage of the step for creating the conversion array, variables as shown in FIG. 36 are created. The conversion array is an integer array having the same size as the array C→P, and it is initialized to −1. The variable CURRENT_NO and the variable STACK_POS are initialized to zero. The array STACK is an integer array having a proper length.

At a second stage of the step for creating the conversion array, as shown in the procedure 1 to the procedure 20 of FIG. 37A to FIG. 43B, the conversion array is created while tracing.

Procedure 1: (1) A place containing −1 at the element of C→P (indicating the root node) is searched, and a place of subscript 0=0 is found out. (2) The subscript (=0) is stored in STACK, and at the same time STACK_POS is incremented. (3) The value of CURRENT_NO is stored in the element of the conversion array at the same position as the subscript (=0), and CURRNT_NO is incremented.

Procedure 2: (1) An unused and minimum C→P position which indicates the stack storage value (=0) of STACK_POS−1 is searched. Whether it is unused or not can be judged by judging whether the element of the conversion array is equal to 1. Since it is found that the unused and minimum subscript exists at (=1), a pointer (arrow mark) is set to the position thereof. (2) This subscript (=1) is stored in STACK, and STACK_POS is incremented. (3) The value of CURRENT_NO is stored in the element of the conversion array of the same position as the subscript (=1), and CURRNT_NO is incremented.

Procedure 3: (1) An unused and minimum C→P position which indicates the stack storage value (=1) of STACK_POS−1 is searched. Whether it is unused or not can be judged by judging whether the element of the conversion array is equal to 1. Since it is found that the unused and minimum subscript exists at (=4), a pointer (arrow mark) is set to the position thereof. (2) This subscript (=4) is stored in STACK, and STACK_POS is incremented. (3) The value of CURRENT_NO is stored in the element of the conversion array of the same position as the subscript (=4), and CURRNT_NO is incremented.

Procedure 4: (1) An unused and minimum C→P position which indicates the stack storage value (=4) of STACK_POS−1 is searched. Whether it is unused or not can be judged by judging whether the element of the conversion array is equal to 1. Since it is found that the unused and minimum subscript exists at (=8), a pointer (arrow mark) is set to the position thereof. (2) This subscript (=8) is stored in STACK, and STACK_POS is incremented. (3) The value of CURRENT_NO is stored in the element of the conversion array of the same position as the subscript (=8), and CURRNT_NO is incremented.

Procedure 5: (1) An unused and minimum C→P position which indicates the stack storage value (=8) of STACK_POS−1 is searched. Whether it is unused or not can be judged by judging whether the element of the conversion array is equal to 1. Since it is found that there exists no unused and minimum subscript, STACK_POS is decremented.

Procedure 6: (1) An unused and minimum C→P position which indicates the stack storage value (=4) of STACK_POS−1 is searched. Whether it is unused or not can be judged by judging whether the element of the conversion array is equal to 1. Since it is found that the unused and minimum subscript exists at (=9), a pointer (arrow mark) is set to the position thereof. (2) This subscript (=9) is stored in STACK, and STACK_POS is incremented. (3) The value of CURRENT_NO is stored in the element of the conversion array of the same position as the subscript (=9), and CURRNT_NO is incremented.

The procedures 7-20 are likewise executed. At the end time of the procedure 20, it is found that CURRENT_NO reaches the size (=12) of the conversion array, and the conversion array is completed. Here, the conversion array creating processing is finished.

It is found that the conversion array created by the conversion method based on the search is the same as the conversion array of FIG. 34 created in the high-speed conversion method described above.

Subsequently, the expression of the parent-child expression is converted by the completely same processing as the processing of converting the parent-child relationship of the "child→parent" expression form based on the width-first mode to the parent-child relationship of the "child→parent" expression form based on the depth-first mode according to the embodiment of the invention described with reference to FIG. 35.

[Conversion from "Child→Parent" Expression to "Parent <Child" Expression]

Next, the conversion method from the "child→parent" relationship for associating the parent node with the child node to the "parent→child" relationship for associating the child node with the parent node will be described.

FIG. 44 is a flowchart showing the conversion method from the "child→parent" expression to the "parent→child" expression according to the embodiment of the invention. The parent-child relationship is defined by storing, in the order of the numbers assigned to the child node, the numbers of the parent nodes corresponding to the child nodes in the storage device of the computer system 10, that is, RAM 14. The computer system 10 executes:

a step of 4401 of counting the frequency at which the number assigned to each node appears as the element of the first array with respect to each of nodes;

a step 4402 of reserving continuous areas whose number corresponds to the frequency thus counted, as a second array in the storage area in order to store numbers assigned to the child nodes corresponding to each of the nodes; and a step 4403 of successively reading out the elements of the first array and successively storing the numbers of the child nodes for the elements of the first array as elements of the second array secured for the nodes to which the numbers coincident with the values of the elements are assigned. Accordingly, the parent-child relationship is converted from the "child-parent" expression form to the "parent-child" expression form. That is, the parent-child relationship after the conversion is defined by storing the numbers assigned to the child nodes corresponding to a parent node as the elements of the second array in the storage device in the order of the numbers assigned to the parent node concerned.

According to this conversion method, the depth-first or width-first property is directly preserved. Therefore, the "child→parent" expression based on the depth-first mode is converted to the "parent→child" expression based on the depth-first mode, and the "child →parent" expression based on the width-first mode is converted to the "parent→child" expression based on the width-first mode. FIG. 45A to C are diagrams showing an example of the tree data structure based on the depth-first mode. FIG. 45A shows the overall tree data structure, FIG. 45B shows the parent-child relationship based on the "child→parent" expression form, and FIG. 45C shows the parent-child relationship based on the "parent→child" expression form. In this embodiment, the expression form as shown in FIG. 45B is converted to the expression form as shown in FIG. 45C.

FIGS. 46A to 47C are diagrams showing a method for the conversion from the "child→parent" expression based on the depth-first mode to the "parent→child" expression based on the depth-first mode according to the embodiment of the invention.

In the procedure 1 of FIG. 46A, areas for storing the parent-child relationship of the "parent→child" expression form after the conversion are first secured, and initialized. As described above, in the case of the "parent→child" expression form, the array Aggr and array P→C are prepared. The array Aggr is an array for indicating areas in which the numbers of child nodes corresponding to each node are stored, and the array P→C is an array for storing the numbers of the child nodes. The size of the array Aggr is equal to the size of the arrangement C→P (of the "child→parent" expression form), and the arrangement Aggr is initialized to zero. The size of the arrangement P→C may be set to be smaller than the arrangement Aggr by the amount corresponding to one element. It is unnecessary to initialize the array P→C, however, in FIG. 46A, it is initialized to −1 in order to make the understanding easy.

In the procedure 2 of FIG. 46B, the elements of the array Aggr which are indicated by the respective elements of the array C→P are incremented one by one. The value of each element of the array C→P represents the number of the parent node, and thus each element of the count-up array Aggr represents the number of child nodes of each node which is coincident with the number of the subscript of the array Aggr.

In the procedure 3 of FIG. 46C, the values of the elements of the count-up Aggr are converted to an accumulative total, whereby the array Aggr for indicating areas where the numbers of the child nodes of the respective nodes are stored is completed. In this embodiment, the position of the element position is backward shifted one by one during the accumulation.

In the procedure 4 of FIG. 47A, the node numbers are transferred from the array C→P to the array P→C. The head element of the array C→P corresponds to the information on the root node 0. Since the parent node is not defined for the root node 0 (in this embodiment, the element of the array C→P has a negative value of −1, and thus no action is taken, the actual processing is started from the subscript 1 of the array C→P which corresponds to the node 1. The element of the subscript 1 of the array C→P represents that the parent node of the node 1 is the node 0. Therefore, the element of the node 0 in the array Aggr, that is, the element corresponding to the subscript 1 is checked, the value 0 is stored. Accordingly, the node number of the node 1 corresponding to the subscript 1 of the array C→P is set to the value of the storage place indicated by this value 0 in the array P→C, that is, the element of the subscript 0 of the array P→C. Accordingly, the node 1 is set as the child node of the node 0. At this time, the value of the element corresponding to the node 0 in the array Aggr is incremented. Accordingly, when another child node of the node 0 is detected, the number of the child node concerned is set as the value of the element of the subscript 1 of the array P→C. In this embodiment, when referring to the array C→P, the parent node of the node 6 corresponds to the node 0, and thus the node number 6 of the node 6 is set as the value of the element of the subscript 1 of the array P→C.

Subsequently, in the procedure 5 of FIG. 47B, the array Aggr is returned to the state at the end time of the procedure 3. This can be implemented by shifting the elements of the array Aggr backwardly one by one and filling 0 in the head as shown in FIG. 47B. Alternatively, the array Aggr at the end time of the procedure 3 may be separately preserved. Or, the head address of the array Aggr may be replaced to the just-before position.

FIG. 47C shows the array Aggr and the array P→C achieved through the conversion. These arrays is the same as the array of the parent-child relationship based on the depth-first "parent→child" relationship shown in FIG. 10, and thus the further description is not added.

In the conversion method, as described above, the depth-first or width-first property is directly preserved. Accordingly, the conversion method according to the embodiment of the invention is suitable for the conversion from the "child→parent" expression based on the width-first mode to the "parent→child" expression based on the width-first mode.

[Conversion from "Parent→Child" Expression to "Child→Parent" Expression]

Next, a method of the conversion from "parent→child" relationship for associating the child node with the parent node to the "child→parent" relationship for associating the parent node with the child node according to the embodiment of the invention will be described.

FIG. 48 is a flowchart showing the method for the conversion from the width-first "child→parent" expression from the depth-first "child→parent" expression according to the embodiment of the invention. The parent-child relationship is defined by storing, in the order of the numbers assigned to the parent nodes, the numbers assigned to the child nodes to the parent node as elements of a first array in the storage device of the computer system 10, for example, RAM 14. The computer 10 executes:

a step 4801 of reserving a second array in the storage device to store the numbers assigned to the parent nodes corresponding to child nodes in the order of the numbers assigned to the child nodes concerned; and a step 4802 of successively reading out the elements of the first array, and successively storing the numbers of the parent nodes to the elements of the first array as the elements of the second array secured for the nodes to which the numbers having values coincident with the elements concerned are assigned. Accordingly, the parent relationship is converted from the "parent→child" expression form to the "child→parent" expression form. That is, the parent-child relationship after the conversion is defined by storing the numbers assigned to the parent nodes corresponding to child nodes in the order of the numbers assigned to the child nodes concerned as the elements of the second array into the storage device.

According to this method, the depth-first or width-first property can be directly preserved. Therefore, the "parent→child" expression based on the depth-first mode is converted to the "child→parent" expression based on the depth-first mode, and the "parent→child" expression based on the width-first mode is converted to the "child→parent" based on the width-first mode. In the following description, an example of the conversion from the parent→child" expression based on the depth-first mode to the "child→parent" expression based on the depth-first will be described. In this example, with respect to the tree data structure based on the depth-first mode shown in FIGS. 45A to C, the parent-child relationship based on the "parent→child" expression form shown in FIG. 45C is converted to the parent-child relationship based on the "child→parent" expression form shown in FIG. 45B.

FIGS. 49A to C are diagrams showing a method for the conversion from the "parent→child" expression based on the depth-first mode to the "child→parent" expression based on the depth-first mode according to the embodiment of the invention.

First, the areas of the array C→P are reserved and are initialized to −1 as shown in the procedure 1 of FIG. 49A.

Subsequently, as shown in the procedure 2-1 of FIG. 49B and the procedure 2-2 of FIG. 49C, "parent→child" relationship is read out from the array Aggr and the array P→C, and the child node numbers of the corresponding C→P are filled. For example, the element (=0) of the subscript 0 of the array represents the head of the area in the array P→C in which the child nodes of the parent node 0 are stored, and the element (=3) of the subscript 1 of the array Aggr represents the head of the area in the array P→C where the child nodes of the parent node 1 are stored. Therefore, it is found that the node numbers of the child nodes of the parent node 0 are stored in the area from the subscript 0 to the subscript 2 of the array P→C. Since 1, 6 and 8 are stored in this order as child node numbers in this area, the node number 0 of the parent node 0 is set as the elements of the subscripts 1, 6 and 8 of the array C→P. Accordingly, the area of the child nodes for which the node of the node number 0 corresponds to the parent node is embedded in the array C→P. This process is successively executed in the order of subscripts of the array Aggr, thereby achieving a final result shown in FIG. 49D.

According to the conversion method, as described above, the depth-first or width-first property is directly preserved. Accordingly, the conversion method according to the embodiment of the invention is suitable for the conversion from the "parent→child" expression based on the width-first mode to the "child→parent" expression based on the width-first mode.

[Information Processing Device]

FIG. 50 is a block diagram showing an information processing device 5000 for building the tree data structure according to the embodiment of the invention. The information processing device 5000 comprises a storage section 5001 for storing data representing the tree data structure, a node definition section 5002 for assigning unique node identifiers to nodes including a root node, and a parent-child relationship definition section 5003 for associating a node identifier assigned to a parent node of each of non-root nodes corresponding to the nodes other than the root node with a node identifier assigned to each of the non-root nodes.

Preferably, the node definition section 5002 uses numeral values as node identifiers, and more preferably uses sequential integers as node identifiers.

Furthermore, the parent-child relationship definition section 5003 stores an array of pairs of the node identifiers assigned to the respective non-root nodes and the node identifiers assigned to the associated pant nodes in the storage section 5001.

The invention is not limited to the above-described embodiment, and various modifications may be made within the scope of the invention described in Claims, and it is needless to say that these modifications are within the scope of the invention.

BRIEF DESCRIPTION OF THE DRAWINGS

FIG. 1 is a block diagram showing a computer system for treating a tree data structure according to an embodiment of the invention.

FIGS. 2A, B are diagrams showing POS data as an example of tree data, wherein FIG. 2A shows an example in which the data structure (that is, topology) of the tree data and data values are visually expressed, and FIG. 2B is an example in which the tree data are expressed in XML style.

FIGS. 3A to C are diagrams showing an example of the expression form of the tree data structure using an arc list.

FIGS. 4A to C are diagrams showing an expression method for the tree data structure based on "child→parent" relationship according to the embodiment of the invention.

FIGS. 6A to C are diagrams showing the processing of converting an ID-type tree structure type data of ID format to an integer sequential type tree structure type data according to the embodiment of the invention.

FIGS. 7A to C are diagrams showing the processing of converting the ID-type tree structure type data to the integer sequential type tree structure type data according to the embodiment of the invention.

FIGS. 18A to C are diagrams showing the processing of counting the number of nodes belonging to each generation of the tree data structure based on the depth-first according to the embodiment of the invention.

FIGS. 20A to C are diagrams showing the processing (procedures 3 to 5) of counting the number of nodes belonging to each generation of the tree data structure based on the depth-first according to the embodiment of the invention.

FIG. 22 is a diagram showing the processing (procedures 9 to 11) for counting the number of nodes belonging to each generation of the tree data structure based on the depth-first according to the embodiment of the invention.

FIGS. 24A to C are diagrams showing the processing (procedures 0 to 2) for creating a conversion array for converting the numbers of nodes to numbers assigned in a width-first mode.

FIGS. 25A to C are diagrams showing the processing (procedures 3 to 5) for creating the conversion array for converting the numbers of nodes to the numbers assigned in the width-first mode.

FIGS. 26A to C are diagrams showing the processing (procedures 6 to 8) for creating the conversion array for converting the numbers of nodes to the numbers assigned in the width-first.

FIGS. 27A to C are diagrams showing the processing (procedures 9 to 11) for creating the conversion array for converting the numbers of nodes to the numbers assigned in the width-first mode.

FIG. 28 is a diagram showing the processing (procedure 12) for creating the conversion array for converting the numbers of nodes to the numbers assigned in the width-first mode.

FIGS. 30A, B are diagrams of the conversion from the width-first "child→parent" expression to the depth-first "child→parent" expression according to the embodiment of the invention.

FIG. 32 is a diagram (part 1) of the processing of counting the number of descendants of each node of the tree data structure based on the width-first according to the embodiment of the invention.

FIGS. 37A to C are diagrams (part 2) of the method of the conversion from the width-first "child→parent" expression to the depth-first "child→parent" expression according to another embodiment of the invention.

FIGS. 38A to C are diagrams (part 3) showing the method of the conversion from the width-first "child→parent" expression to the depth-first "child→parent" expression according to another embodiment of the invention.

FIGS. 39A to C are diagrams (part 4) showing the method of the conversion from the width-first "child→parent" expression to the depth-first "child→parent" expression according to another embodiment of the invention.

FIGS. 40A to C are diagrams (part 5) of the method of the conversion from the width-first "child→parent" expression to the depth "child→parent" expression according to another embodiment of the invention.

FIGS. 41A to C are diagrams (part 6) of the method for the conversion from the width-first "child→parent" expression to the depth-first "child→parent" expression according to another embodiment of the invention.

FIGS. 42A to C are diagrams (part 7) of the method for the conversion from the width-first "child→parent" expression to the depth-first "child→parent" expression.

FIGS. 45A to C are diagrams showing an example of the tree data structure based on the depth-first mode.

FIGS. 46A to C are diagrams (part 1) showing the method of the conversion from the "child→parent" expression based on the depth-first mode to the "parent→child" expression based on the depth-first mode according to the embodiment of the invention.

FIGS. 49A to D are diagrams showing the method for the conversion from the "parent→child" expression based on the depth-first to the "child→parent" expression based on the depth-first mode according to the embodiment of the invention.

DESCRIPTION OF REFERENCE NUMERALS

Figure 5:
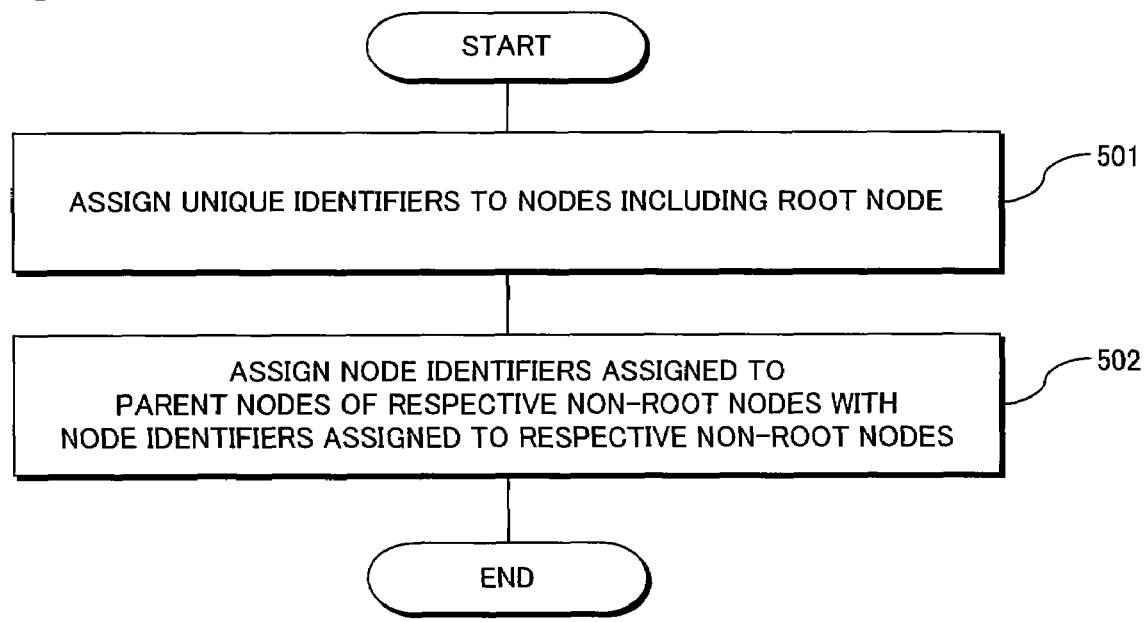
FIG. 5 is a flowchart showing a method of building the tree data structure on a storage device according to the embodiment of the invention.
Figure 8:
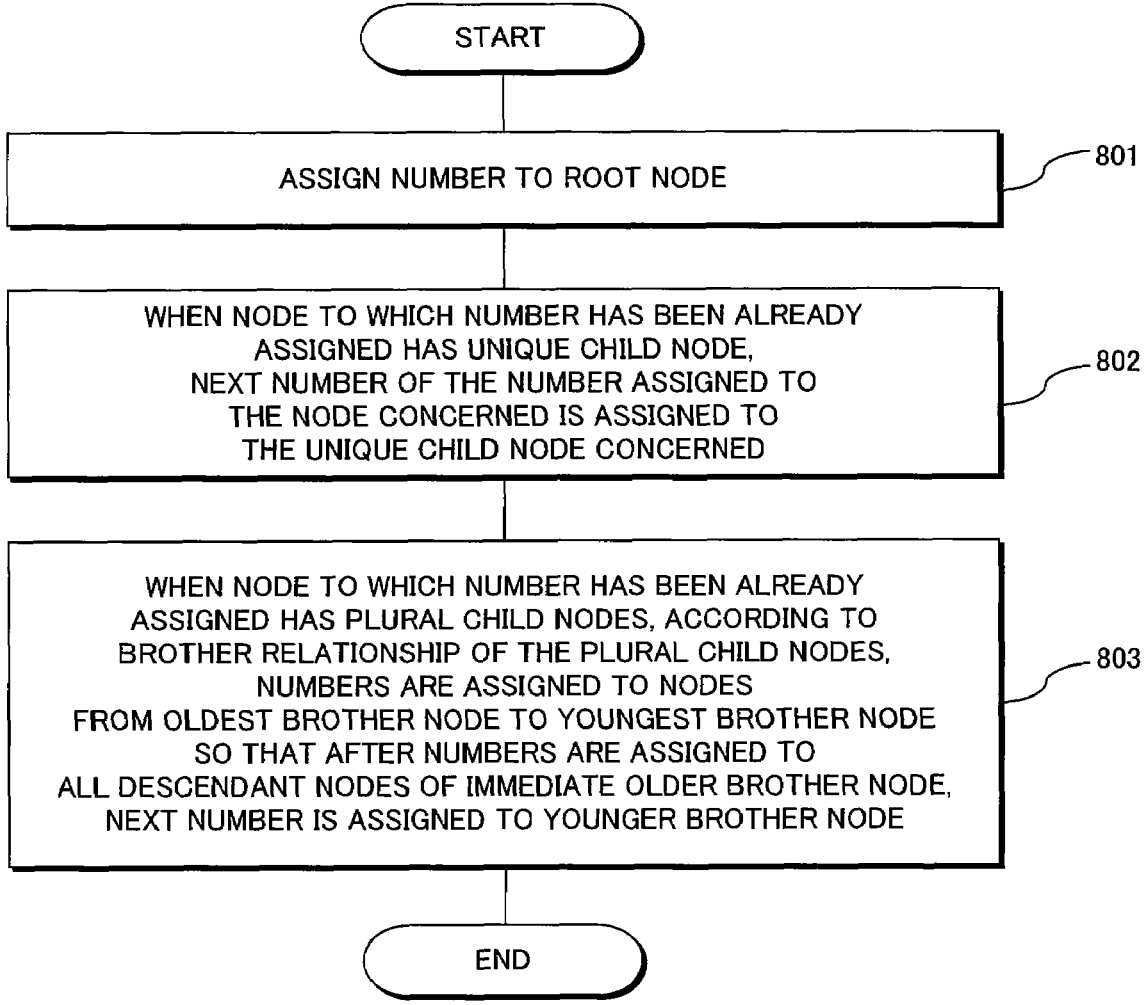
FIG. 8 is a flowchart showing node definition processing based on depth-first according to the embodiment of the invention.
Figure 9:
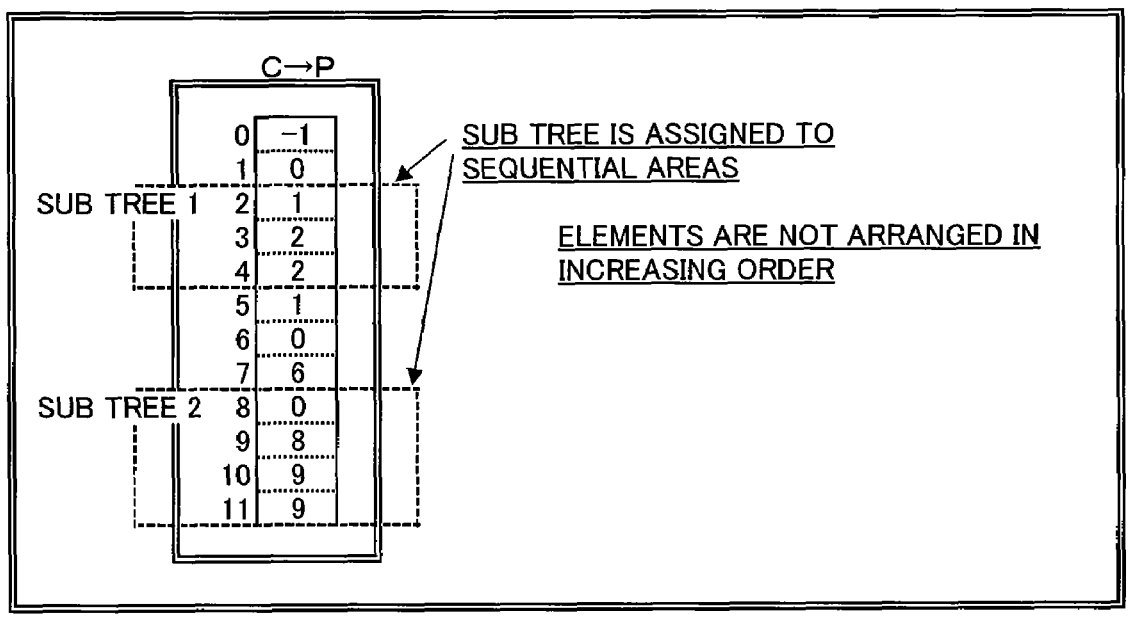
FIG. 9 is a diagram showing the array of parent-child relationship based on the "child→parent" expression created according to the embodiment of the invention.
Figure 10:
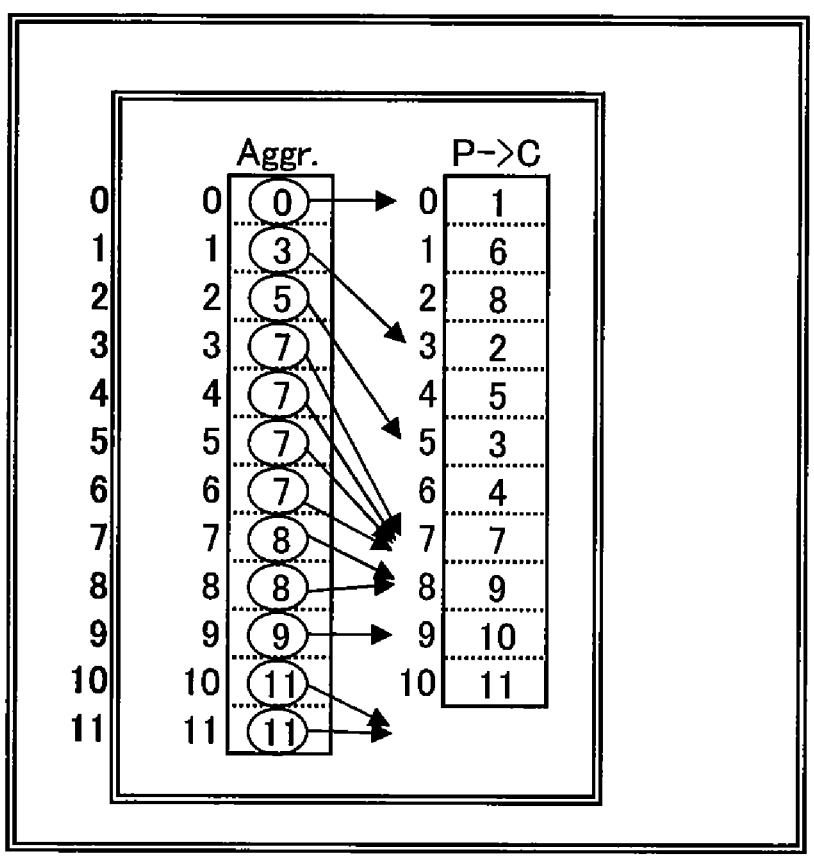
FIG. 10 is a diagram showing the array of the parent-child relationship based on the "parent-child" expression created from the tree data structure based on the depth-first shown in FIGS. 6A to C.
Figure 11:
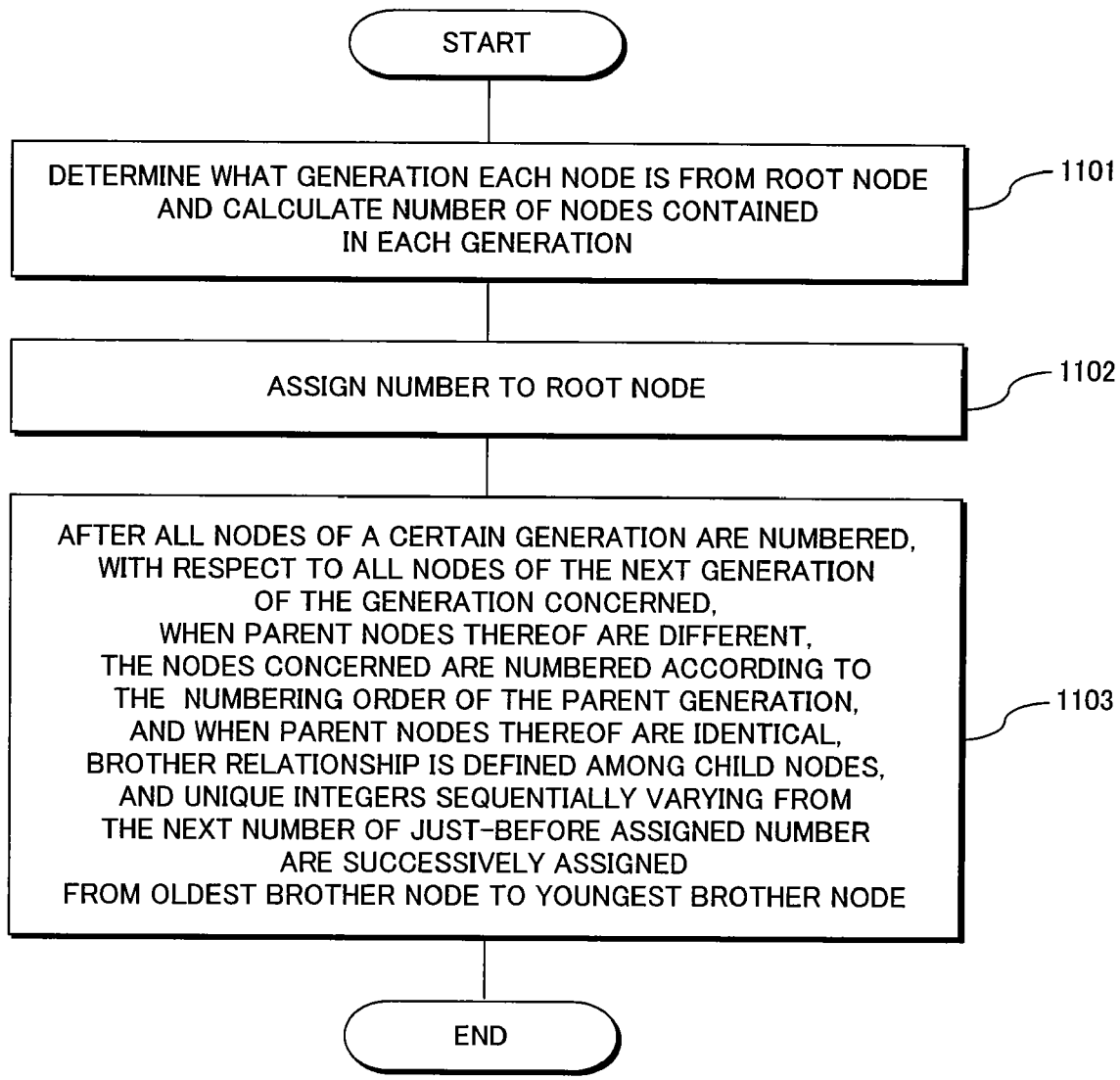
FIG. 11 is a flowchart node definition processing based on width-first according to the embodiment of the invention.
Figure 12:
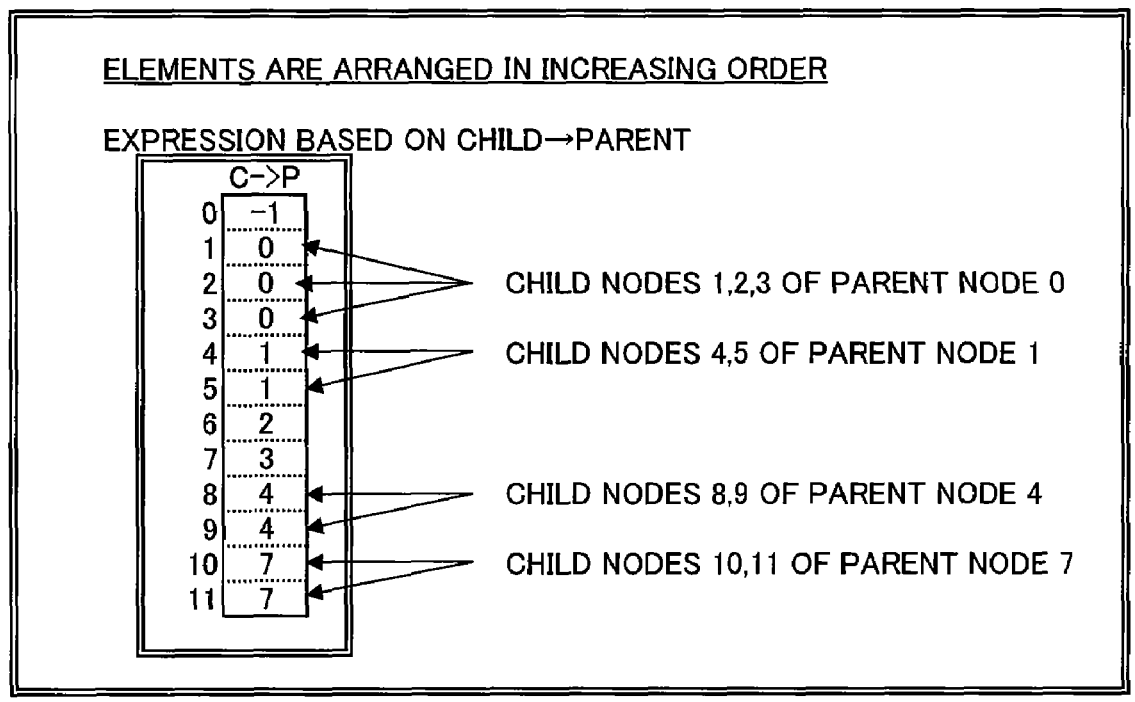
FIG. 12 is a diagram showing the array of the parent-child relationship based on the "child→parent" expression created according to the embodiment of the invention.
Figure 13:
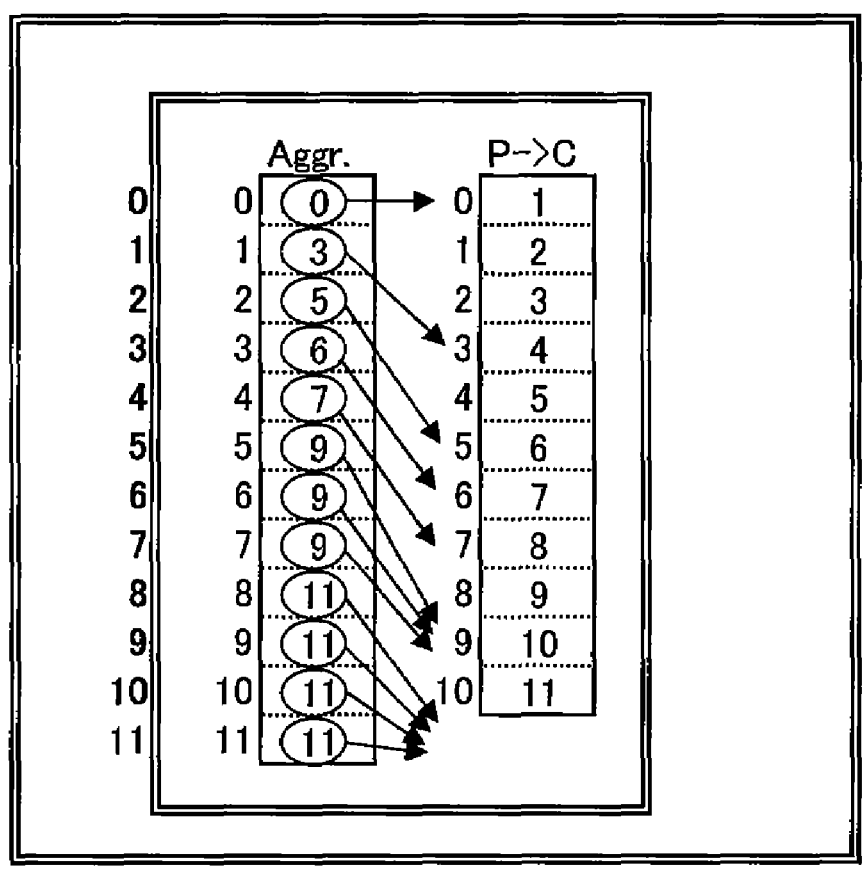
FIG. 13 is a diagram showing the array of the parent-child relationship based on the "parent→child" expression created from the tree data structure based on depth-first shown in FIGS. 7A to C.
Figure 14:
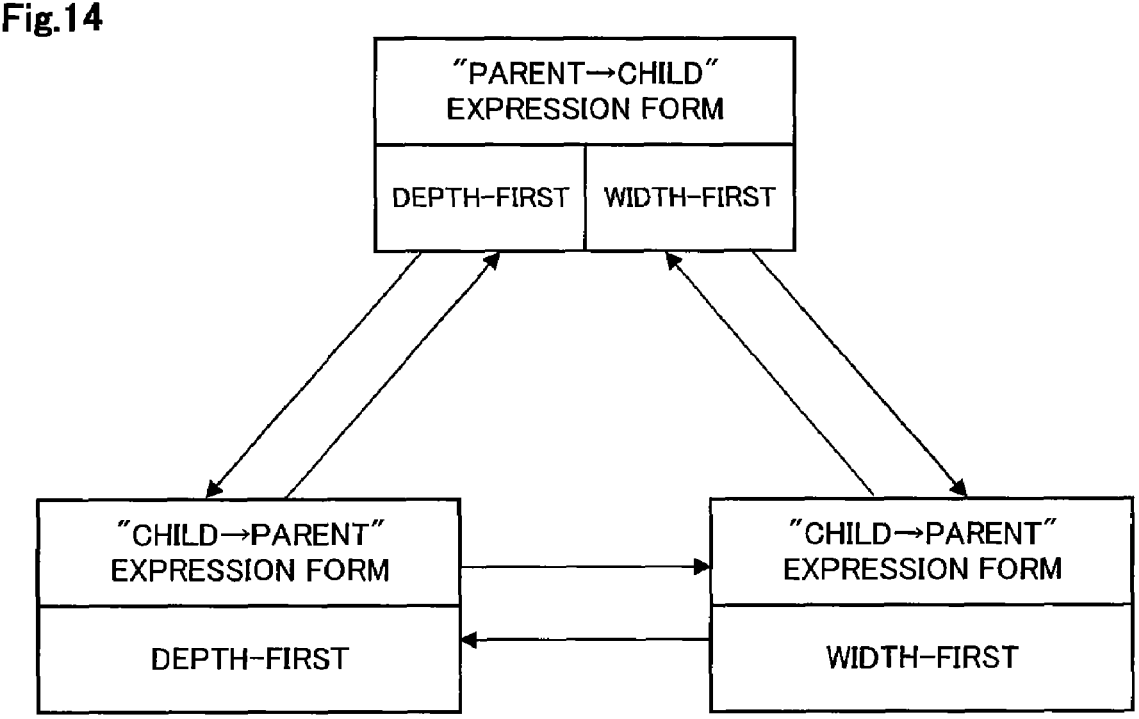
FIG. 14 is a diagram showing the mutual conversion relationship of tree expression forms according to the embodiment of the invention.
Figure 15:
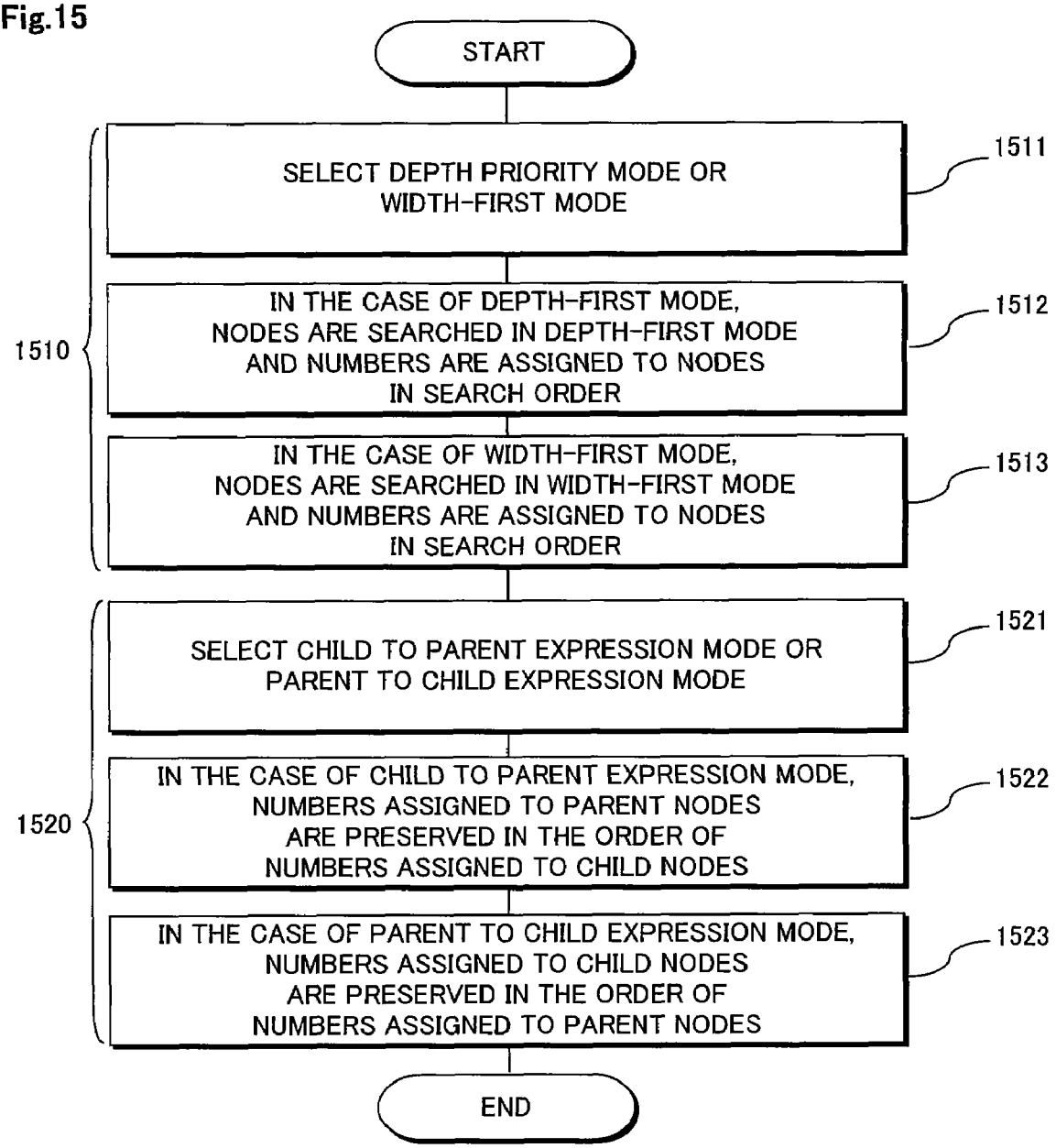
FIG. 15 is a flowchart showing the method of building the tree data structure implemented by a computer system according to the embodiment of the invention.
Figure 16B:
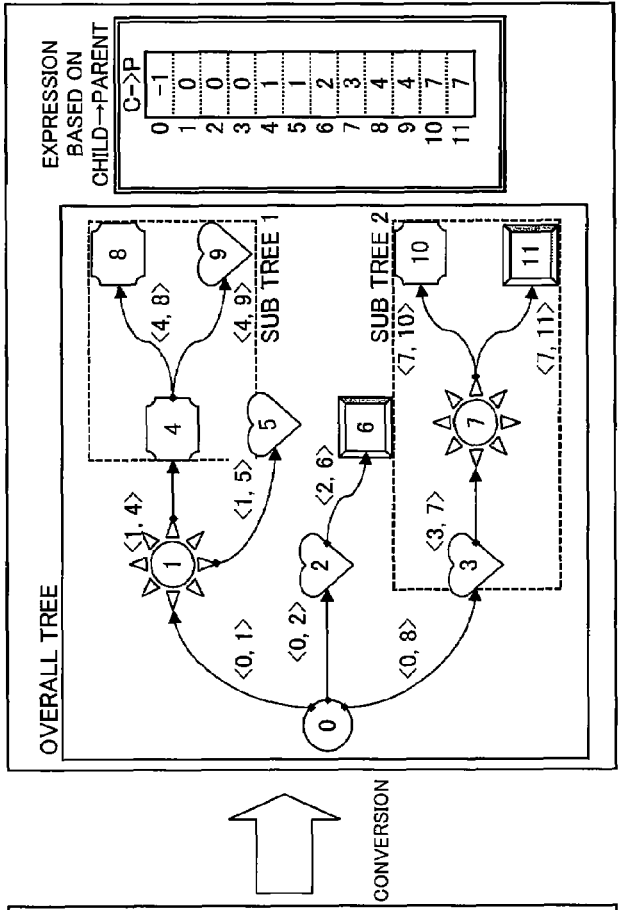
FIGS. 16A, B are diagrams showing the conversion from the depth-first "child→parent" expression to the width-first "child→parent" expression according to the embodiment of the invention.
Figure 16A:
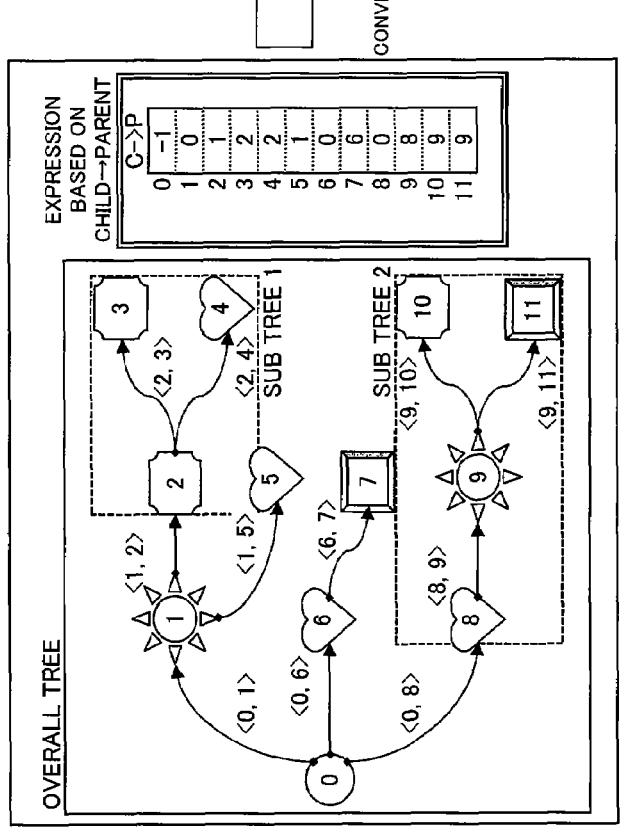
Figure 17:
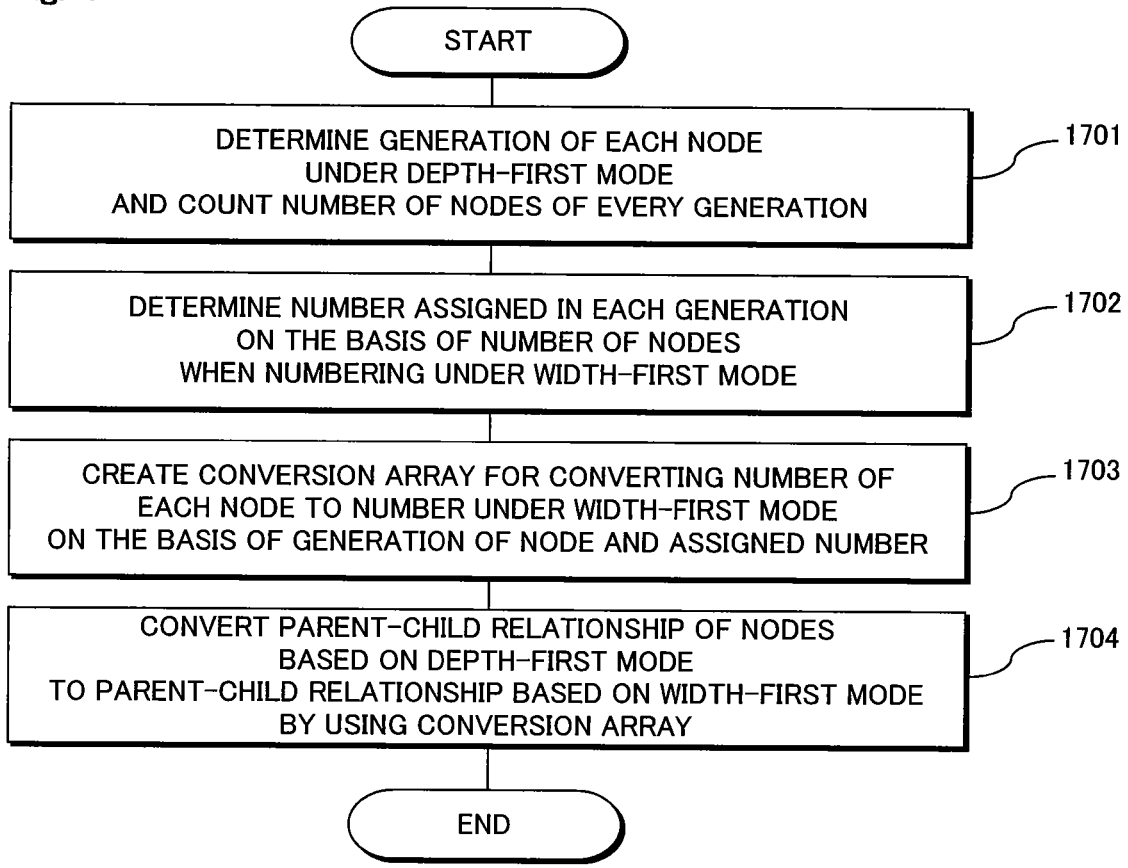
FIG. 17 is a flowchart showing the method of the conversion from the depth-first "child→parent" expression to the width-first "child→parent" expression according to the embodiment of the invention.
Figure 19A:
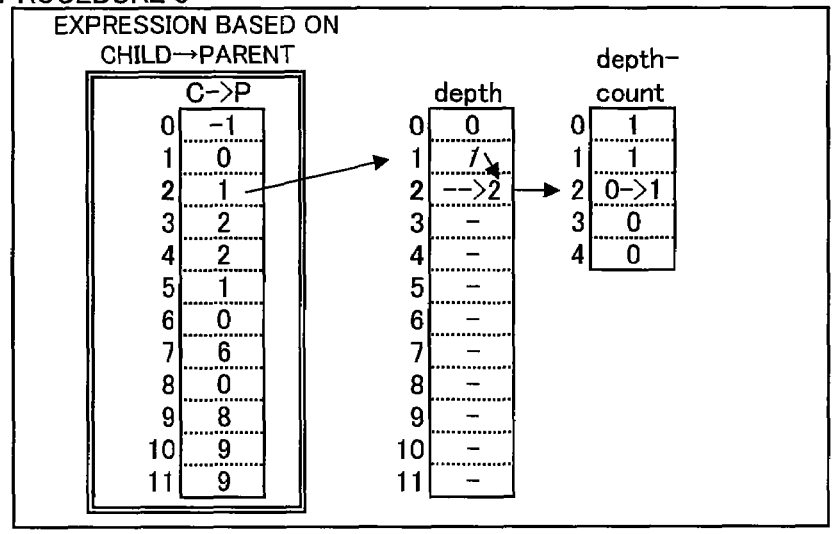
FIGS. 19A to C are diagrams showing the processing (procedures 0 to 2) for counting the number of nodes belonging to each generation of the tree data structure based on the depth-first according to the embodiment of the invention.
Figure 19B:
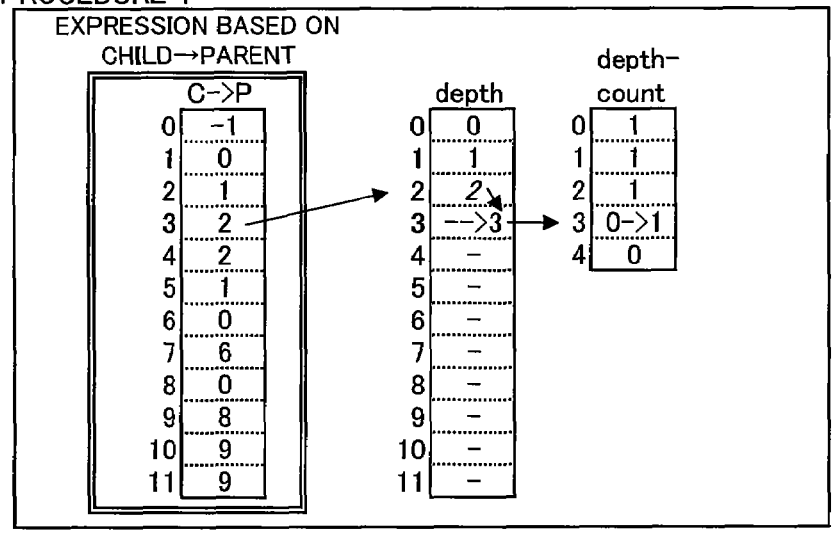
Figure 19C:
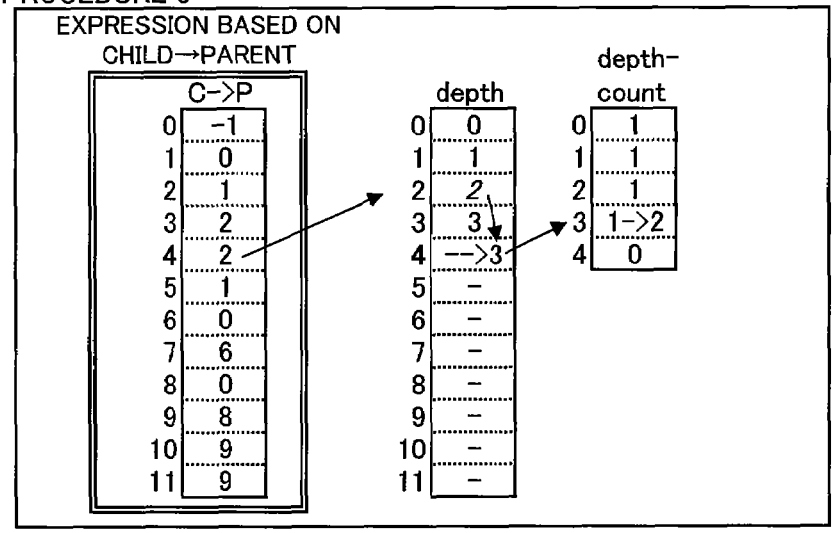
Figure 21A:
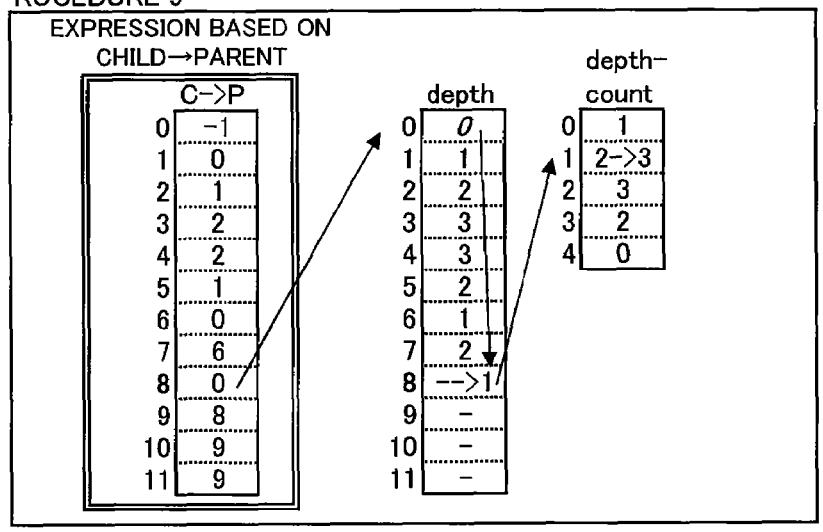
FIGS. 21A to C are diagrams showing the processing (procedures 6 to 8) for counting the number of nodes belonging to each generation of the tree data structure based on the depth-first according to the embodiment of the invention.
Figure 21B:
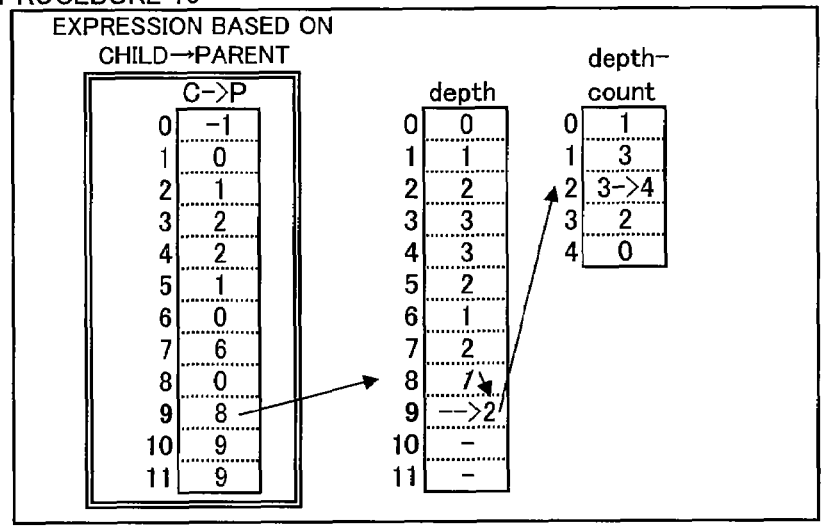
Figure 21C:
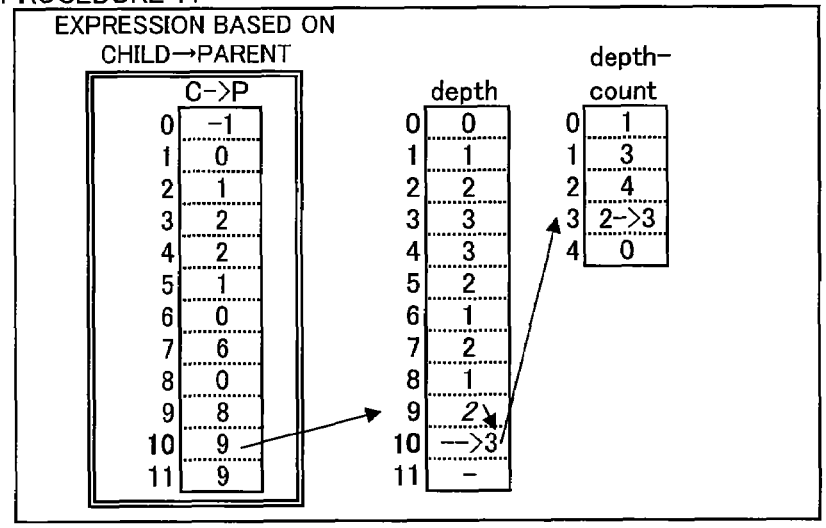
Figure 23:
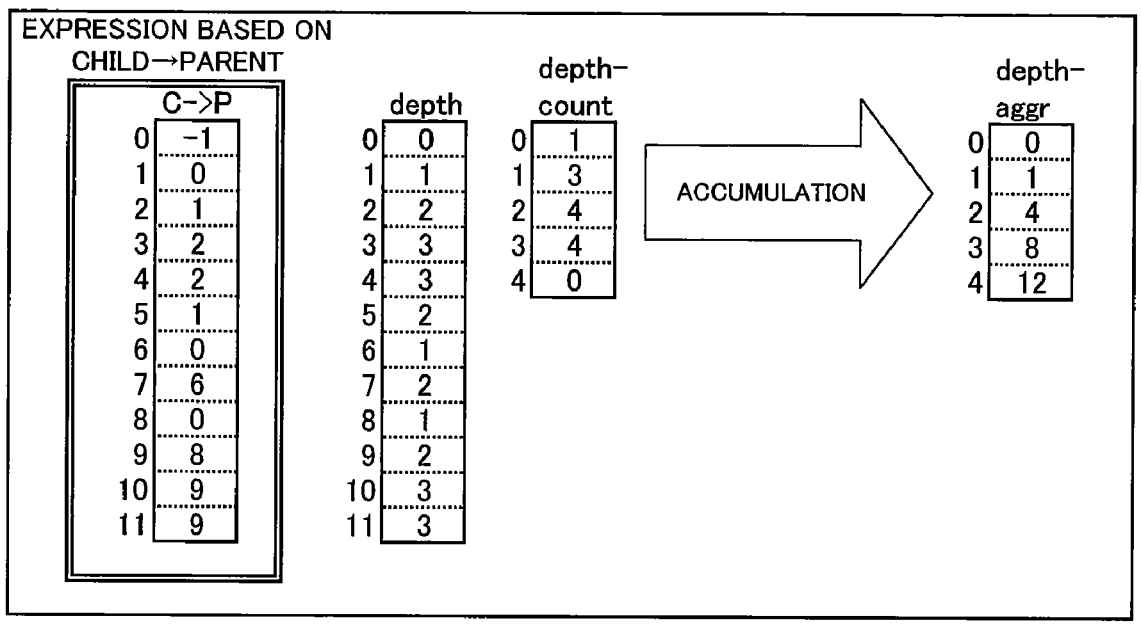
FIG. 23 is a diagram showing the processing (procedure 12) for counting the number of nodes belonging to each generation of the tree data structure based on the depth-first according to the embodiment of the invention.
Figure 29:
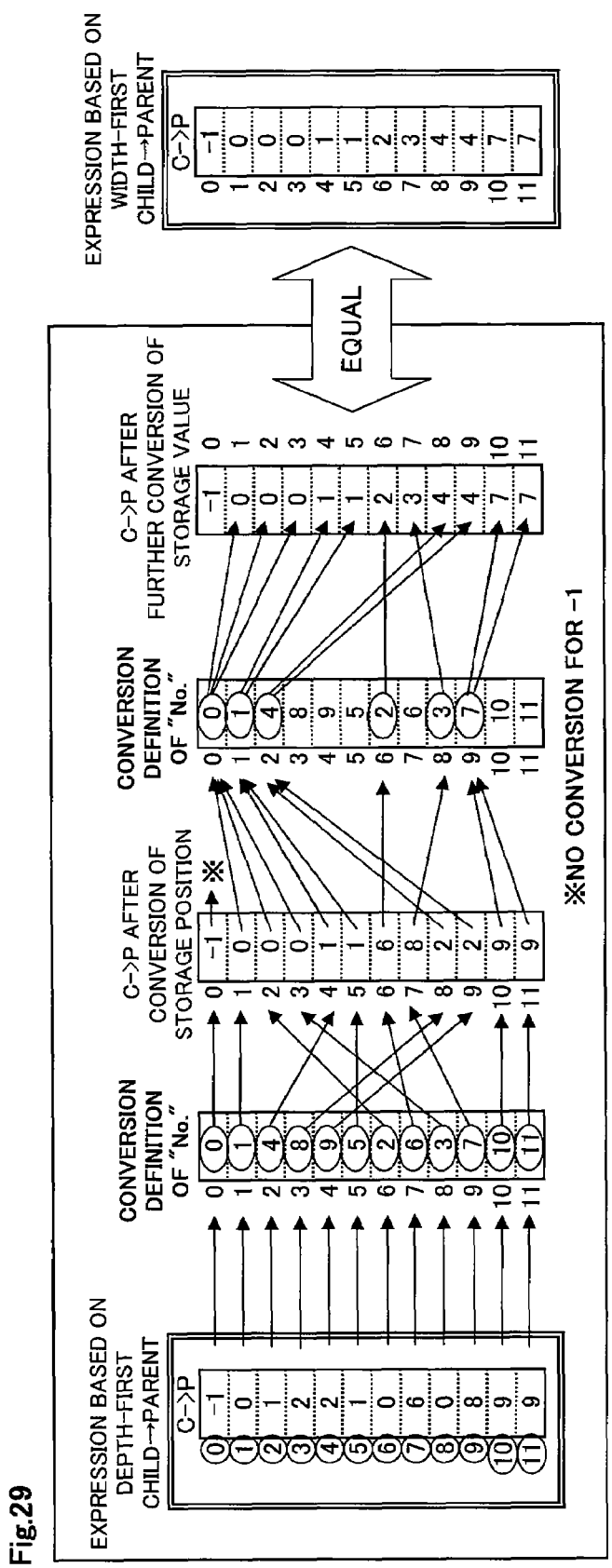
FIG. 29 is a diagram showing the processing for converting the parent-child relationship based on depth-first according to the embodiment of the invention.
Figure 31:
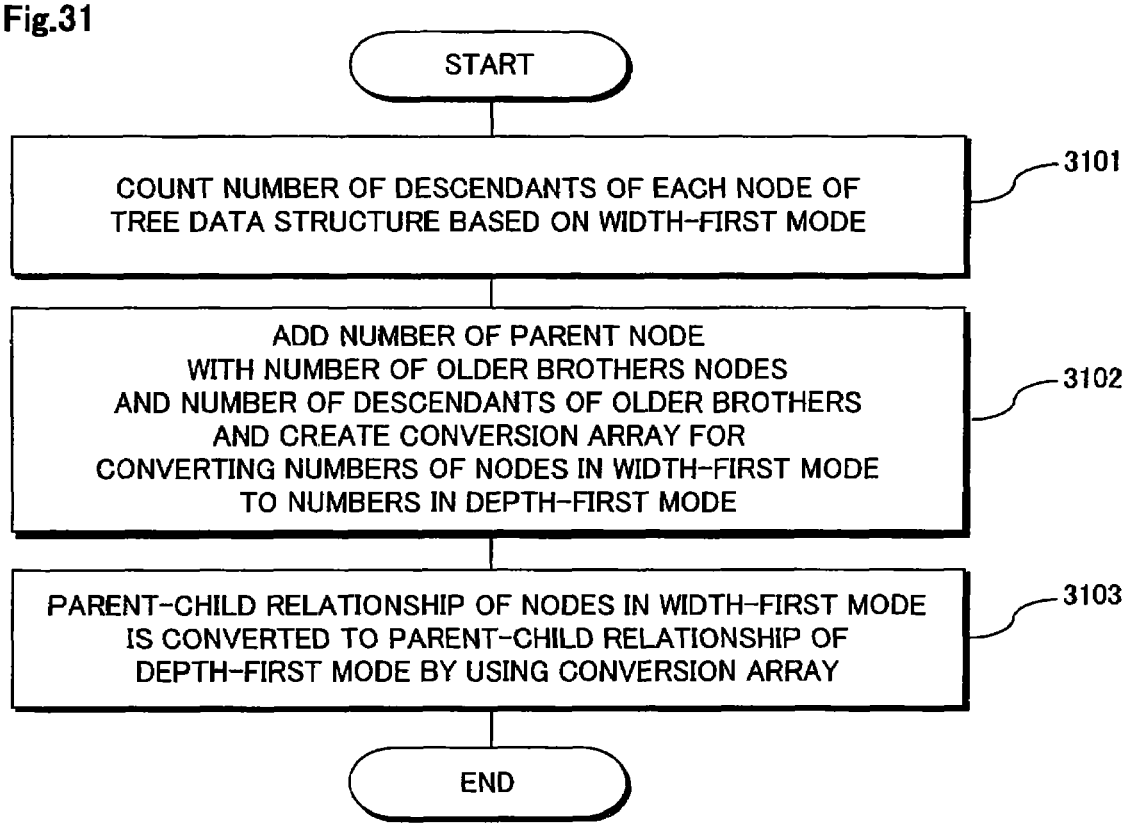
FIG. 31 is a flowchart showing the method of the conversion from the width-first "child→parent" expression to the depth-first "child→parent" according to the embodiment of the invention.
Figure 33:
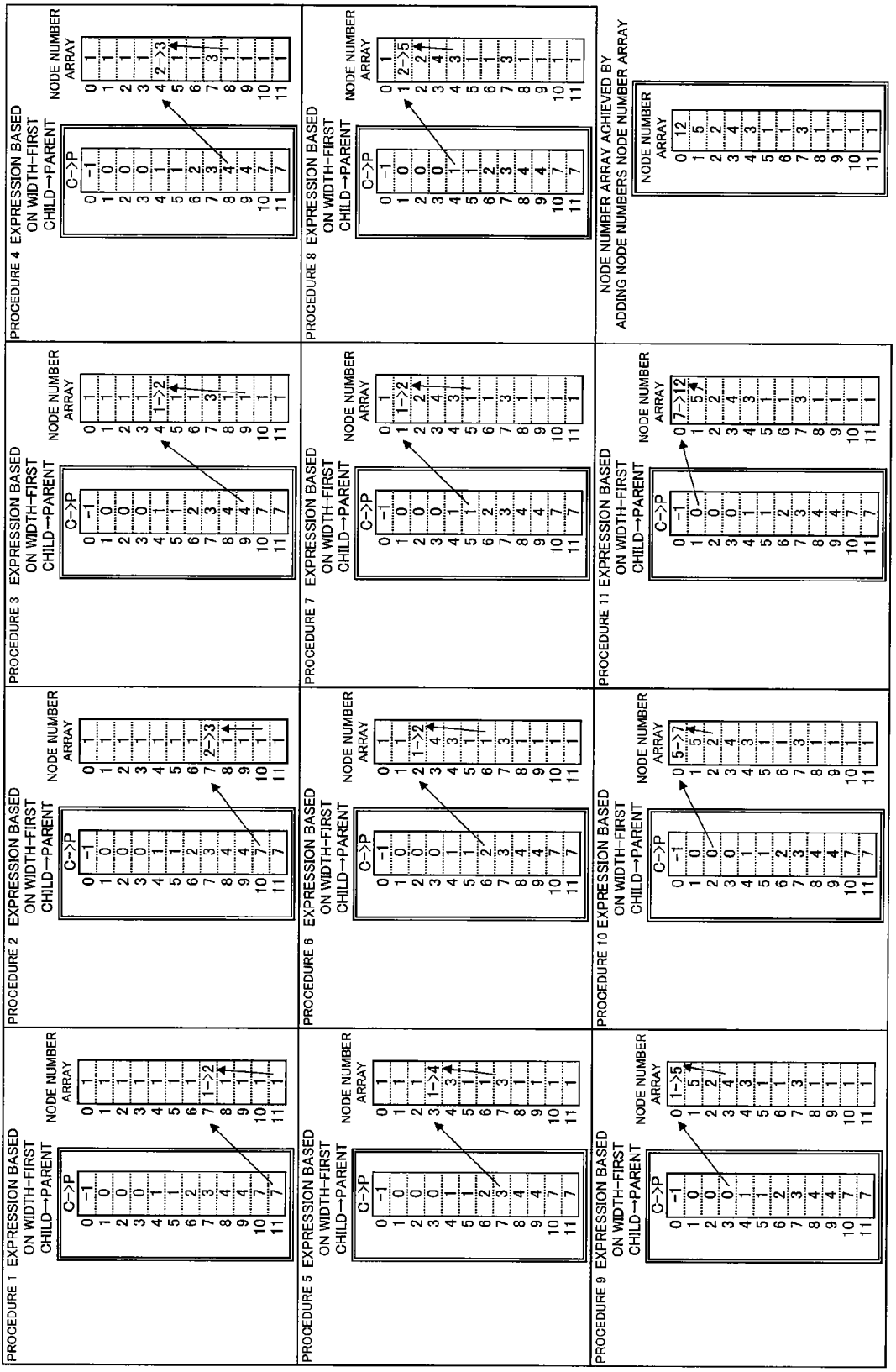
FIG. 33 is a diagram (part 2) of the processing of counting the number of descendants of each node of the tree data structure based on the width-first according to the embodiment of the invention.
Figure 34:
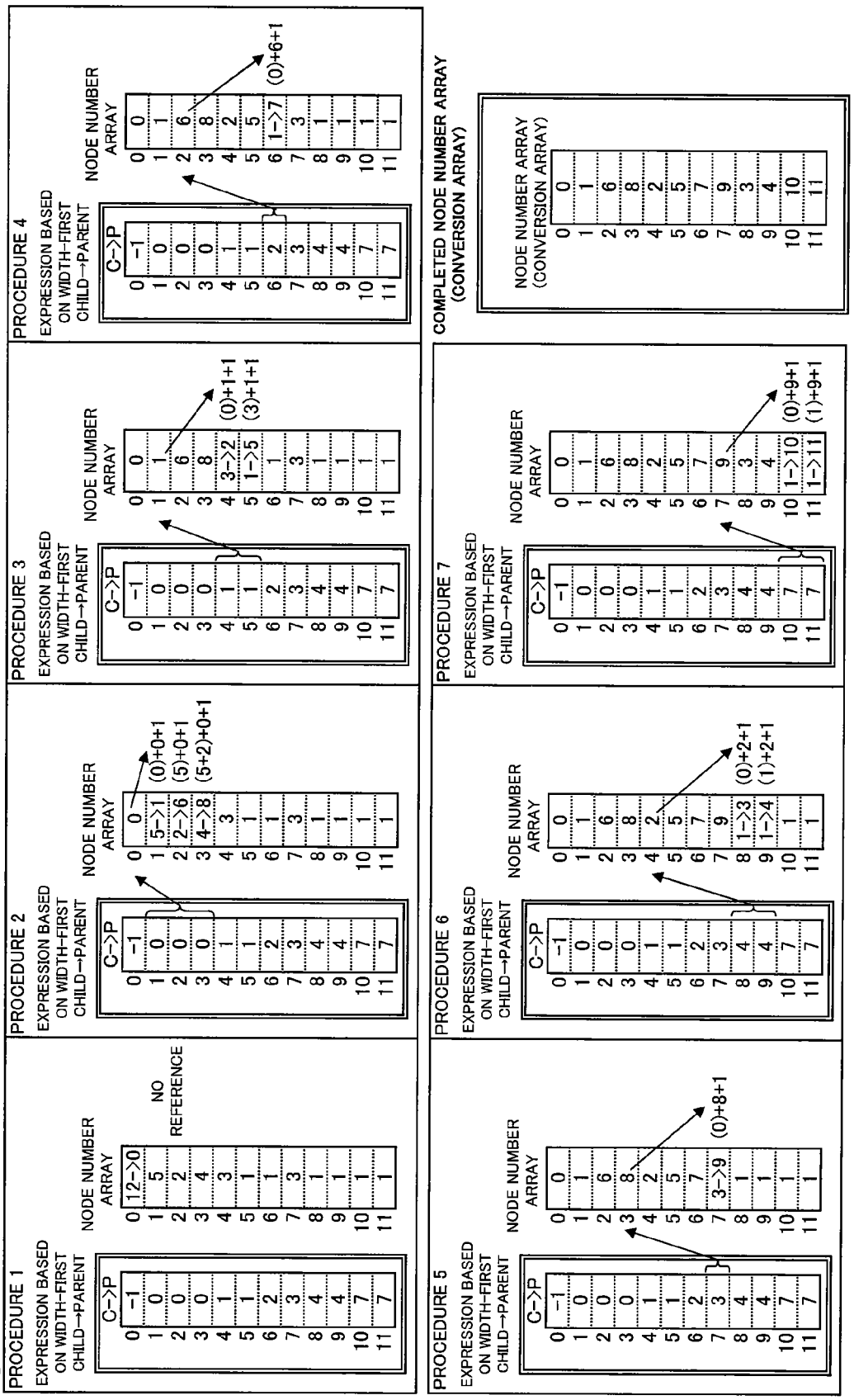
FIG. 34 is a diagram showing the processing of creating the conversion array from the numbers of the width-first mode to the numbers of the depth-first mode.
Figure 35:
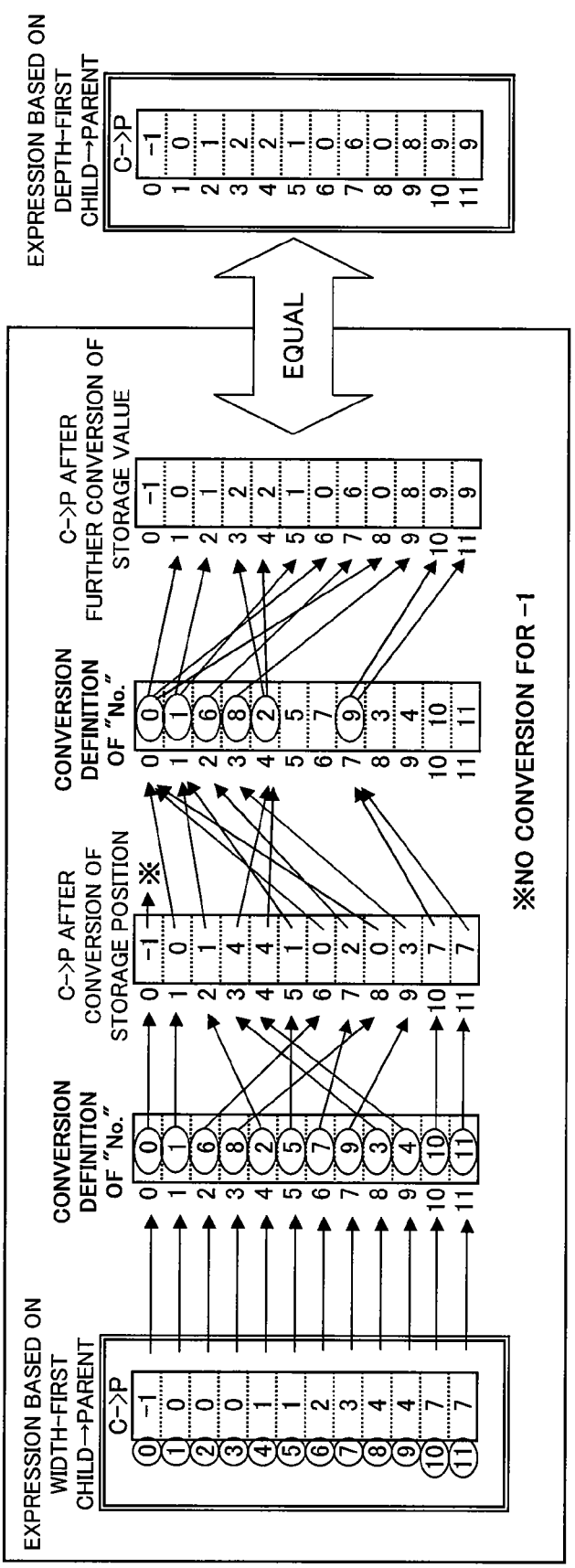
FIG. 35 is a diagram showing the processing of converting the parent-child relationship of nodes based on the width-first to the parent-child relationship of nodes based on the depth-first according to the embodiment of the invention.
Figure 36:
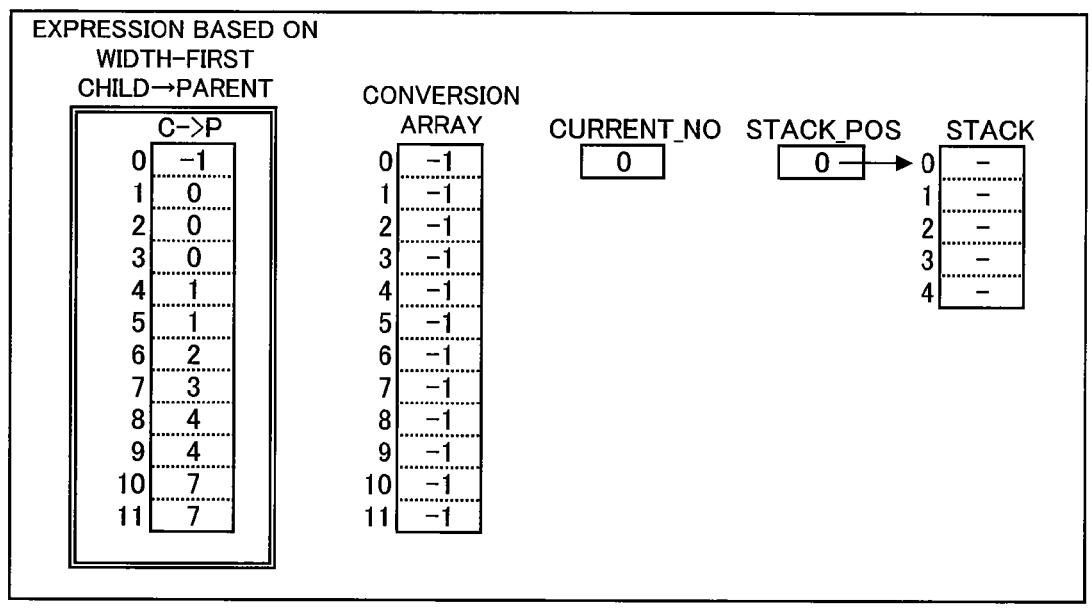
FIG. 36 is a diagram (part 1) of the method of conversion from the width-first "child→parent" expression to the depth-first "child→parent" expression according to the embodiment of the invention.
Figure 43A:
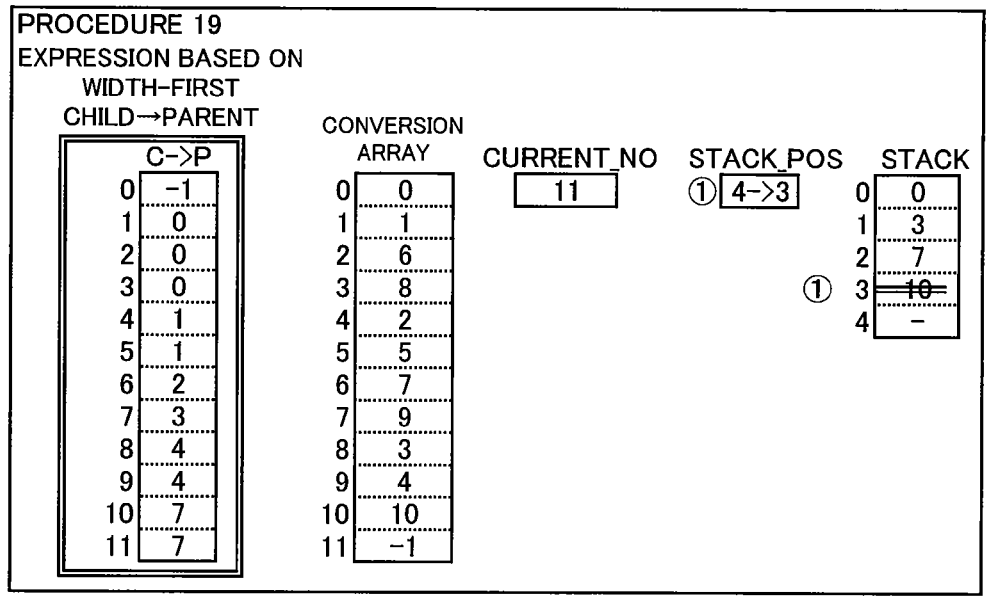
FIGS. 43A, B are diagrams (part 8) of the method for the conversion from the width-first "child→parent" expression to the depth-first "child→parent" according to another embodiment of the invention.
Figure 43B:
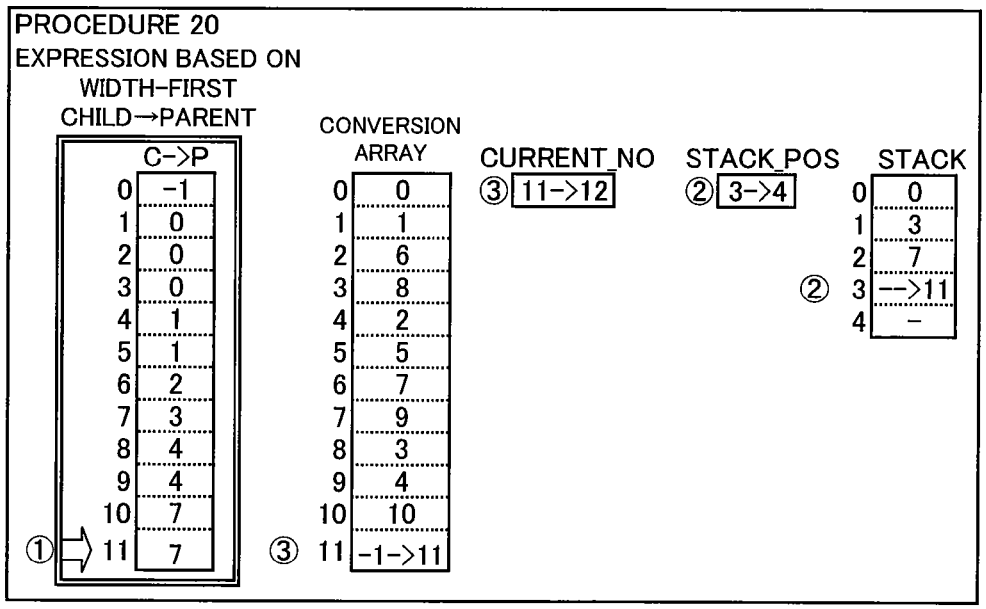
Figure 44:
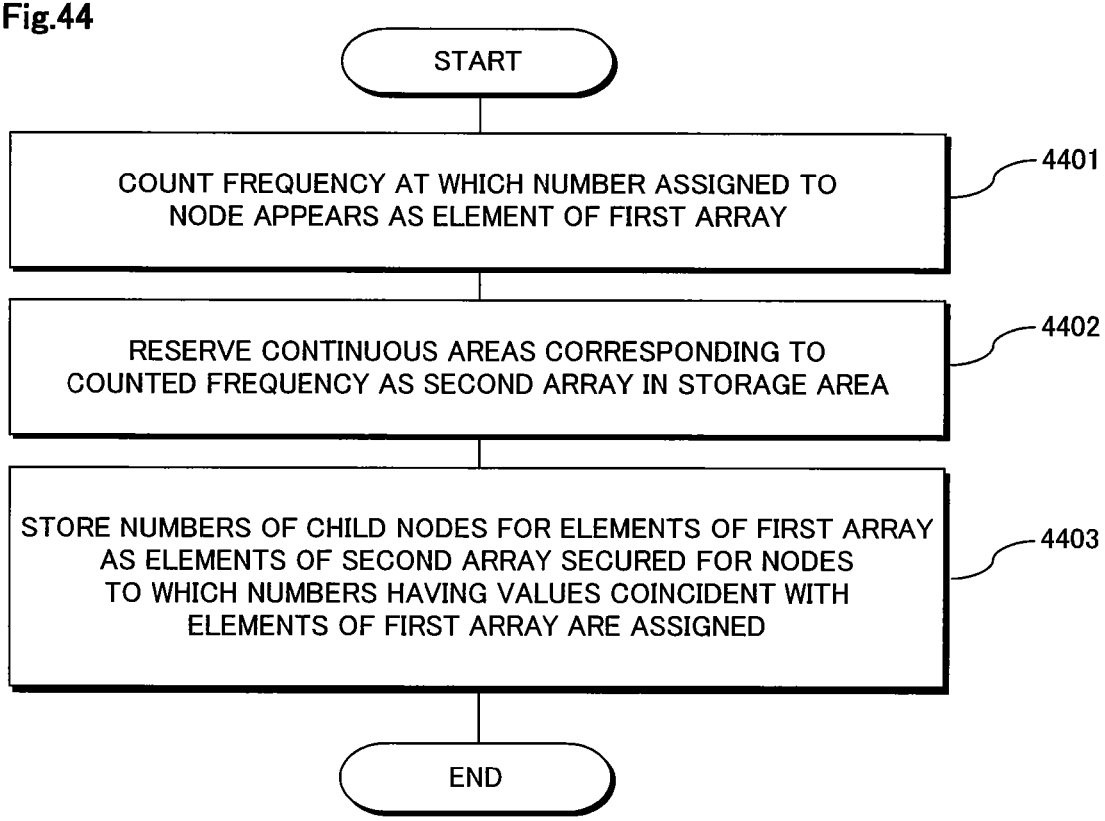
FIG. 44 is a flowchart showing the method for the conversion from the "child→parent" expression to the "parent→child" expression according to the embodiment of the invention.
Figure 47A:
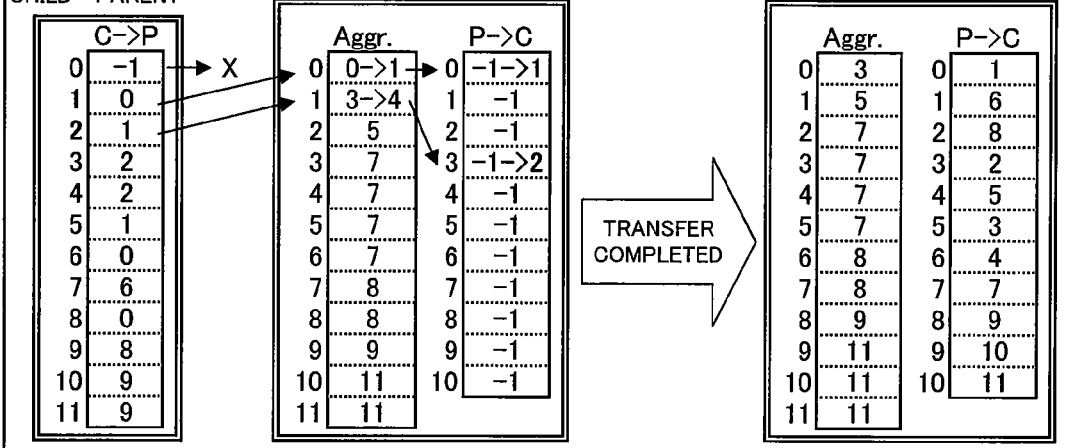
FIGS. 47A to C are diagrams (part 2) of the method for the conversion from the "child→parent" expression based on the depth-first mode to the "parent→child" expression based on the depth-first mode.
Figure 47B:
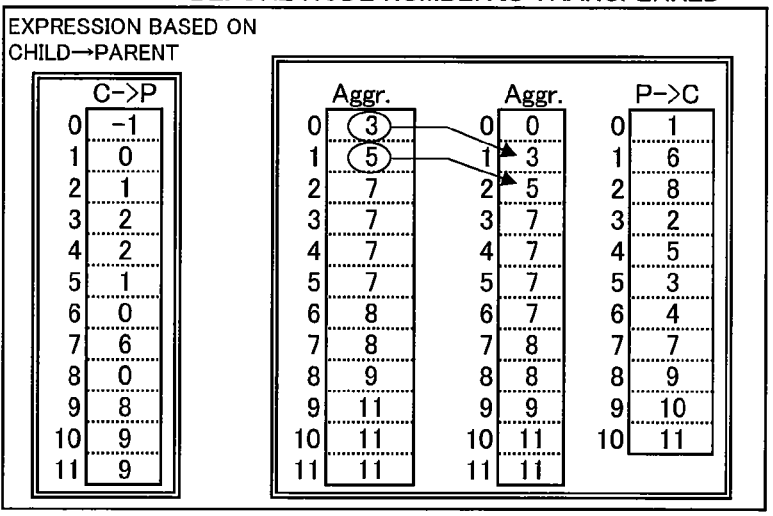
Figure 47C:
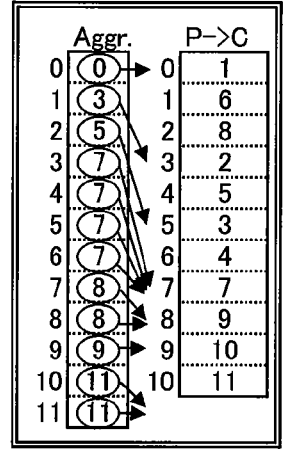
Figure 48:
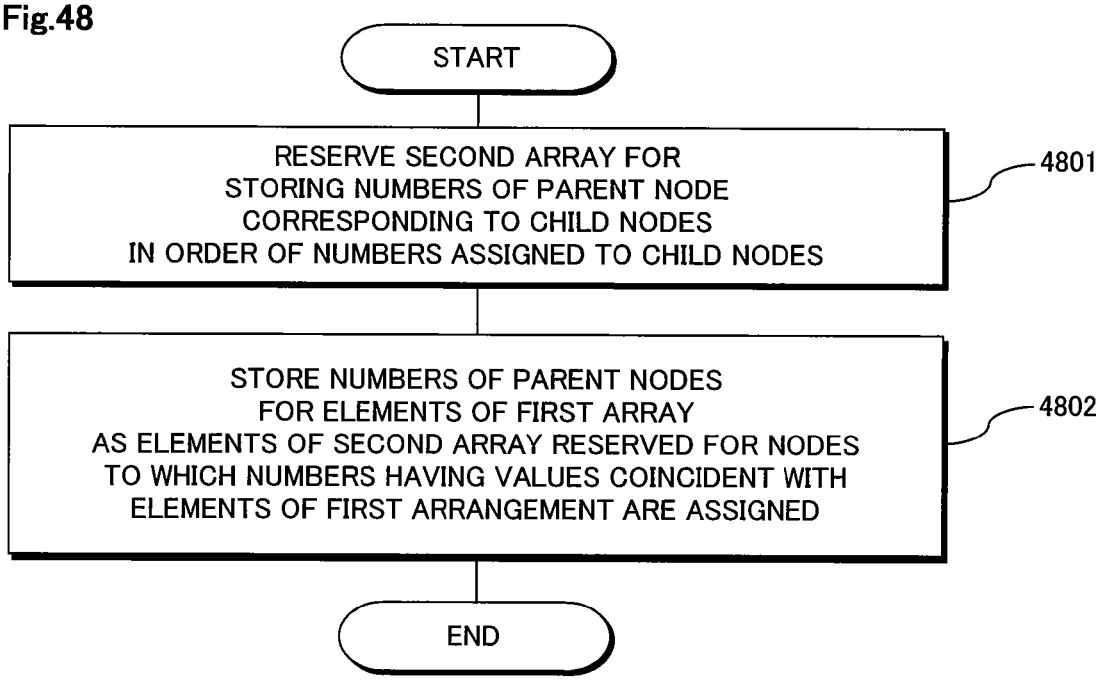
FIG. 48 is a flowchart showing the method for the conversion from the "parent→child" expression to the "child→parent" expression according to the embodiment of the invention.
Figure 50:
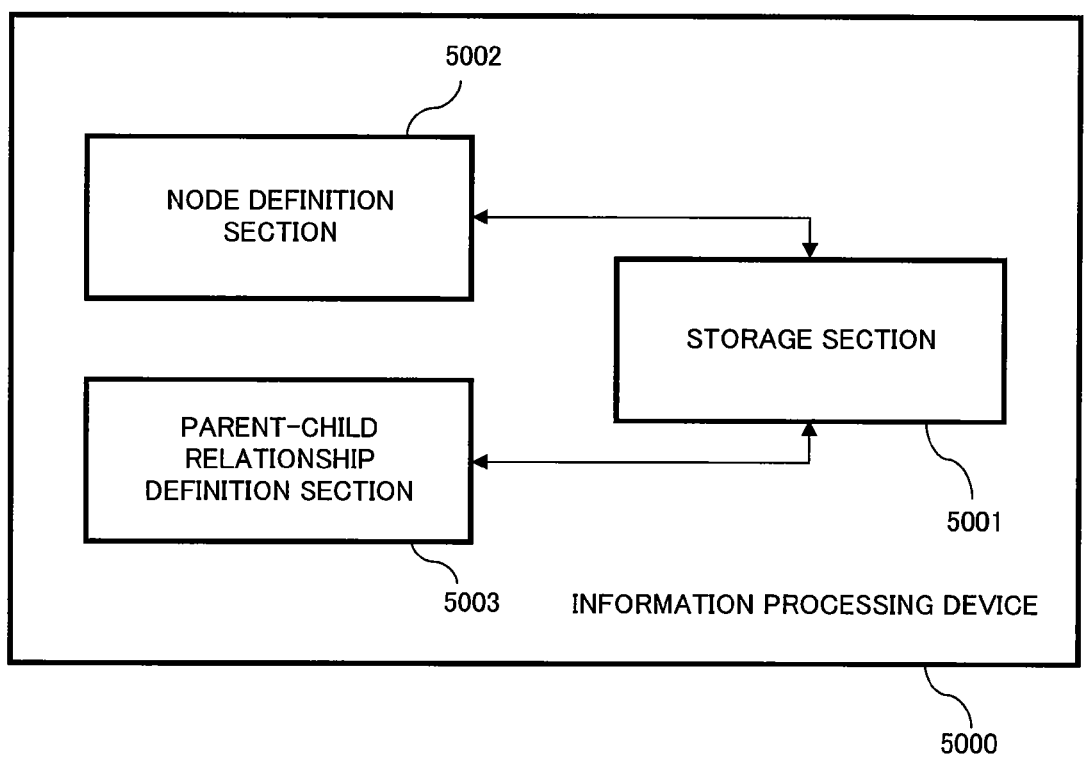
FIG. 50 is a block diagram showing an information processing device for building the tree data structure on a storage device according to the embodiment of the invention.

| | |
|---|---|
| 10 | computer system |
| 12 | CPU |
| 14 | RAM |
| 16 | ROM |
| 18 | fixed storage device |
| 20 | CD-ROM driver |
| 22 | I/F |
| 24 | input device |
| 26 | display device |
| 5000 | information processing device |
| 5001 | storage section |
| 5002 | node definition section |
| 5003 | parent-child relationship definition section |

The invention claimed is:

1. A method of converting an expression form of a tree data structure represented by using parent-child relationship on a storage device, the parent-child relationship being defined by storing numbers assigned to parent nodes in the storage device in the order of numbers assigned to child nodes corresponding to the respective parent nodes, the method comprising the steps of:

calculating a generation number for each node in the tree data structure expressed in a depth-first mode for assigning numbers to nodes in the same generation as a certain node earlier than child nodes of the certain node, and a count of nodes belonging to each generation;

determining numbers assigned to nodes in each generation on the basis of the count of the nodes belonging to each generation when the numbers are assigned in a width-first mode for assigning numbers to child nodes of a certain node earlier than nodes in the same generation as the certain node;

creating a conversion array for converting the numbers assigned to the respective nodes in the depth-first mode to numbers to be assigned to the nodes in the width-first mode on the basis of the calculated generation number for each node and the determined numbers assigned to the nodes in each generation; and converting the parent-child relationship for each node to another parent-child relationship expressed by the numbers assigned to the nodes in the width-first mode by using the conversion array.

2. A method of converting an expression form of a tree data structure represented by using parent-child relationship on a storage device, the parent-child relationship being defined by storing numbers assigned to parent nodes in the storage device in the order of numbers assigned to child nodes corresponding to the respective parent nodes, the method comprising the steps of:

counting a count of descendant nodes of each node in the tree data structure expressed in a width-first mode for assigning numbers to child nodes of a certain node earlier than nodes in the same generation as the certain node;

creating a conversion array for converting the numbers assigned to the respective nodes in the width-first mode to numbers to be assigned to the nodes in a depth-first mode for assigning numbers to child nodes of a certain node earlier than nodes in the same generation as the certain node, wherein the number to be assigned to current node is calculated by adding a count of older sibling nodes which originate from the same parent node as the current node and have been assigned their numbers earlier than the current node and a count of descendant nodes of the respective older sibling node to the number to be assigned to the parent node of the current node; and converting the parent-child relationship for each node to another parent-child relationship expressed by the numbers assigned to the nodes in the depth-first mode by using the conversion array.

3. A method of converting an expression form of a tree data structure represented by using parent-child relationship on a storage device, the parent-child relationship being defined by storing numbers assigned to parent nodes in the storage device in the order of numbers assigned to child nodes corresponding to the respective parent nodes, the method comprising the steps of:

retrieving nodes in a depth-first order from the tree data structure expressed in a width-first mode for assigning numbers to child nodes of a certain node earlier than nodes in the same generation as the certain node, and creating a conversion array for converting the numbers assigned to the nodes in the width-first mode to numbers to be assigned to the nodes in a depth-first mode for assigning numbers to nodes in the same generation as a certain node earlier than child nodes of the certain node; and converting the parent-child relationship for each node to another parent-child relationship expressed by the numbers assigned to the nodes in the depth-first mode by using the conversion array.

4. A method of converting an expression form of a tree data structure represented by using parent-child relationship on a storage device, the parent-child relationship being defined by storing numbers assigned to parent nodes as elements of a first array in the storage device in the order of numbers assigned to child node corresponding to the respective parent nodes, the method comprising the steps of:

counting an occurrence count of the numbers assigned to each node as an element of the first array;

reserving consecutive locations corresponding to the counted occurrence count in the storage device as a second array in order to store numbers assigned to child nodes corresponding to each node; and successively reading the elements from the first array, and successively storing the numbers assigned to the child nodes corresponding to the elements in the first array as elements of the second array reserved for the nodes to which numbers having values equal to the read elements are assigned.

5. A method of converting an expression form of a tree data structure represented by using parent-child relationship on a storage device, the parent-child relationship being defined by storing numbers assigned to child nodes as elements of a first array in the storage device in the order of numbers assigned to parent nodes corresponding to the respective child nodes, the method comprising the steps of:

reserving a second array in the storage device in order to store numbers assigned to the parent nodes corresponding to the respective child nodes in the order of the numbers assigned to the child nodes; and successively reading the elements from the first array and successively storing the numbers assigned to the parent nodes corresponding to the elements in the first array as elements of the second array reserved for the nodes to which numbers having values equal to the read elements are assigned.

6. An information processing device of converting an expression form of a tree data structure represented by using parent-child relationship on a storage device, said storage device holding the parent-child relationship defined by assigning numbers to parent nodes in the order of numbers assigned to child nodes corresponding to the respective parent nodes, the information processing device comprising:

means for calculating a generation number for each node in the tree data structure expressed in a depth-first mode for assigning numbers to nodes in the same generation as a certain node earlier than child nodes of the certain node, and counting a count of nodes belonging to each generation;

means for determining numbers assigned to nodes in each generation on the basis of the count of the nodes belonging to each generation when the numbers are assigned in a width-first mode for assigning numbers to child nodes of a certain node earlier than nodes in the same generation as the certain node;

means for creating a conversion array for converting the numbers assigned to the respective nodes in the depth-first mode to numbers to be assigned in the width-first mode on the basis of the calculated generation number for each node and the determined numbers assigned to the nodes in each generation; and means for converting the parent-child relationship for each node to another parent-child relationship expressed by the numbers assigned to the nodes in the width-first mode by using the conversion array.

7. An information processing device of converting an expression form of a tree data structure represented by using parent-child relationship on a storage device, said storage device holding the parent-child relationship defined by assigning numbers to parent nodes in the order of numbers assigned to child nodes corresponding to the respective parent nodes, the information processing device comprising:

means for counting a count of descendant nodes of each node in the tree data structure expressed in a width-first mode for assigning numbers to child nodes of a certain node earlier than nodes in the same generation as the certain node;

means for creating a conversion array for converting the numbers assigned to the respective nodes in the width-first mode to numbers to be assigned to the nodes in a depth-first mode for assigning numbers to child nodes of a certain node earlier than nodes in the same generation as the certain node, wherein the number to be assigned to current node is calculated by adding a count of older sibling nodes which originate from the same parent node as the current node and have been assigned their numbers earlier than the current node and a count of descendant nodes of the respective older sibling node to the number to be assigned to the parent node of the current node; and means for converting the parent-child relationship for each node to another parent-child relationship expressed by the numbers assigned to the nodes in the depth-first mode by using the conversion array.

8. An information processing device of converting an expression form of a tree data structure represented by using parent-child relationship on a storage device, said storage device holding the parent-child relationship defined by assigning numbers to parent nodes in the order of numbers assigned to child nodes corresponding to the respective parent nodes, the information processing device comprising:

means for retrieving nodes in a depth-first order from the tree data structure expressed in a width-first mode for assigning numbers to child nodes of a certain node earlier than nodes in the same generation as the certain node, and creating a conversion array for converting the numbers assigned to the nodes in the width-first mode to numbers to be assigned to the nodes in a depth-first mode for assigning numbers to nodes in the same generation as a certain node earlier than child nodes of the certain node; and means for converting the parent-child relationship for each node to another parent-child relationship expressed by the numbers assigned to the nodes in the depth-first mode by using the conversion array.

9. An information processing device of converting an expression form of a tree data structure represented by using parent-child relationship on a storage device, wherein the storage device holds numbers assigned to parent nodes as elements of a first array defining the parent-child relationship in the order of numbers assigned to child node corresponding to the respective parent nodes, and said information processing device comprises:

means for counting an occurrence count of the numbers assigned to each node as an element of the first array;

means for reserving consecutive locations corresponding to the counted occurrence count in the storage device as a second array in order to store numbers assigned to child nodes corresponding to each node; and means for successively reading the elements from the first array, and successively storing the numbers assigned to the child nodes corresponding to the elements in the first array as elements of the second array reserved for the nodes to which numbers having values equal to the read elements are assigned.

10. An information processing device of converting an expression form of a tree data structure represented by using parent-child relationship on a storage device, wherein the storage device holds numbers assigned to child nodes as elements of a first array defining the parent-child relationship in the order of numbers assigned to parent node corresponding to the respective child nodes, and said information processing device comprises:

means for reserving a second array in the storage device in order to store numbers assigned to the parent nodes corresponding to the respective child nodes in the order of the numbers assigned to the child nodes; and means for successively reading the elements from the first array and successively storing the numbers assigned to the parent nodes corresponding to the elements in the first array as elements of the second array reserved for the nodes to which numbers having values equal to the read elements are assigned.

11. A program stored on a storage device, wherein the program makes a computer convert an expression form of a tree data structure that is represented by a parent-child relationship, wherein the program makes the computer execute the steps of:

defining the parent-child relationship by storing numbers assigned to parent nodes in the storage device in the order of numbers assigned to child nodes corresponding to the respective parent nodes;

calculating a generation number for each node in the tree data structure expressed in a depth-first mode for assigning numbers to nodes in the same generation as a certain node earlier than child nodes of the certain node, and a count of nodes belonging to each generation;

determining numbers assigned to nodes in each generation on the basis of the count of the nodes belonging to each generation when the numbers are assigned in a width-first mode for assigning numbers to child nodes of a certain node earlier than nodes in the same generation as the certain node;

creating a conversion array for converting the numbers assigned to the respective nodes in the depth-first mode to numbers to be assigned to the nodes in the width-first mode on the basis of the calculated generation number for each node and the determined numbers assigned to the nodes in each generation; and converting the parent-child relationship for each node to another parent-child relationship expressed by the numbers assigned to the nodes in the width-first mode by using the conversion array.

12. A program stored on a storage device, wherein the program makes a computer convert an expression form of a tree data structure represented by a parent-child relationship, wherein the program makes the computer execute the steps of:

defining the parent-child relationship by storing numbers assigned to parent nodes in the storage device in the order of numbers assigned to child nodes corresponding to the respective parent nodes;

counting a count of descendant nodes of each node in the tree data structure expressed in a width-first mode for assigning numbers to child nodes of a certain node earlier than nodes in the same generation as the certain node;

creating a conversion array for converting the numbers assigned to the respective nodes in the width-first mode to numbers to be assigned to the nodes in a depth-first mode for assigning numbers to child nodes of a certain node earlier than nodes in the same generation as the certain node, wherein the number to be assigned to current node is calculated by adding a count of older sibling nodes which originate from the same parent node as the current node and have been assigned their numbers earlier than the current node and a count of descendant nodes of the respective older sibling node to the number to be assigned to the parent node of the current node; and converting the parent-child relationship for each node to another parent-child relationship expressed by the numbers assigned to the nodes in the depth-first mode by using the conversion array.

13. A program stored on a storage device, wherein the program makes a computer convert an expression form of a tree data structure that is represented by a parent-child relationship, wherein the program makes the computer execute the steps of:

defining the parent-child relationship by storing numbers assigned to parent nodes in the storage device in the order of numbers assigned to child nodes corresponding to the respective parent nodes;

retrieving nodes in a depth-first order from the tree data structure expressed in a width-first mode for assigning numbers to child nodes of a certain node earlier than nodes in the same generation as the certain node, and creating a conversion array for converting the numbers assigned to the nodes in the width-first mode to numbers to be assigned to the nodes in a depth-first mode for assigning numbers to nodes in the same generation as a certain node earlier than child nodes of the certain node; and converting the parent-child relationship for each node to another parent-child relationship expressed by the numbers assigned to the nodes in the depth-first mode by using the conversion array.

14. A program stored on a storage device, wherein the program makes a computer convert an expression form of a tree data structure that is represented by a parent-child relationship, wherein the program makes the computer execute the steps of:

defining the parent-child relationship by storing numbers assigned to parent nodes as elements of a first array in the storage device in the order of numbers assigned to child node corresponding to the respective parent nodes;

counting an occurrence count of the numbers assigned to each node as an element of the first array;

reserving consecutive locations corresponding to the counted occurrence count in the storage device as a second array in order to store numbers assigned to child nodes corresponding to each node; and successively reading the elements from the first array, and successively storing the numbers assigned to the child nodes corresponding to the elements in the first array as elements of the second array reserved for the nodes to which numbers having values equal to the read elements are assigned.

15. A computer that converts an expression form of a tree data structure that is represented by a parent-child relationship on a storage device, wherein the computer executes the steps of:

defining the parent-child relationship by storing numbers assigned to child nodes as elements of a first array in the storage device in the order of numbers assigned to parent nodes corresponding to the respective child nodes;

reserving a second array in the storage device in order to store numbers assigned to the parent nodes corresponding to the respective child nodes in the order of the numbers assigned to the child nodes; and successively reading the elements from the first array and successively storing the numbers assigned to the parent nodes corresponding to the elements in the first array as elements of the second array reserved for the nodes to which numbers having values equal to the elements are assigned.

* * * * *